United States Patent
Khoshnevisan et al.

(10) Patent No.: US 12,446,022 B2
(45) Date of Patent: Oct. 14, 2025

(54) TECHNIQUES FOR SEARCH SPACE SHARING FOR CONTROL CHANNEL REPETITION

(71) Applicant: QUALCOMM Incorporated, San Diego, CA (US)

(72) Inventors: Mostafa Khoshnevisan, San Diego, CA (US); Jing Sun, San Diego, CA (US); Xiaoxia Zhang, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 797 days.

(21) Appl. No.: 17/695,076

(22) Filed: Mar. 15, 2022

(65) Prior Publication Data

US 2022/0304005 A1    Sep. 22, 2022

Related U.S. Application Data

(60) Provisional application No. 63/163,513, filed on Mar. 19, 2021.

(51) Int. Cl.
*H04W 72/12* (2023.01)

(52) U.S. Cl.
CPC ................. *H04W 72/12* (2013.01)

(58) Field of Classification Search
CPC .................................................. H04W 72/12
See application file for complete search history.

(56) References Cited

U.S. PATENT DOCUMENTS

| | | | |
|---|---|---|---|
| 8,675,565 B2 | 3/2014 | Kim et al. | |
| 2021/0274535 A1* | 9/2021 | Yi | H04W 24/08 |
| 2021/0329674 A1* | 10/2021 | Matsumura | H04L 5/0046 |
| 2022/0039140 A1* | 2/2022 | Yi | H04L 1/08 |
| 2023/0156700 A1* | 5/2023 | Liu | H04W 24/08 370/329 |

(Continued)

FOREIGN PATENT DOCUMENTS

EP    2675085 B1    9/2017

OTHER PUBLICATIONS

International Search Report and Written Opinion—PCT/US2022/020548—ISA/EPO—Jul. 6, 2022.

(Continued)

*Primary Examiner* — Yemane Mesfin
*Assistant Examiner* — Salma Ayad
(74) *Attorney, Agent, or Firm* — Holland & Hart LLP

(57) ABSTRACT

Methods, systems, and devices for wireless communications are described. A user equipment (UE) may receive, from an access network entity, control signaling indicating first and second search space sets. In some cases, a first set of control channel decoding candidates associated with scheduling a first component carrier may be linked for control channel repetition across the first search space set and the second search space set, and a second set of control channel decoding candidates associated with scheduling a second component carrier may not be linked for control channel repetition. The UE may identify a search space sharing condition for the first and second sets of control channel decoding candidates and monitor the first set of control channel decoding candidates, the second set of control channel decoding candidates, or both, in accordance with the search space sharing condition.

21 Claims, 22 Drawing Sheets

(56) References Cited

U.S. PATENT DOCUMENTS

2023/0199773 A1* 6/2023 Cirik .................. H04L 1/08
                                              370/329
2023/0354070 A1* 11/2023 Cirik .................. H04L 27/2602
2024/0089986 A1* 3/2024 Matsumura ....... H04W 72/0446

OTHER PUBLICATIONS

Qualcomm Incorporated: "Enhancements on Multi-TRP for PDCCH, PUCCH and PUSCH", 3GPP TSG-RAN WG1 Meeting #107-e, R1-2112197, 3GPP, Mobile Competence Centre, 650, Route Des Lucioles, F-06921 Sophia-Antipolis Cedex, France, vol. RAN WG1, No. e-Meeting, Nov. 11, 2021-Nov. 19, 2021, 18 p. Nov. 6, 2021, XP052075303, URL: https://ftp.3gpp.org/tsg_ran/WG1_RL1/TSGR1_107-e/Docs/R1-2112197.zip R1-2112197 Enhancements on Multi-TRP for PDCCH, PUCCH and PUSCH.docx.

SAMSUNG: "Further Enhancements on MIMO for NR", 3GPP TSG RAN Meeting #91-e, RP-200290, 3GPP, Mobile Competence Centre, 650, Route Des Lucioles, F-06921 Sophia-Antipolis Cedex, France, vol. TSG RAN, No. Electronic Meeting, Mar. 16, 2021-Mar. 26, 2021, 17Pages, Mar. 15, 2021, XP051985645, URL: https://ftp.3gpp.org/tsg_ran/TSG_RAN/TSGR_91e/Docs/RP-210290.zip RP-210290 SR for RAN_91e_NR-FeMIMO.DOCX.

* cited by examiner

TECHNIQUES FOR SEARCH SPACE SHARING FOR CONTROL CHANNEL REPETITION

CROSS REFERENCE

The present application for patent claims the benefit of U.S. Provisional Patent Application No. 63/163,513 by KHOSHNEVISAN et al., entitled "TECHNIQUES FOR SEARCH SPACE SHARING FOR CONTROL CHANNEL REPETITION," filed Mar. 19, 2021, assigned to the assignee hereof, and expressly incorporated by reference herein.

FIELD OF TECHNOLOGY

The following relates to wireless communications, including techniques for search space sharing for control channel repetition.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may enable communications within a component carrier component carrier to be scheduled via control signaling within the same component carrier (e.g., "self-scheduling," or "intra-carrier scheduling"), and/or via control signaling within a different component carrier (e.g., "cross-carrier scheduling," or "inter-carrier scheduling"). In some cases, search space sets on a scheduling component carrier may be linked together for control channel repetition to improve transmission diversity and reliability of wireless communications. Some techniques for control channel repetition may be deficient.

SUMMARY

The described techniques relate to improved methods, systems, devices, and apparatuses that support techniques for search space sharing for control channel repetition. Generally, the described techniques provide for search space sharing while implementing control channel repetition across search spaces. In particular, aspects of the present disclosure provide techniques and configurations which enable a wireless communications system to use a search space sharing condition when a first set of control channel decoding candidates associated with scheduling a first cell are configured for control channel repetition across a first search space set and a second search space set and a second set of control channel decoding candidates associated with scheduling a second cell are not configured for control channel repetition across the search space sets. In some cases, search space sharing is not applicable to any control channel candidate in the monitoring occasion of either of the search space sets. In some other examples, search space sharing may be used between two sets of control channel candidates (e.g., for scheduling two different cells) that are either both linked or both unlinked for control channel repetition. In some cases, search space sharing may be applied between any sets of control channel candidates in the first search space set or the second search space set regardless of if the sets of control channel candidates are configured for control channel repetition or not. Techniques for supporting these and other configurations for search space sharing with control channel repetition are described herein.

A method for wireless communications at a user equipment (UE) is described. The method may include receiving, from an access network entity, control signaling indicating a first search space set and a second search space set, identifying a search space sharing condition for a first set of control channel decoding candidates associated with scheduling a first component carrier, a second set of control channel decoding candidates associated with scheduling a second component carrier, or both, based on whether the first set of control channel decoding candidates, or the second set of control channel decoding candidates, or both, are linked for control channel repetition across the first search space set and the second search space set, and monitoring the first set of control channel decoding candidates, the second set of control channel decoding candidates, or both, in accordance with the search space sharing condition.

An apparatus for wireless communications at a UE is described. The apparatus may include a processor, memory coupled with the processor, and instructions stored in the memory. The instructions may be executable by the processor to cause the apparatus to receive, from an access network entity, control signaling indicating a first search space set and a second search space set, identify a search space sharing condition for a first set of control channel decoding candidates associated with scheduling a first component carrier, a second set of control channel decoding candidates associated with scheduling a second component carrier, or both, based on whether the first set of control channel decoding candidates, or the second set of control channel decoding candidates, or both, are linked for control channel repetition across the first search space set and the second search space set, and monitor the first set of control channel decoding candidates, the second set of control channel decoding candidates, or both, in accordance with the search space sharing condition.

Another apparatus for wireless communications at a UE is described. The apparatus may include means for receiving, from an access network entity, control signaling indicating a first search space set and a second search space set, means for identifying a search space sharing condition for a first set of control channel decoding candidates associated with scheduling a first component carrier, a second set of control channel decoding candidates associated with scheduling a second component carrier, or both, based on whether the first set of control channel decoding candidates, or the second set of control channel decoding candidates, or both, are linked for control channel repetition across the first search space set and the second search space set, and means for monitoring the first set of control channel decoding candidates, the second set of control channel decoding candidates, or both, in accordance with the search space sharing condition.

A non-transitory computer-readable medium storing code for wireless communications at a UE is described. The code may include instructions executable by a processor to receive, from an access network entity, control signaling indicating a first search space set and a second search space set, identify a search space sharing condition for a first set of control channel decoding candidates associated with scheduling a first component carrier, a second set of control channel decoding candidates associated with scheduling a second component carrier, or both, based on whether the first set of control channel decoding candidates, or the second set of control channel decoding candidates, or both, are linked for control channel repetition across the first search space set and the second search space set, and monitor the first set of control channel decoding candidates, the second set of control channel decoding candidates, or both, in accordance with the search space sharing condition.

In some examples of the method, apparatuses, and non-transitory computer-readable medium described herein, identifying the search space sharing condition may include operations, features, means, or instructions for receiving the control signaling or second control signaling indicating the search space sharing condition.

In some examples of the method, apparatuses, and non-transitory computer-readable medium described herein, the monitoring may include operations, features, means, or instructions for receiving, on a first decoding candidate in the first search space set of the first set of control channel decoding candidates associated with scheduling the first component carrier, a first control message scheduling the second component carrier based on the search space sharing condition indicating that search space sharing may be configured for the first set of control channel decoding candidates and the second set of control channel decoding candidates.

Some examples of the method, apparatuses, and non-transitory computer-readable medium described herein may further include operations, features, means, or instructions for receiving, on a second decoding candidate in the second search space set of the first set of control channel decoding candidates associated with scheduling the first component carrier, a repetition of the first control message scheduling the second component carrier based on the search space sharing condition and the first set of control channel decoding candidates being linked for control channel repetition across the first search space set and the second search space set.

Some examples of the method, apparatuses, and non-transitory computer-readable medium described herein may further include operations, features, means, or instructions for receiving, on a first decoding candidate of the second set of control channel decoding candidates associated with scheduling the second component carrier in the first search space set, a first control message scheduling the first component carrier based on the search space sharing condition indicating that search space sharing may be configured for the first set of control channel decoding candidates and the second set of control channel decoding candidates.

In some examples of the method, apparatuses, and non-transitory computer-readable medium described herein, the monitoring may include operations, features, means, or instructions for receiving, on a first decoding candidate in the first search space set of the first set of control channel decoding candidates associated with scheduling the first component carrier, a first control message scheduling a third component carrier based on the search space sharing condition, the search space sharing condition indicating that the first set of control channel decoding candidates associated with scheduling the first component carrier may be configured for search space sharing based on the first set of control channel decoding candidates being linked for control channel repetition across the first search space set and the second search space set and a third set of control channel decoding candidates associated with scheduling the third component carrier being linked for control channel repetition across the first search space set and the second search space set.

Some examples of the method, apparatuses, and non-transitory computer-readable medium described herein may further include operations, features, means, or instructions for receiving, on a second decoding candidate in the second search space set of the first set of control channel decoding candidates associated with scheduling the first component carrier, a repetition of the first control message scheduling the third component carrier.

In some examples of the method, apparatuses, and non-transitory computer-readable medium described herein, the monitoring may include operations, features, means, or instructions for receiving, on a first decoding candidate in the first search space set of the second set of control channel decoding candidates associated with scheduling the second component carrier, a first control message scheduling a third component carrier based on the search space sharing condition, the search space sharing condition indicating that the second set of control channel decoding candidates associated with scheduling the second component carrier may be configured for search space sharing based on the second set of control channel decoding candidates being unlinked across the first search space set and the second search space set and a third set of control channel decoding candidates associated with scheduling the third component carrier being unlinked across the first search space set and the second search space set.

In some examples of the method, apparatuses, and non-transitory computer-readable medium described herein, identifying the search space sharing condition may include operations, features, means, or instructions for identifying that the search space sharing condition indicates that search space sharing may be unconfigured between the first set of control channel decoding candidates and the second set of control channel decoding candidates based on the first set of control channel decoding candidates being linked for control channel repetition across the first search space set and the second search space set, and the second set of control channel decoding candidates being unlinked for control channel repetition across the first search space set and the second search space set.

In some examples of the method, apparatuses, and non-transitory computer-readable medium described herein, identifying the search space sharing condition may include operations, features, means, or instructions for identifying that the search space sharing condition indicates that search space sharing may be unconfigured for any decoding candidate of the first search space set and the second search space set.

In some examples of the method, apparatuses, and non-transitory computer-readable medium described herein, identifying the search space sharing condition may include operations, features, means, or instructions for transmitting, to the access network entity, an indication of a UE capability for search space sharing and receiving the control signaling or second control signaling indicating the search space sharing condition based on the UE capability for search space sharing.

In some examples of the method, apparatuses, and non-transitory computer-readable medium described herein, the indication of the UE capability indicates that the UE may be capable of search space sharing between sets of control channel decoding candidates which may be unlinked for control channel repetition.

In some examples of the method, apparatuses, and non-transitory computer-readable medium described herein, the indication of the UE capability further indicates that the UE may be capable of search space sharing between sets of control channel decoding candidates which may be linked for control channel repetition.

In some examples of the method, apparatuses, and non-transitory computer-readable medium described herein, the indication of the UE capability indicates that the UE may be capable of search space sharing associated with control channel repetition.

Some examples of the method, apparatuses, and non-transitory computer-readable medium described herein may further include operations, features, means, or instructions for receiving, from the access network entity, a second control signaling to enable or disable the search space sharing condition.

In some examples of the method, apparatuses, and non-transitory computer-readable medium described herein, receiving the second control signaling may include operations, features, means, or instructions for receiving the second control signaling to enable or disable the search space sharing condition for one or more cell groups, one or more component carriers including a set of control channel decoding candidates configured for the UE, one or more pairs of scheduled component carriers, one or more search space sets, or any combination thereof.

In some examples of the method, apparatuses, and non-transitory computer-readable medium described herein, receiving the second control signaling may include operations, features, means, or instructions for receiving the second control signaling via radio resource control signaling.

A method for wireless communications at an access network entity is described. The method may include transmitting, to a UE, control signaling indicating a first search space set and a second search space set, identifying a search space sharing condition for a first set of control channel decoding candidates associated with scheduling a first component carrier, a second set of control channel decoding candidates associated with scheduling a second component carrier, or both, based on whether the first set of control channel decoding candidates, or the second set of control channel decoding candidates, or both, are linked for control channel repetition across the first search space set and the second search space set, and transmitting a first control message on corresponding to at least one control channel decoding candidate of the first set of control channel decoding candidates, the second set of control channel decoding candidates, or both, in accordance with the search space sharing condition.

An apparatus for wireless communications at an access network entity is described. The apparatus may include a processor, memory coupled with the processor, and instructions stored in the memory. The instructions may be executable by the processor to cause the apparatus to transmit, to a UE, control signaling indicating a first search space set and a second search space set, identify a search space sharing condition for a first set of control channel decoding candidates associated with scheduling a first component carrier, a second set of control channel decoding candidates associated with scheduling a second component carrier, or both, based on whether the first set of control channel decoding candidates, or the second set of control channel decoding candidates, or both, are linked for control channel repetition across the first search space set and the second search space set, and transmit a first control message on corresponding to at least one control channel decoding candidate of the first set of control channel decoding candidates, the second set of control channel decoding candidates, or both, in accordance with the search space sharing condition.

Another apparatus for wireless communications at an access network entity is described. The apparatus may include means for transmitting, to a UE, control signaling indicating a first search space set and a second search space set, means for identifying a search space sharing condition for a first set of control channel decoding candidates associated with scheduling a first component carrier, a second set of control channel decoding candidates associated with scheduling a second component carrier, or both, based on whether the first set of control channel decoding candidates, or the second set of control channel decoding candidates, or both, are linked for control channel repetition across the first search space set and the second search space set, and means for transmitting a first control message on corresponding to at least one control channel decoding candidate of the first set of control channel decoding candidates, the second set of control channel decoding candidates, or both, in accordance with the search space sharing condition.

A non-transitory computer-readable medium storing code for wireless communications at an access network entity is described. The code may include instructions executable by a processor to transmit, to a UE, control signaling indicating a first search space set and a second search space set, identify a search space sharing condition for a first set of control channel decoding candidates associated with scheduling a first component carrier, a second set of control channel decoding candidates associated with scheduling a second component carrier, or both, based on whether the first set of control channel decoding candidates, or the second set of control channel decoding candidates, or both, are linked for control channel repetition across the first search space set and the second search space set, and transmit a first control message on corresponding to at least one control channel decoding candidate of the first set of control channel decoding candidates, the second set of control channel decoding candidates, or both, in accordance with the search space sharing condition.

Some examples of the method, apparatuses, and non-transitory computer-readable medium described herein may further include operations, features, means, or instructions for transmitting the control signaling or second control signaling indicating the search space sharing condition.

In some examples of the method, apparatuses, and non-transitory computer-readable medium described herein, the transmitting may include operations, features, means, or instructions for transmitting, on a first decoding candidate in the first search space set of the first set of control channel decoding candidates associated with scheduling the first component carrier, the first control message scheduling the second component carrier based on the search space sharing condition indicating that search space sharing may be configured for the first set of control channel decoding candidates and the second set of control channel decoding candidates.

Some examples of the method, apparatuses, and non-transitory computer-readable medium described herein may further include operations, features, means, or instructions for transmitting, on a second decoding candidate in the second search space set of the first set of control channel decoding candidates associated with scheduling the first component carrier, a repetition of the first control message scheduling the second component carrier based on the search space sharing condition and the first set of control channel decoding candidates being linked for control channel repetition across the first search space set and the second search space set.

Some examples of the method, apparatuses, and non-transitory computer-readable medium described herein may further include operations, features, means, or instructions for transmitting, on a first decoding candidate of the second set of control channel decoding candidates associated with scheduling the second component carrier in the first search space set, the first control message scheduling the first component carrier based on the search space sharing condition indicating that search space sharing may be configured for the first set of control channel decoding candidates and the second set of control channel decoding candidates.

In some examples of the method, apparatuses, and non-transitory computer-readable medium described herein, the transmitting may include operations, features, means, or instructions for transmitting, on a first decoding candidate in the first search space set of the first set of control channel decoding candidates associated with scheduling the first component carrier, the first control message scheduling a third component carrier based on the search space sharing condition, the search space sharing condition indicating that the first set of control channel decoding candidates associated with scheduling the first component carrier may be configured for search space sharing based on the first set of control channel decoding candidates being linked for control channel repetition across the first search space set and the second search space set and a third set of control channel decoding candidates associated with scheduling the third component carrier being linked for control channel repetition across the first search space set and the second search space set.

Some examples of the method, apparatuses, and non-transitory computer-readable medium described herein may further include operations, features, means, or instructions for transmitting, on a second decoding candidate in the second search space set of the first set of control channel decoding candidates associated with scheduling the first component carrier, a repetition of the first control message scheduling the third component carrier.

In some examples of the method, apparatuses, and non-transitory computer-readable medium described herein, the transmitting may include operations, features, means, or instructions for transmitting, on a first decoding candidate in the first search space set of the second set of control channel decoding candidates associated with scheduling the second component carrier, the first control message scheduling a third component carrier based on the search space sharing condition, the search space sharing condition indicating that the second set of control channel decoding candidates associated with scheduling the second component carrier may be configured for search space sharing based on the second set of control channel decoding candidates being unlinked across the first search space set and the second search space set and a third set of control channel decoding candidates associated with scheduling the third component carrier being unlinked across the first search space set and the second search space set.

In some examples of the method, apparatuses, and non-transitory computer-readable medium described herein, identifying the search space sharing condition may include operations, features, means, or instructions for identifying that the search space sharing condition indicates that search space sharing may be unconfigured between the first set of control channel decoding candidates and the second set of control channel decoding candidates based on the first set of control channel decoding candidates being linked for control channel repetition across the first search space set and the second search space set, and the second set of control channel decoding candidates being unlinked for control channel repetition across the first search space set and the second search space set.

In some examples of the method, apparatuses, and non-transitory computer-readable medium described herein, identifying the search space sharing condition may include operations, features, means, or instructions for identifying that the search space sharing condition indicates that search space sharing may be unconfigured for any decoding candidate of the first search space set and the second search space set.

In some examples of the method, apparatuses, and non-transitory computer-readable medium described herein, identifying the search space sharing condition may include operations, features, means, or instructions for receiving, from the UE, an indication of a UE capability for search space sharing and transmitting the control signaling or second control signaling indicating the search space sharing condition based on the UE capability for search space sharing.

In some examples of the method, apparatuses, and non-transitory computer-readable medium described herein, the indication of the UE capability indicates that the UE may be capable of search space sharing between sets of control channel decoding candidates which may be unlinked for control channel repetition.

In some examples of the method, apparatuses, and non-transitory computer-readable medium described herein, the indication of the UE capability further indicates that the UE may be capable of search space sharing between sets of control channel decoding candidates which may be linked for control channel repetition.

In some examples of the method, apparatuses, and non-transitory computer-readable medium described herein, the indication of the UE capability indicates that the UE may be capable of search space sharing associated with control channel repetition.

Some examples of the method, apparatuses, and non-transitory computer-readable medium described herein may further include operations, features, means, or instructions for transmitting, to the UE, a second control signaling to enable or disable the search space sharing condition.

In some examples of the method, apparatuses, and non-transitory computer-readable medium described herein, transmitting the second control signaling may include operations, features, means, or instructions for transmitting the second control signaling to enable or disable the search space sharing condition for one or more cell groups, one or more component carriers including a set of control channel decoding candidates configured for the UE, one or more pairs of scheduled component carriers, one or more search space sets, or any combination thereof.

In some examples of the method, apparatuses, and non-transitory computer-readable medium described herein, transmitting the second control signaling may include operations, features, means, or instructions for transmitting the second control signaling via radio resource control signaling.

A method for wireless communications at a user equipment (UE) is described. The method may include receiving, from a base station, control signaling indicating a first search space set and a second search space set, where a first set of control channel decoding candidates associated with scheduling a first component carrier are linked for control channel repetition across the first search space set and the second search space set, and a second set of control channel decoding candidates associated with scheduling a second component carrier are unlinked for control channel repetition across the first search space set and the second search space set, identifying a search space sharing configuration for the first set of control channel decoding candidates, the second set of control channel decoding candidates, or both, based on the control signaling, and monitoring the first set of control channel decoding candidates, the second set of control channel decoding candidates, or both, in accordance with the search space sharing configuration.

An apparatus for wireless communications at a UE is described. The apparatus may include a processor, memory coupled with the processor, and instructions stored in the memory. The instructions may be executable by the processor to cause the apparatus to receive, from a base station, control signaling indicating a first search space set and a second search space set, where a first set of control channel decoding candidates associated with scheduling a first component carrier are linked for control channel repetition across the first search space set and the second search space set, and a second set of control channel decoding candidates associated with scheduling a second component carrier are unlinked for control channel repetition across the first search space set and the second search space set, identify a search space sharing configuration for the first set of control channel decoding candidates, the second set of control channel decoding candidates, or both, based on the control signaling, and monitor the first set of control channel decoding candidates, the second set of control channel decoding candidates, or both, in accordance with the search space sharing configuration.

Another apparatus for wireless communications at a UE is described. The apparatus may include means for receiving, from a base station, control signaling indicating a first search space set and a second search space set, where a first set of control channel decoding candidates associated with scheduling a first component carrier are linked for control channel repetition across the first search space set and the second search space set, and a second set of control channel decoding candidates associated with scheduling a second component carrier are unlinked for control channel repetition across the first search space set and the second search space set, means for identifying a search space sharing configuration for the first set of control channel decoding candidates, the second set of control channel decoding candidates, or both, based on the control signaling, and means for monitoring the first set of control channel decoding candidates, the second set of control channel decoding candidates, or both, in accordance with the search space sharing configuration.

A non-transitory computer-readable medium storing code for wireless communications at a UE is described. The code may include instructions executable by a processor to receive, from a base station, control signaling indicating a first search space set and a second search space set, where a first set of control channel decoding candidates associated with scheduling a first component carrier are linked for control channel repetition across the first search space set and the second search space set, and a second set of control channel decoding candidates associated with scheduling a second component carrier are unlinked for control channel repetition across the first search space set and the second search space set, identify a search space sharing configuration for the first set of control channel decoding candidates, the second set of control channel decoding candidates, or both, based on the control signaling, and monitor the first set of control channel decoding candidates, the second set of control channel decoding candidates, or both, in accordance with the search space sharing configuration.

In some examples of the method, apparatuses, and non-transitory computer-readable medium described herein, identifying the search space sharing configuration may include operations, features, means, or instructions for receiving the control signaling or second control signaling indicating the search space sharing configuration.

In some examples of the method, apparatuses, and non-transitory computer-readable medium described herein, the monitoring may include operations, features, means, or instructions for receiving, on a first candidate in the first search space set of the first set of control channel decoding candidates associated with scheduling the first component carrier, a first control message scheduling the second component carrier based on the search space sharing configuration indicating that search space sharing may be configured for the first set of control channel decoding candidates and the second set of control channel decoding candidates.

Some examples of the method, apparatuses, and non-transitory computer-readable medium described herein may further include operations, features, means, or instructions for receiving, on a second candidate in the second search space set of the first set of control channel decoding candidates associated with scheduling the first component carrier, a repetition of the first control message scheduling the second component carrier based on the search space sharing configuration and the first set of control channel decoding candidates being linked for control channel repetition across the first search space set and the second search space set.

Some examples of the method, apparatuses, and non-transitory computer-readable medium described herein may further include operations, features, means, or instructions for receiving, on a first candidate of the second set of control channel decoding candidates associated with scheduling the second component carrier in the first search space set, a first control message scheduling the first component carrier based on the search space sharing configuration indicating that search space sharing may be configured for the first set of control channel decoding candidates and the second set of control channel decoding candidates.

In some examples of the method, apparatuses, and non-transitory computer-readable medium described herein, the monitoring may include operations, features, means, or instructions for receiving, on a first decoding candidate in the first search space set of the first set of control channel decoding candidates associated with scheduling the first component carrier, a first control message scheduling a third component carrier based on the search space sharing configuration, the search space sharing configuration indicating that the first set of control channel decoding candidates associated with scheduling the first component carrier may be configured for search space sharing based on the first set of control channel decoding candidates being linked for control channel repetition across the first search space set and the second search space set and a third set of control channel decoding candidates associated with scheduling the third component carrier being linked for control channel repetition across the first search space set and the second search space set.

Some examples of the method, apparatuses, and non-transitory computer-readable medium described herein may further include operations, features, means, or instructions for receiving, on a second candidate in the second search space set of the first set of control channel decoding candidates associated with scheduling the first component carrier, a repetition of the first control message scheduling the third component carrier.

In some examples of the method, apparatuses, and non-transitory computer-readable medium described herein, the monitoring may include operations, features, means, or instructions for receiving, on a first candidate in the first search space set of the second set of control channel decoding candidates associated with scheduling the second component carrier, a first control message scheduling a third component carrier based on the search space sharing configuration, the search space sharing configuration indicating that the second set of control channel decoding candidates associated with scheduling the second component carrier may be configured for search space sharing based on the second set of control channel decoding candidates being unlinked for control channel repetition across the first search space set and the second search space set and a third set of control channel decoding candidates associated with scheduling the third component carrier being unlinked for control channel repetition across the first search space set and the second search space set.

In some examples of the method, apparatuses, and non-transitory computer-readable medium described herein, identifying the search space configuration may include operations, features, means, or instructions for identifying that the search space sharing configuration indicates that search space sharing may be unconfigured between the first set of control channel decoding candidates and the second set of control channel candidates based on the first set of candidates being linked for control channel repetition across the first search space set and the second search space set, and the second set of candidates not being linked for control channel repetition across the first search space set and the second search space set.

In some examples of the method, apparatuses, and non-transitory computer-readable medium described herein, identifying the search space sharing configuration may include operations, features, means, or instructions for identifying that the search space sharing configuration indicates that search space sharing may be unconfigured for any decoding candidate of the first search space set and the second search space set.

In some examples of the method, apparatuses, and non-transitory computer-readable medium described herein, identifying the search space sharing configuration may include operations, features, means, or instructions for transmitting, to the base station, an indication of a UE capability for search space sharing and receiving the control signaling or second control signaling indicating the search space sharing configuration based on the UE capability for search space sharing.

In some examples of the method, apparatuses, and non-transitory computer-readable medium described herein, the indication of the UE capability indicates that the UE may be capable of search space sharing between sets of control channel decoding candidates which may be unlinked for control channel repetition.

In some examples of the method, apparatuses, and non-transitory computer-readable medium described herein, the indication of the UE capability further indicates that the UE may be capable of search space sharing between sets of control channel decoding candidates which may be linked for control channel repetition.

In some examples of the method, apparatuses, and non-transitory computer-readable medium described herein, the indication of the UE capability indicates that the UE may be capable of search space sharing associated with control channel repetition.

Some examples of the method, apparatuses, and non-transitory computer-readable medium described herein may further include operations, features, means, or instructions for receiving, from the base station, a second control signaling to enable or disable the search space sharing configuration.

In some examples of the method, apparatuses, and non-transitory computer-readable medium described herein, receiving the second control signaling may include operations, features, means, or instructions for receiving the second control signaling to enable or disable the search space sharing configuration for one or more cell groups, one or more component carriers including a set of control channel decoding candidates configured for the UE, one or more pairs of scheduled component carriers, one or more search space sets, or any combination thereof.

In some examples of the method, apparatuses, and non-transitory computer-readable medium described herein, receiving the second control signaling may include operations, features, means, or instructions for receiving the second control signaling via radio resource control signaling.

A method for wireless communications at a base station is described. The method may include transmitting, to a UE, control signaling indicating a first search space set and a second search space set, where a first set of control channel decoding candidates associated with scheduling a first component carrier are linked for control channel repetition across the first search space set and the second search space set, and a second set of control channel decoding candidates associated with scheduling a second component carrier are unlinked for control channel repetition across the first search space set and the second search space set, identifying a search space sharing configuration for the first set of control channel decoding candidates, the second set of control channel decoding candidates, or both, based on the control signaling, and transmitting a first control message on corresponding to at least one control channel decoding candidate of the first set of control channel decoding candidates, the second set of control channel decoding candidates, or both, in accordance with the search space sharing configuration.

An apparatus for wireless communications at a base station is described. The apparatus may include a processor, memory coupled with the processor, and instructions stored in the memory. The instructions may be executable by the processor to cause the apparatus to transmit, to a UE, control signaling indicating a first search space set and a second search space set, where a first set of control channel decoding candidates associated with scheduling a first component carrier are linked for control channel repetition across the first search space set and the second search space set, and a second set of control channel decoding candidates associated with scheduling a second component carrier are unlinked for control channel repetition across the first search space set and the second search space set, identify a search space sharing configuration for the first set of control channel decoding candidates, the second set of control channel decoding candidates, or both, based on the control signaling, and transmit a first control message on corresponding to at least one control channel decoding candidate of the first set of control channel decoding candidates, the second set of control channel decoding candidates, or both, in accordance with the search space sharing configuration.

Another apparatus for wireless communications at a base station is described. The apparatus may include means for transmitting, to a UE, control signaling indicating a first search space set and a second search space set, where a first set of control channel decoding candidates associated with scheduling a first component carrier are linked for control channel repetition across the first search space set and the second search space set, and a second set of control channel decoding candidates associated with scheduling a second component carrier are unlinked for control channel repetition across the first search space set and the second search space set, means for identifying a search space sharing configuration for the first set of control channel decoding candidates, the second set of control channel decoding candidates, or both, based on the control signaling, and means for transmitting a first control message on corresponding to at least one control channel decoding candidate of the first set of control channel decoding candidates, the second set of control channel decoding candidates, or both, in accordance with the search space sharing configuration.

A non-transitory computer-readable medium storing code for wireless communications at a base station is described. The code may include instructions executable by a processor to transmit, to a UE, control signaling indicating a first search space set and a second search space set, where a first set of control channel decoding candidates associated with scheduling a first component carrier are linked for control channel repetition across the first search space set and the second search space set, and a second set of control channel decoding candidates associated with scheduling a second component carrier are unlinked for control channel repetition across the first search space set and the second search space set, identify a search space sharing configuration for the first set of control channel decoding candidates, the second set of control channel decoding candidates, or both, based on the control signaling, and transmit a first control message on corresponding to at least one control channel decoding candidate of the first set of control channel decoding candidates, the second set of control channel decoding candidates, or both, in accordance with the search space sharing configuration.

Some examples of the method, apparatuses, and non-transitory computer-readable medium described herein may further include operations, features, means, or instructions for transmitting the control signaling or second control signaling indicating the search space sharing configuration.

In some examples of the method, apparatuses, and non-transitory computer-readable medium described herein, the transmitting may include operations, features, means, or instructions for transmitting, on a first candidate in the first search space set of the first set of control channel decoding candidates associated with scheduling the first component carrier, the first control message scheduling the second component carrier based on the search space sharing configuration indicating that search space sharing may be configured for the first set of control channel decoding candidates and the second set of control channel decoding candidates.

Some examples of the method, apparatuses, and non-transitory computer-readable medium described herein may further include operations, features, means, or instructions for transmitting, on a second candidate in the second search space set of the first set of control channel decoding candidates associated with scheduling the first component carrier, a repetition of the first control message scheduling the second component carrier based on the search space sharing configuration and the first set of control channel decoding candidates being linked for control channel repetition across the first search space set and the second search space set.

Some examples of the method, apparatuses, and non-transitory computer-readable medium described herein may further include operations, features, means, or instructions for transmitting, on a first candidate of the second set of control channel decoding candidates associated with scheduling the second component carrier in the first search space set, the first control message scheduling the first component carrier based on the search space sharing configuration indicating that search space sharing may be configured for the first set of control channel decoding candidates and the second set of control channel decoding candidates.

In some examples of the method, apparatuses, and non-transitory computer-readable medium described herein, the transmitting may include operations, features, means, or instructions for transmitting, on a first decoding candidate in the first search space set of the first set of control channel decoding candidates associated with scheduling the first component carrier, the first control message scheduling a third component carrier based on the search space sharing configuration, the search space sharing configuration indicating that the first set of control channel decoding candidates associated with scheduling the first component carrier may be configured for search space sharing based on the first set of control channel decoding candidates being linked for control channel repetition across the first search space set and the second search space set and a third set of control channel decoding candidates associated with scheduling the third component carrier being linked for control channel repetition across the first search space set and the second search space set.

Some examples of the method, apparatuses, and non-transitory computer-readable medium described herein may further include operations, features, means, or instructions for transmitting, on a second candidate in the second search space set of the first set of control channel decoding candidates associated with scheduling the first component carrier, a repetition of the first control message scheduling the third component carrier.

In some examples of the method, apparatuses, and non-transitory computer-readable medium described herein, the transmitting may include operations, features, means, or instructions for transmitting, on a first candidate in the first search space set of the second set of control channel decoding candidates associated with scheduling the second component carrier, the first control message scheduling a third component carrier based on the search space sharing configuration, the search space sharing configuration indicating that the second set of control channel decoding candidates associated with scheduling the second component carrier may be configured for search space sharing based on the second set of control channel decoding candidates being unlinked for control channel repetition across the first search space set and the second search space set and a third set of control channel decoding candidates associated with scheduling the third component carrier being unlinked for control channel repetition across the first search space set and the second search space set.

In some examples of the method, apparatuses, and non-transitory computer-readable medium described herein, identifying the search space sharing configuration may include operations, features, means, or instructions for identifying that the search space sharing configuration indicates that search space sharing may be unconfigured between the first set of control channel decoding candidates and the second set of control channel candidates based on the first candidate being linked for control channel repetition across the first search space set and the second search space set, and the second set of candidates not being linked for control channel repetition across the first search space set and the second search space set.

In some examples of the method, apparatuses, and non-transitory computer-readable medium described herein, identifying the search space sharing configuration may include operations, features, means, or instructions for identifying that the search space sharing configuration indicates that search space sharing may be unconfigured for any decoding candidate of the first search space set and the second search space set.

In some examples of the method, apparatuses, and non-transitory computer-readable medium described herein, identifying the search space sharing configuration may include operations, features, means, or instructions for receiving, from the UE, an indication of a UE capability for search space sharing and transmitting the control signaling or second control signaling indicating the search space sharing configuration based on the UE capability for search space sharing.

In some examples of the method, apparatuses, and non-transitory computer-readable medium described herein, the indication of the UE capability indicates that the UE may be capable of search space sharing between sets of control channel decoding candidates which may be unlinked for control channel repetition.

In some examples of the method, apparatuses, and non-transitory computer-readable medium described herein, the indication of the UE capability further indicates that the UE may be capable of search space sharing between sets of control channel decoding candidates which may be linked for control channel repetition.

In some examples of the method, apparatuses, and non-transitory computer-readable medium described herein, the indication of the UE capability indicates that the UE may be capable of search space sharing associated with control channel repetition.

Some examples of the method, apparatuses, and non-transitory computer-readable medium described herein may further include operations, features, means, or instructions for transmitting, to the UE, a second control signaling to enable or disable the search space sharing configuration.

In some examples of the method, apparatuses, and non-transitory computer-readable medium described herein, transmitting the second control signaling may include operations, features, means, or instructions for transmitting the second control signaling to enable or disable the search space sharing configuration for one or more cell groups, one or more component carriers including a set of control channel decoding candidates configured for the UE, one or more pairs of scheduled component carriers, one or more search space sets, or any combination thereof.

In some examples of the method, apparatuses, and non-transitory computer-readable medium described herein, transmitting the second control signaling may include operations, features, means, or instructions for transmitting the second control signaling via radio resource control signaling.

DETAILED DESCRIPTION

Figure 1:
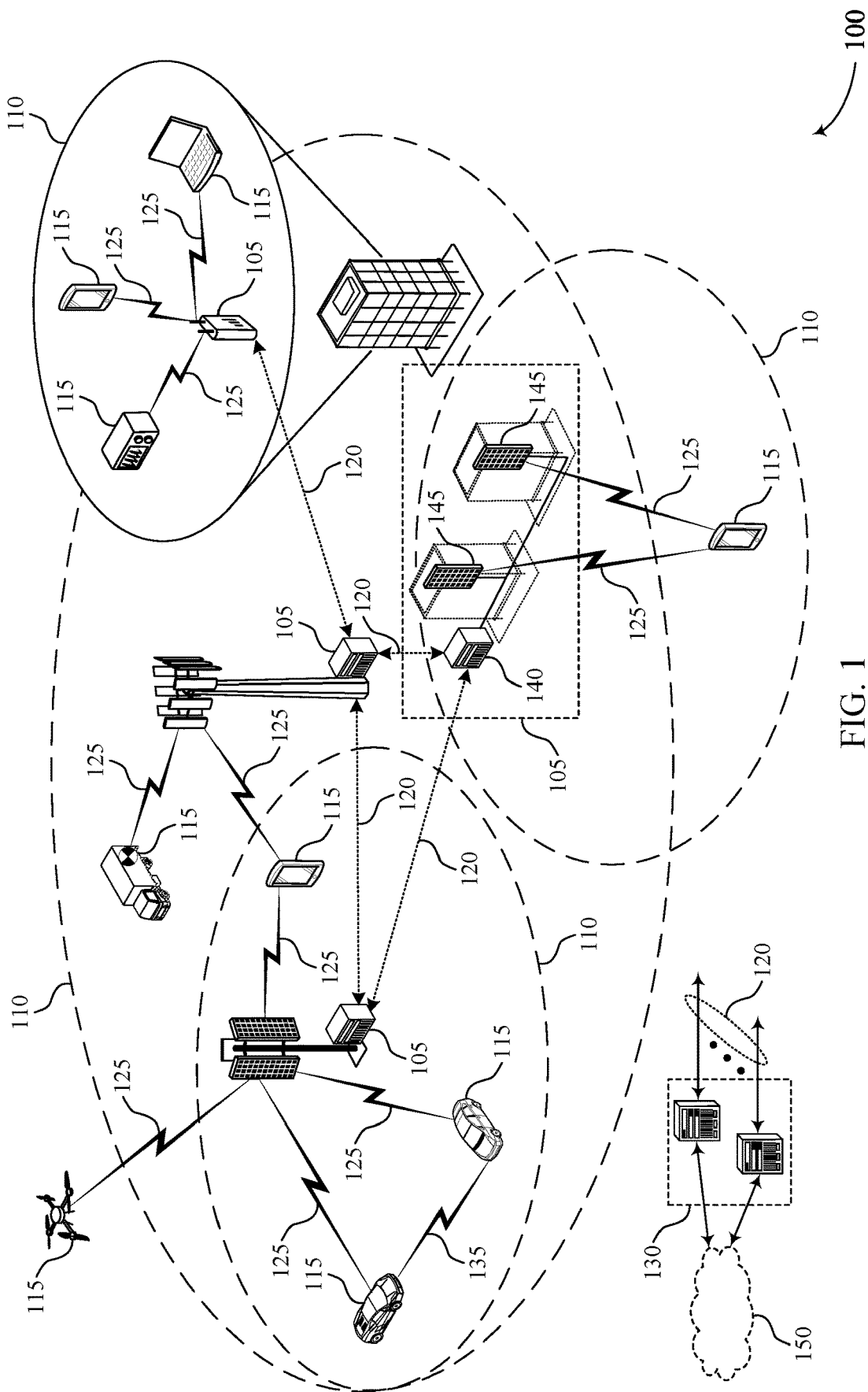
FIG. 1 illustrates an example of a wireless communications system that supports techniques for search space sharing for control channel repetition in accordance with aspects of the present disclosure.

Some wireless communications systems may enable communications within a component carrier to be scheduled via control signaling within the same component carrier (e.g., "self-scheduling," or "intra-carrier scheduling"), and/or via control signaling within a different component carrier (e.g., "cross-carrier scheduling," or "inter-carrier scheduling"). A carrier indicator field (CIF) within control signaling (e.g., downlink control information (DCI) messages) may indicate whether the control signaling schedules communications within the same component carrier or a different component carrier. That is, a "scheduled component carrier" may be scheduled via control signaling on one or more "scheduling component carriers." Moreover, in some implementations, search space sets on a scheduling component carrier may be linked together for control channel repetition to improve transmission diversity and reliability of wireless communications. For example, decoding candidates in different search spaces which are "linked" for control channel repetition may be used for communicating multiple repetitions of the same control message (e.g., for cross-carrier or intra-carrier scheduling). Some wireless communications systems may support techniques for search space sharing. For example, for cross-carrier scheduling, control channel candidate associated with a first scheduled cell (e.g., associated with a first CIF value) can be used to receive a control message for a second scheduled cell (e.g., associated with a second CIF value). However, in such cases, some wireless communications systems do not provide techniques or conditions which enable search space sharing for cross-carrier scheduling and control channel repetition on linked search space sets of a scheduling component carrier.

Accordingly, aspects of the present disclosure provide techniques for search space sharing while implementing control channel repetition (e.g., physical downlink control channel (PDCCH) repetition). More specifically, aspects of the present disclosure provide techniques and conditions for search space sharing when some scheduling cells are configured for PDCCH repetition and some scheduling cells are not configured for PDCCH repetition. As such, some techniques may be implemented to configure a UE to support for search space sharing between some scheduling cells, while some techniques may be implemented to configure a UE to conditionally support, or not to support, search space sharing between scheduling cells.

For example, a UE may receive a condition for a first search space set and a second search space set. The UE may be configured with a first set of PDCCH candidates associated with scheduling a first cell or component carrier, and the first PDCCH candidates may be linked for PDCCH repetition across the first search space set and the second search space set. The UE may also be configured with a second set of PDCCH candidates associated with scheduling a second cell or component carrier, and the second set of PDCCH candidates may be unlinked or not configured for PDCCH repetition across the search space sets. The UE may identify a search space sharing condition for the first and second sets of PDCCH candidates and monitor the first set of PDCCH candidates, the second set of PDCCH candidates, or both, based on the search space sharing condition. The search space sharing condition may support search space sharing between sets of PDCCH candidates, conditionally support search space sharing between sets of PDCCH candidates, or not support search space sharing between sets of PDCCH candidates.

In an example, search space sharing may be supported between the first set of PDCCH candidates and the second set of PDCCH candidates. Although the first set of PDCCH candidates is linked for PDCCH repetition and the second set of PDCCH candidates is not linked for PDCCH repetition, a candidate or a pair of linked candidates associated with the first scheduled cell may be used to receive PDCCH signaling for the second scheduled cell. Similarly, a candidate associated with the second scheduled cell in either of the linked search space sets may be used to receive a PDCCH for the first scheduled cell. In some other examples, search space sharing may be applicable between two sets of PDCCH candidates that are both linked for PDCCH repetition or between two sets of PDCCH candidates that are both unlinked for PDCCH repetition. For example, search space sharing may not be supported between the first set of PDCCH candidates and the second set of PDCCH candidates. However, search space sharing may be supported between the first set of PDCCH candidates and a third set of PDCCH candidates which are used to schedule a third cell or third component carrier, where the third set of PDCCH candidates are configured for PDCCH repetitions across the first and second search space sets. In some other examples, search space sharing may be applied between candidates in a given search space set but not applied to linked candidates. In some cases, search space sharing may not be applied to candidates in monitoring occasions of the first search space set or the second search space set.

Some additional techniques are described to support search space sharing with PDCCH repetition. For example, a UE may indicate a capability associated with support for search space sharing with PDCCH repetition. For example, the UE may indicate support for one or more of the search space sharing conditions described herein. In some cases, an access network entity may send control signaling to enable or disable a search space sharing condition. For example, the access network entity may toggle search space sharing for a cell group, scheduling cell, pair of scheduled cells, search space set, or any combination thereof.

Aspects of the disclosure are initially described in the context of wireless communications systems. Aspects of the disclosure are further illustrated by and described with reference to apparatus diagrams, system diagrams, and flowcharts that relate to techniques for search space sharing for control channel repetition.

FIG. 1 illustrates an example of a wireless communications system 100 that supports techniques for search space sharing for control channel repetition in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some aspects, a UE 115 of the wireless communications system 100 may be configured with up to three CORESETS within a given BWP of a serving cell (e.g., within a given BWP of a component carrier). In some cases (e.g., Release 16), a UE 115 may be configured with up to five CORESETs in a BWP of a serving cell. A CORESET may be associated with one or more transmission configuration indicator (TCI) states for PDCCH repetition, and may be associated with a quantity of resource blocks (RBs) in the frequency domain, and a quantity of symbols or other TTI in the time domain (e.g., quantity of OFDM symbols). Moreover, each CORESET may be associated with one active TCI state. In some aspects, a CORESET configured at the UE 115 may be associated with a CCE resource element group (CCE-REG) mapping type (e.g., CCE-REG bundle mapping type), a precoding granularity, an identifier (e.g., scrambling identifier) associated with scrambling for PDCCH demodulation reference signals (DMRS), coded bits of DCI content, or any combination thereof.

In some aspects, a UE 115 may be configured with up to ten search space sets within a given BWP of a component carrier. In some aspects, each search space set may be associated with a one CORESET, and may include a set of monitoring occasions. In some aspects, a search space set may include a set of control channel monitoring occasions. For example, a search space set may include a set of monitoring occasions, with a monitoring occasion occurring at regular or irregular periodicities (e.g., monitoring occasion every 10 ms). The UE 115 may be configured to blindly decode signals received in the respective monitoring occasions to determine whether CRC passes in the respective monitoring occasions. Moreover, a UE 115 may be configured to determine the control channel monitoring occasions associated with a given search space set based on one or more characteristics of the search space set which may be configured (e.g., pre-configured) at the UE 115, indicated to the UE 115 via a base station 105 (e.g., via RRC signaling), or both. A UE 115 may be configured with one or more different types of search space sets (e.g., searchSpaceType), including UE-specific search space sets, common search space sets, or both. Additionally, each search space set may be associated with one or more DCI formats which are to be monitored.

Parameters of a search space set (s) may include a periodicity ($k_s$) of monitoring occasions (e.g., $k_s$ slots), an offset ($o_s$) for monitoring occasions in units of slots (e.g., $o_s$ slots) (e.g., monitoringSlotPeriodicityAndOffset), a duration ($T_s$) indicative of a quantity of slots within a period in which the search space set exists (where $T_s<k_s$), or any combination thereof. A UE 115 of the wireless communications system 100 may determine a number/quantity of PDCCH monitoring occasions (e.g., PDCCH candidates) within a slot $\eta_{s,f}^\mu$ and a frame $\eta_f$ if $\eta_f N_{slot}^{frame,\mu}+\eta_{s,f}^\mu o_s \bmod k_s=0$. In some aspects, when monitoring a control channel, a UE 115 may be configured to monitor control channel candidates (e.g., PDCCH candidates) for a search space set s for $T_s$ consecutive slots, starting from slot $\eta_{s,f}^\mu$, and may refrain from monitoring control channel candidates for the search space set s for the next $k_s-T_s$ consecutive slots. Quantities of control channel candidates (e.g., PDCCH candidates) may be based on an aggregation level (e.g., number of CCEs) of wireless communications at the UE 115.

These search space set parameters may be configured (e.g., pre-configured) at the UE 115, indicated to the UE 115 via a base station 105 (e.g., via RRC signaling), or both. For example, RRC signaling may be used to configure parameters of a search space set at a UE 115, including with which CORESET the search space set is associated, a periodicity of monitoring occasions of the search space set, an offset of the monitoring occasions, DCI formats to monitor, a number of PDCCH candidates for a given aggregation level of the search space set, and the like.

Each search space set may be associated with a search space set index. In some implementations, PDCCH candidates may be defined as part of the search space set configuration. For example, a search space set include a set of PDCCH candidates, where each PDCCH candidate is associated with a given aggregation level and candidate index. In some aspects, a UE 115 may be configured to monitor PDCCH candidates in configured search space sets. The UE 115 may be configured to blindly decode the PDCCH candidates (e.g., monitoring occasions) within a search space set. In cases where the UE 115 receive a DCI message within a PDCCH candidate, the UE 115 may identify a CRC pass for the UE 115 (e.g., successfully decoding), and the UE 115 may act in accordance with the received DCI message (e.g., perform a communication scheduled by the DCI message).

In some aspects, a UE 115 may be configured to monitor a control channel according to a control channel monitoring pattern (e.g., PDCCH monitoring pattern) within a slot (e.g., monitoringSymbolsWithinSlot). For example, a PDCCH monitoring pattern within a slot may indicate a first symbol (s) of a CORESET within a slot for PDCCH monitoring. For instance, in the context of a slot including fourteen symbols, a CORESET configured at a UE 115 may be associated with a search space set including three symbols, and a control channel monitoring pattern (e.g., monitoringSymbolsWithinSlot) associated with the search space set may be configured as "01000010001000." In this example, the UE 115 may be configured to determine that there are three monitoring occasions (e.g., PDCCH candidates) within each slot that the search space set exists. Moreover, the UE 115 may be configured to determine that the three monitoring occasions begin at the second, seventh, and eleventh symbols of each respective slot that the search space exists.

In some aspects, multiple search space sets and/or multiple PDCCH candidates may be linked together (e.g., associated with one another) for possible repetitions of the same control channel transmission (e.g., repetitions of DCI). PDCCH candidates which are linked together may be used to transmit/receive repetitions of the same control message. In other words, PDCCH candidates may be linked together for "PDCCH repetitions." In the context of PDCCH repetitions, the payload (e.g., DCI payload) received within two PDCCH candidates (e.g., two PDCCH repetitions) may be the same. For example, a first PDCCH candidate may be related to, or linked with, to a second PDCCH candidate. In this example, a first repetition of DCI may be transmitted in the first PDCCH candidate, and a second repetition of DCI may be transmitted in the second PDCCH candidate, where the first and second repetitions of DCI are the same. In this example, a UE 115 may receive and/or decode only the first repetition of DCI or only the second repetition of DCI. Additionally or alternatively, the UE 115 may receive and/or decode both the first and second repetitions of DCI by performing soft-combining of the first and second repetitions of DCI, and the UE may be aware of the linking before decoding. In some aspects, related/linked PDCCH candidates may have the same aggregation level (e.g., same number of CCEs).

In some aspects, related PDCCH candidates in different search space sets which are associated with corresponding CORESETs may be linked together (e.g., related) for PDCCH repetition. In some cases, two PDCCH candidates with a same candidate index across two related search space sets may be linked or related. In other cases, PDCCH candidates with a same start CCE index may be linked. Moreover, UEs 115 may be configured with sets of linked/related PDCCH candidates which are within a same slot or TTI (e.g., intra-slot PDCCH repetition), sets of linked/related PDCCH candidates which are in different slots (e.g., intra-slot PDCCH repetition), or both.

The wireless communications system 100 may be configured to support inter-carrier scheduling (e.g., cross-carrier scheduling), intra-carrier scheduling (e.g., self-scheduling), or both. Inter-carrier scheduling, or cross-carrier scheduling, refers to cases in which control signaling transmitted/received on a first component carrier (e.g., scheduling component carrier, scheduling cell) is used to schedule communications (e.g., physical downlink shared channel (PDSCH), physical uplink shared channel (PUSCH)) on a different component carrier (e.g., scheduling component carrier, scheduling cell). Conversely, intra-carrier scheduling, or self-scheduling, refers to cases in which control signaling transmitted/received on a component carrier is used to schedule communications on the same component carrier (e.g., same cell).

In some aspects, a search space set may include control channel candidates (e.g., PDCCH candidates) which are configured for self-scheduling, cross-carrier scheduling, or both. The CCEs associated with control channel candidates for different scheduled component carriers (e.g., PDCCH candidates for self-scheduling, PDCCH candidates for cross-carrier scheduling) within a monitoring occasion of a search space set may be separately identified based on a number of candidates for each aggregation level. The number/quantity of candidates for each aggregation level may be configured in a scheduled component carrier, and may be monitored in the scheduling component carrier. For example, a monitoring occasion for a search space set includes a set of PDCCH candidates with an aggregation level of two (e.g., two CCEs for each PDCCH candidate). In this example, the set of PDCCH candidates may include a first subset of PDCCH candidates configured for self-scheduling (e.g., subset of PDCCH candidates with CIF=0), and a second subset of PDCCH candidates for cross-carrier scheduling (e.g., subset of PDCCH candidates with CIF=1). In this regard, a single search space set may include PDCCH candidates which are configured for self-scheduling, cross-carrier scheduling, or both.

The wireless communications system 100 may be configured to support search space sharing techniques. For search space sharing, a PDCCH candidate associated with a first scheduled cell (e.g., corresponding to a first CIF value $(n_{CI,1})$) may be used to receive a control message for a second scheduled cell (e.g., corresponding to a second CIF value $(n_{CI,2})$) if the DCI size corresponding to the first scheduled cell is the same as a DCI size corresponding to the second scheduled cell. In some cases, search space sharing may be applied for uplink and downlink DCI formats other than fallback DCI. For example, for uplink-associated DCI, search space sharing may be used for a DCI format scheduling a PUSCH transmission or an uplink grant Type 2 PUSCH release, other than DCI format 0_0. For downlink-associated DCI, search space sharing may be used for a DCI format scheduling PDSCH repetition, semi-persistent scheduling (SPS) PDSCH release, or indicating secondary cell dormancy, or other formats besides DCI format 1_0. DCI size may be determined based on various conditions per scheduled component carrier. In some cases, for cross-carrier scheduling, a UE 115 may indicate (e.g., through UE capability signaling) the support of search space sharing for downlink (e.g., via a "searchSpaceSharingCA-DL" parameter), uplink (e.g., via a "searchSpaceSharingCA-UL" parameter), or both. In some systems, if the UE 115 indicates support for search space sharing, then search space sharing may be applicable for supporting control signaling formats.

Some wireless communications systems do not provide techniques or conditions which support both search space sharing and PDCCH repetition. For example, search space sharing may be a complex technique, which may be optional in some systems. A blind decoding limit (e.g., a number of PDCCH candidates to monitor per slot or per span) may be defined per scheduled cell. With search space sharing, a UE 115 may effectively monitor more PDCCH candidates than the blind decoding limit, as one candidate may be used to receive PDCCH for more than one scheduled cell. PDCCH repetition may also increase UE complexity based on a consideration of linked candidates across two different search space sets and soft combining two linked PDCCH candidates. Additionally, in two linked search space sets, candidates corresponding to a first scheduled cell may be linked (e.g., configured for PDCCH repetition), while candidates for a second scheduled cell may be individual (e.g., unlinked or not configured for PDCCH repetition).

Accordingly, the UEs 115 and the base stations 105 or the access network entities 140 of the wireless communications system 100 may support techniques to support search space sharing and PDCCH repetition. More specifically, the wireless communications system 100 may support conditions or rules to support both PDCCH repetition and search space sharing. Additionally, the wireless communications system 100 may support signaling for indicating a UE capability for search space sharing with PDCCH repetition and RRC configuration signaling to establish, enable, or disable conditions for these techniques.

For example, a UE 115 may receive a condition from a base station 105 or an access network entity 140 for a first search space set and a second search space set. The UE 115 may be configured with a first set of PDCCH candidates associated with scheduling a first cell or component carrier, and the first PDCCH candidates may be linked for PDCCH repetition across the first search space set and the second search space set. The UE 115 may also be configured with a second set of PDCCH candidates associated with scheduling a second cell or component carrier, and the second set of PDCCH candidates may be unlinked or not configured for PDCCH repetition across the search space sets. The UE 115 may identify a search space sharing condition for the first and second sets of PDCCH candidates and monitor the first set of PDCCH candidates, the second set of PDCCH candidates, or both, based on the search space sharing condition. The search space sharing condition may support search space sharing between sets of PDCCH candidates, conditionally support search space sharing between sets of PDCCH candidates, or not support search space sharing between sets of PDCCH candidates.

In an example, search space sharing may be supported between the first set of PDCCH candidates and the second set of PDCCH candidates. Although the first set of PDCCH candidates is linked for PDCCH repetition and the second set of PDCCH candidates is not linked for PDCCH repetition, a candidate or a pair of linked candidates associated with the first scheduled cell may be used to receive PDCCH signaling for the second scheduled cell. Similarly, a candidate associated with the second scheduled cell in either of the linked search space sets may be used to receive a PDCCH for the first scheduled cell. In some other examples, search space sharing may be applicable between two sets of PDCCH candidates that are both linked for PDCCH repetition or between two sets of PDCCH candidates that are both unlinked for PDCCH repetition. For example, search space sharing may not be supported between the first set of PDCCH candidates and the second set of PDCCH candidates. However, search space sharing may be supported between the first set of PDCCH candidates and a third set of PDCCH candidates which are used to schedule a third cell or third component carrier, where the third set of PDCCH candidates are configured for PDCCH repetitions across the first and second search space sets. In some other examples, search space sharing may be applied between candidates in a given search space set but not applied to linked candidates. In some cases, search space sharing may not be applied to candidates in monitoring occasions of the first search space set or the second search space set.

Some additional techniques are described to support search space sharing with PDCCH repetition. For example, a UE 115 may indicate a capability associated with support for search space sharing with PDCCH repetition. For example, the UE 115 may indicate support for one or more of the search space sharing conditions described herein. The search space sharing condition may refer to a scenario by which a UE 115 can make an internal determination regarding search space sharing that is not based directly on signaling or instruction from an access network entity 140 or base station 105. In some cases, a base station 105 or an access network entity 140 may send control signaling to enable or disable a search space sharing condition. For example, the base station 105 may toggle search space sharing for a cell group, scheduling cell, pair of scheduled cells, search space set, or any combination thereof.

Figure 2:
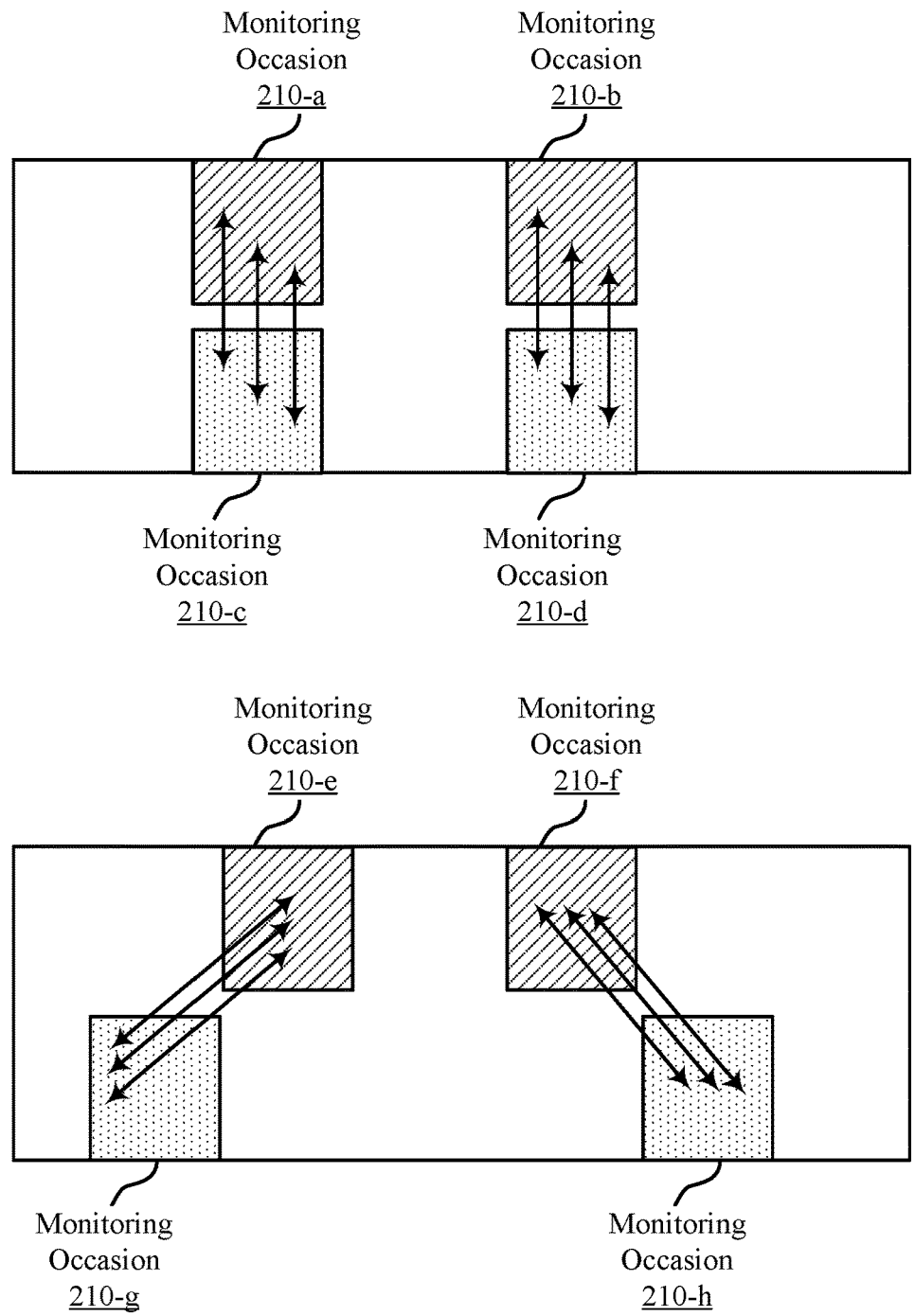
FIG. 2 illustrates an example of a resource condition that supports techniques for search space sharing for control channel repetition in accordance with aspects of the present disclosure.

FIG. 2 illustrates an example of a resource condition 200 that supports techniques for search space sharing for control channel repetition in accordance with aspects of the present disclosure. Aspects of the resource condition 200 may implement, or be implemented by, wireless communications system 100.

As noted previously herein, multiple search space sets 205 may be linked together for control channel repetition (e.g., PDCCH repetition). For example, as shown in the resource condition 200, a first search space set 205-*a* may be linked to a second search space set 205-*b*. In particular, monitoring occasions 210 associated with the first search space set 205-*a* (e.g., monitoring occasions 210-*a*, 210-*b*, 210-*e*, 210-*f*) may be linked with monitoring occasions 210 associated with the second search space set 205-*b* (e.g., monitoring occasions 210-*c*, 210-*d*, 210-*g*, 210-*h*). In some aspects, related PDCCH candidates in the respective search space sets 205 (e.g., PDCCH candidates within the monitoring occasions 210 of the respective search space sets 205) which are associated with corresponding CORESETs may be linked together (e.g., related) for PDCCH repetition.

In some cases, two PDCCH candidates with a same candidate index across two related search space sets may be linked or related. In other cases, PDCCH candidates with a same start CCE index may be linked. Moreover, UEs 115 may be configured with sets of linked/related PDCCH candidates which are within a same slot or TTI (e.g., intra-slot PDCCH repetition), sets of linked/related PDCCH candidates which are in different slots (e.g., intra-slot PDCCH repetition), or both.

Associations (e.g., links) between search space sets 205 and/or between PDCCH candidates may be configured (e.g., pre-configured) at the UE 115, signaled to the UE 115 by the base station 105 (e.g., via RRC signaling), or both. For example, a UE 115 may receive an RRC message which indicates that a first PDCCH candidate in the first search space set 205-$a$ is linked with (e.g., related to) a second PDCCH candidate in the second search space set 205-$b$. By way of another example, a UE 115 may receive an RRC message which indicates that the first search space set 205-$a$ is linked with (e.g., related to) a second search space set 205-$b$ for PDCCH repetition. In this example, PDCCH candidates with the same aggregation level and same candidate index between the first and second search space sets 205 may be linked. In particular, the first search space set 205-$a$ and the second search space set 205-$b$ may include a first set of PDCCH candidates (first set of monitoring occasions 210) and a second set of PDCCH candidates (second set of monitoring occasions 210), respectively, where the first set of PDCCH candidates are linked to the second set of PDCCH candidates.

In some cases, the first and second sets of monitoring occasions 210 may include the same quantity of monitoring occasions/PDCCH candidates (e.g., one-to-one mapping of monitoring occasions). For example, the monitoring occasion 210-$a$ associated with the first search space set 205-$a$ may include the same quantities of PDCCH candidates as the monitoring occasion 210-$c$ associated with the second search space set 205-$b$. Similarly, the monitoring occasions 210-$b$, 210-$e$, and 210-$f$ associated with the first search space set may include the same quantities of PDCCH candidates as the monitoring occasions 210-$d$, 210-$g$, and 210-$h$ associated with the second search space set 205-$b$, respectively. Moreover, the first and second search space sets 205-$a$, 205-$b$ may be configured with the same quantity of PDCCH candidates for each aggregation level.

In some aspects, aspects of the resource condition 200 may support techniques for both control channel repetition (e.g., PDCCH repetition) and search space sharing. In some cases, aspects of the resource condition 200 may support techniques and configurations which enable search space sharing for search space sets are linked for PDCCH repetition, unlinked for PDCCH repetition, or both. In some examples, aspects of the resource condition 200 may conditionally support techniques and configurations for search space sharing for search space sets which are linked for PDCCH repetition, unlinked for PDCCH repetition, or both. Some example techniques or configurations are described in further detail herein with respect to FIGS. 4-6.

Figure 3:
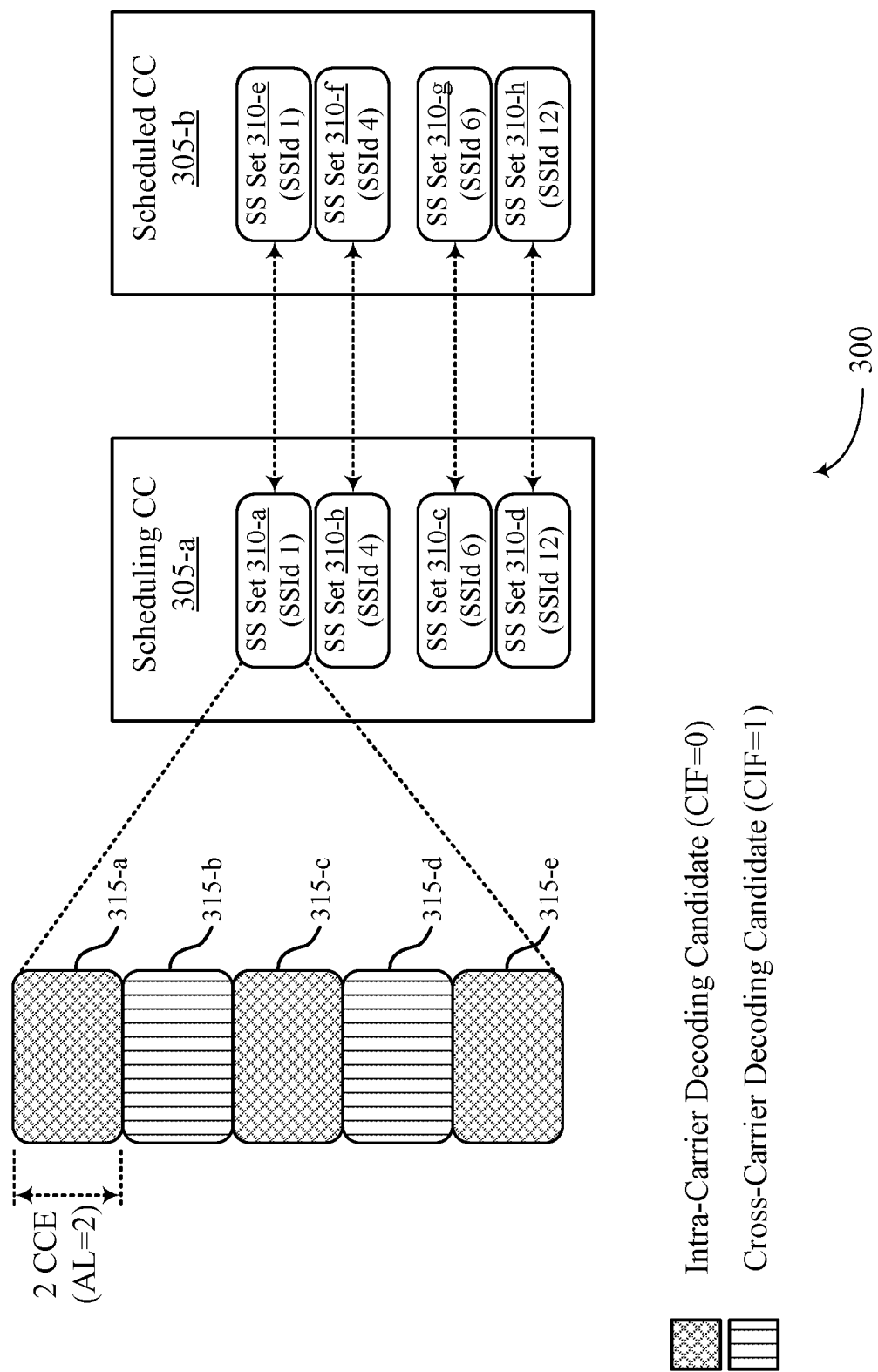
FIG. 3 illustrates an example of a resource condition that supports techniques for search space sharing for control channel repetition in accordance with aspects of the present disclosure.

FIG. 3 illustrates an example of a resource condition 300 that supports techniques for search space sharing for control channel repetition in accordance with aspects of the present disclosure. Aspects of the resource condition 200 may implement, or be implemented by, wireless communications system 100, resource condition 200, or both. The resource condition 300 illustrates conditions for intra-carrier and inter-carrier (e.g., cross-carrier) scheduling.

In some aspects, some wireless communications systems (e.g., wireless communications system 100) may be configured to support inter-carrier scheduling (e.g., cross-carrier scheduling), intra-carrier scheduling (e.g., self-scheduling), or both. Inter-carrier scheduling, or cross-carrier scheduling, refers to cases in which control signaling transmitted/received on a first component carrier (e.g., scheduling component carrier, scheduling cell) is used to schedule communications (e.g., PDSCH, PUSCH) on a different component carrier (e.g., scheduled component carrier, scheduled cell). Conversely, intra-carrier scheduling, or self-scheduling, refers to cases in which control signaling transmitted/received on a component carrier is used to schedule communications on the same component carrier (e.g., same cell).

For example, as shown in resource condition 300, a scheduling component carrier 305-$a$ may be associated with search space sets 310-$a$, 310-$b$, 310-$c$, 310-$d$ which are configured to schedule communications on a scheduled component carrier 305-$b$. In this regard, the search space sets 310 of the scheduling component carrier 305-$a$ may be configured for cross-carrier scheduling on the scheduled component carrier 305-$b$.

In some implementations, search space sets 310 with the same search space set index (searchSpaceId) within the scheduling component carrier 305-$a$ (e.g., scheduling cell) and the scheduled component carrier 305-$b$ (e.g., scheduled cell) may be associated with (e.g., linked to) one another. For example, the first search space set 310-$a$ with a first search space set index (e.g., searchSpaceId=1) on the scheduling component carrier 305-$a$ may be linked to the second search space set 310-$e$ with the first search space set index (e.g., searchSpaceId=1) on the scheduled component carrier 305-$b$ for cross-carrier scheduling. In particular, search space sets within the scheduled component carrier 305-$b$ may be linked to search space sets within the scheduling component carrier 305-$a$, where the condition of the search space sets within the scheduled component carrier 305-$b$ may be used to determine the number of decoding candidates which are to be monitored within the scheduling component carrier 305-$a$.

As such, the terms "linked," "linking," and like terms, may be used throughout the present disclosure in two different contexts. First, related PDCCH candidates within different search space sets may be said to be "linked" for PDCCH repetition, in which case multiple repetitions of the same control message may be transmitted/received within the linked PDCCH candidates. Second, search space sets within a scheduled component carrier may be said to be "linked" to search space sets within a scheduling component carrier for cross-carrier scheduling, in which case the condition of the search space sets within the scheduled component carrier may be used to determine the number of decoding candidates which are to be monitored within the search space sets of the scheduling component carrier.

In some aspects, cross-carrier scheduling may be performed only if the BWPs associated with linked search space sets 310 in scheduling component carrier 305-$a$ and the scheduled component carrier 305-$b$ are both active. Stated differently, and continuing with the example above, a UE 115 may be configured to apply a search space set 310 in the scheduling component carrier 305-$a$ for scheduling the scheduled component carrier 305-$b$ only if the downlink BWPs in which the linked search space sets 310 of the scheduled component carrier 305-$b$ and the scheduling component carrier 305-$a$ are both active.

For example, a UE 115 may be configured with a first search space set 310-$a$ on the scheduling component carrier 305-$a$ and a second search space set 310-$e$ on the scheduled component carrier 305-$b$, where the first and second search space sets 310-$a$, 310-$e$ are linked for cross-carrier scheduling. In this example, the UE 115 may be configured to perform cross-carrier scheduling (e.g., apply the first search space set 310-*a* of the scheduling component carrier 305-*a* for the scheduled component carrier 305-*b* for cross-carrier scheduling) only if a first BWP associated with the first search space set 310-*a* and a second BWP associated with the second search space set 310-*e* are both active. In some cases, the first BWP and the second BWP for the linked search space sets 310-*a*, 310-*e* may be the same.

The search space sets 310 of the scheduling component carrier 305-*a* may additionally, or alternatively, be configured for intra-carrier scheduling. In particular, a search space set 310 may include control channel candidates (e.g., PDCCH candidates) which are configured for self-scheduling, cross-carrier scheduling, or both. For example, the first search space set 310-*a* may include a first set of control channel candidates 315-*a*, 315-*c*, 315-*e* (e.g., PDCCH candidates) which are configured for intra-carrier scheduling (e.g., self-scheduling), and a second set of control channel candidates 315-*b*, 315-*d* which are configured for cross-carrier scheduling. In this regard, control signaling performed over the first set of control channel candidates 315-*a*, 315-*c*, 315-*e* may be used to schedule communications over the scheduling component carrier 305-*a*, whereas control signaling performed over the second set of control channel candidates 315-*b*, 315-*d* may be used to schedule communications over the scheduled component carrier 305-*b* (e.g., within the search space set 310-*e*).

In some aspects, a CIF within control signaling (e.g., DCI messages) may indicate whether the control signaling schedules communications within the same or different component carrier on which the control signaling was transmitted/received. For example, a DCI with a CIF value of zero (e.g., CIF=0) may indicate that the DCI schedules a communication on the same component carrier on which the DCI was transmitted/received. In this regard, a CIF value of zero may indicate self-scheduling. By way of another example, a DCI with a non-zero CIF value (e.g., CIF=1, 2, etc.) may indicate that the DCI schedules a communication on a different component carrier from the component carrier on which the DCI was transmitted/received. In this regard, a non-zero CIF value may indicate cross-carrier scheduling.

Moreover, the respective control channel candidates 315 may be associated with respective CIF values used for intra-carrier and cross-carrier scheduling. For example, as shown in resource condition 300, the first set of control channel candidates 315-*a*, 315-*c*, 315-*e* may be associated with a first CIF value (e.g., CIF=0) configured for intra-carrier scheduling, and the second set of control channel candidates 315-*b*, 315-*d* may be associated with a second CIF value (e.g., CIF=1) configured for cross-carrier scheduling. In some aspects, a CIF may be configured with zero to three bits. In cases where a DCI includes a CIF which is configured with zero bits, the DCI may only support self-scheduling.

The CCEs associated with control channel candidates 315 for different scheduled component carriers (e.g., first set of control channel candidates 315-*a*, 315-*c*, 315-*e* for self-scheduling, second set of control channel candidates 315-*b*, 315-*d* for cross-carrier scheduling) within a monitoring occasion of a search space set 310 may be separately identified based on a number of candidates for each aggregation level. The number of candidates for each aggregation level may be configured in the scheduled component carrier 305-*b*, and may be monitored in the scheduling component carrier 305-*a*. For example, the first search space set 310-*a* may include a monitoring occasion which includes a set of control channel candidates 315 with an aggregation level of two (e.g., two CCEs for each control channel candidate 315). In this example, the set of control channel candidates 315 may include the first subset of control channel candidates 315-*a*, 315-*c*, 315-*e* configured for self-scheduling (e.g., subset of PDCCH candidates with CIF=0), and a second subset of control channel candidates 315-*b*, 315-*d* for cross-carrier scheduling (e.g., subset of PDCCH candidates with CIF=1). In this regard, a single search space set 310 may include PDCCH candidates which are configured for self-scheduling, cross-carrier scheduling, or both. In some examples, time domain behavior, monitoring occasions, DCI formats to monitor, or any combination thereof, may be configured in search space (SS) sets of the scheduling cells and the number of candidates for each aggregation level may configured in a search space set (e.g., the search space set with the same index) of the scheduled cell. For instance, the dotted arrows in FIG. 3 represent the association (linking) of search space sets with the same search space set index in the scheduling cell and the scheduled cell (e.g., linking between the search space set 310-*a* of the scheduling component carrier 305-*a* and the search space set 310-*e* of the scheduled cell).

In some aspects, the scheduled component carrier 305-*b* (e.g., scheduled cell) may not be configured with a CORESET, but may be configured with search space sets 310 (e.g., search space sets 310-*e*, 310-*f*, 310-*g*, 310-*h*). For search space sets 310 configured in the scheduled component carrier 305-*b*, fields associated with search space set indexes (e.g., searchSpaceId), a number of control channel candidates per aggregation level (e.g., nrofCandidates) may be configured. Comparatively, other fields for search space sets 310 configured in the scheduled component carrier 305-*b* may be absent, or not configured, including fields associated with CORESETs, fields associated with time domain properties (e.g., periodicity, offset, duration, monitoring symbols per slot), fields associated with DCI formats to monitor, and the like. In particular, these fields (except for fields relating to a number of control channel candidates for each aggregation level) may be defined for a search space set 310 of the scheduling component carrier 305-*a* (e.g., the search space set with the same index) which schedules the respective scheduled component carrier 305-*b*.

In some examples, the resource condition 300 may illustrate conditions for search space sharing. For search space sharing, a control channel candidate 315, or a set of control channel candidates 315, associated with a first scheduled component carrier 305 may be used to receive PDCCH for a second scheduled component carrier 305. If a DCI size corresponding to the first scheduled component carrier 305 is the same as a DCI size corresponding to the second scheduled component carrier 305, then a PDCCH candidate associated with the first scheduled component carrier 305 may be used to receive PDCCH for the second scheduled component carrier 305. For example, control channel candidate 315-*a* (e.g., associated with scheduled component carrier 305-*a*) may be used to receive PDCCH for scheduled component carrier 305-*b*.

In some cases, search space sharing may be applied for uplink and downlink DCI formats other than fallback DCI. For example, for uplink-associated DCI, search space sharing may be used for a DCI format scheduling a PUSCH transmission or an uplink grant Type 2 PUSCH release, other than DCI format 0_0. For downlink-associated DCI, search space sharing may be used for a DCI format scheduling PDSCH repetition, SPS PDSCH release, or indicating secondary cell dormancy, or other formats besides DCI format 1_0. DCI size may be determined based on various conditions per scheduled component carrier. In some cases, for cross-carrier scheduling, a UE 115 may indicate (e.g., through UE capability signaling) the support of search space sharing for downlink (e.g., via a "searchSpaceSharingCA-DL" parameter), uplink (e.g., via a "searchSpaceSharingCA-UL" parameter), or both. In some systems, if the UE 115 indicates support for search space sharing, then search space sharing may be applicable for supporting control signaling formats.

In some aspects, aspects of the resource condition 300 may support techniques for search space sharing and control channel repetition (e.g., PDCCH repetition). In particular, aspects of the resource condition 300 may support techniques and configurations which enable one or more rules or conditions to support both search space sharing and control channel repetition, as will be described in further detail herein with respect to FIGS. 4-6.

Figure 4:
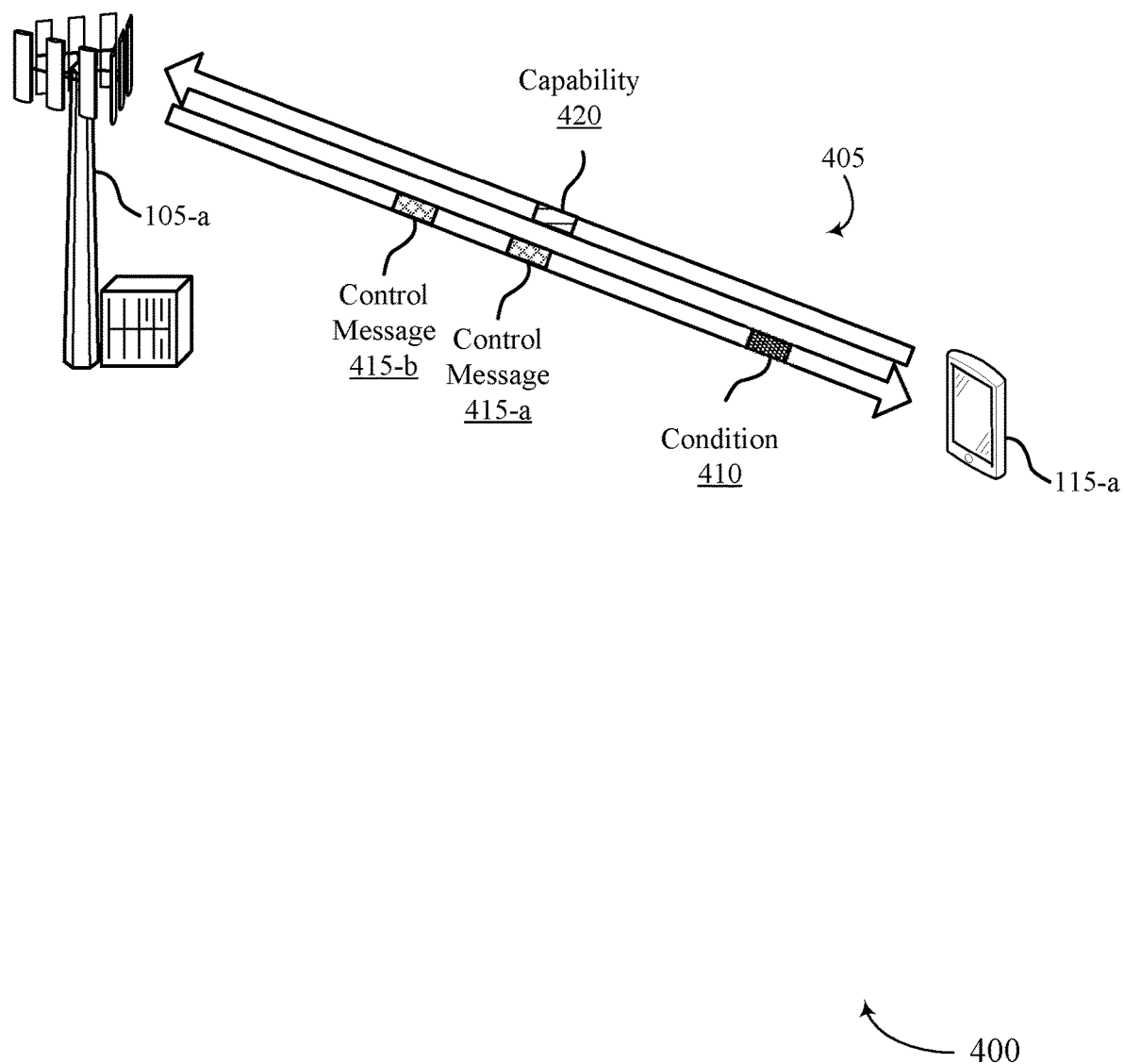
FIG. 4 illustrates an example of a wireless communications system that supports techniques for search space sharing for control channel repetition in accordance with aspects of the present disclosure.

FIG. 4 illustrates an example of a wireless communications system 400 that supports techniques for search space sharing for control channel repetition in accordance with aspects of the present disclosure. In some examples, wireless communications system 400 may implement, or be implemented by, aspects of wireless communications system 100, resource condition 200, resource condition 300, or any combination thereof. For example, wireless communications system 400 may support control conditions for search space sharing and control channel repetition techniques, as described in FIGS. 1-3.

The wireless communications system 400 may include a base station 105-a and a UE 115-a, which may be examples base stations 105 and UEs 115 as described with reference to FIG. 1. The UE 115-a may communicate with the base station 105-a using a communication link 405, which may be an example of an NR or LTE link between the UE 115-a and the base station 105-a, or by communicating with an access network entity 140. In some cases, the communication link 405 between the UE 115-a and the base station 105-a may include an example of an access link (e.g., Uu link) which may include a bi-directional link that enables both uplink and downlink communication. For example, the UE 115-a may transmit uplink signals, such as uplink control signals or uplink data signals, to the base station 105-a using the communication link 405 and the base station 105-a may transmit downlink signals, such as downlink control signals or downlink data signals, to the UE 115-a using the communication link 405.

In some aspects, the UE 115-a and the base station 105-b of the wireless communications system 400 may support techniques for search space sharing and control channel repetition. In particular, the UE 115-a and the base station 105-a of the wireless communications system 400 may support techniques and configurations which enable multiple search space sets on a scheduled component carrier to be linked for control channel repetition while also supporting search space sharing between search spaces in one or more of the search space sets.

In some aspects, the UE 115-a and the base station 105-a of the wireless communications system 400 may support techniques for control channel repetition (e.g., PDCCH repetition) across multiple component carriers for cross-carrier scheduling. In particular, techniques described herein support techniques for "linking" PDCCH candidates across multiple scheduling component carriers for PDCCH repetition, where the multiple PDCCH candidates may be used to schedule communications within a scheduled component carrier. As such, techniques described herein may enable a communication on a scheduled component carrier to be scheduled by repetitions of control messages transmitted/received across multiple scheduling component carriers.

In some instances, a UE may be configured with cross-carrier scheduling such that two different scheduling component carriers are configured to schedule one scheduled component carrier, and two SS sets on the two scheduling component carriers can be linked for PDCCH repetition to schedule PDSCH and/or PUSCH on the scheduled cell. One PDCCH candidate in a monitoring occasion of a first search space set on a first scheduling component carrier (CC) may be linked with another PDCCH candidate in a monitoring occasion of a second SS set on a second scheduling component carrier. DCI formats 0_1/0_2 (e.g., for scheduling PUSCH or uplink Type2 CG release) or DCI formats 1_1/1_2 (e.g., for scheduling PDSCH or SPS release) may be detected in the linked PDCCH candidates across the two scheduling component carriers. As described in some examples herein, a scheduled component carrier is the same as one of the two scheduling component carriers. For example, the two scheduling component carriers may be a PCell and an sSCell (scheduling SCell), and the scheduled cell is PCell. In other examples, the scheduled component carrier is a third component carrier that is different than the scheduling component carriers.

For example, the UE 115-a may receive, from the base station 105-a, a condition 410 for scheduling communications on one or more component carriers. The condition 410 may be transmitted via control signaling, including an RRC message, a synchronization signal block (SSB) message, a DCI message, or any combination thereof. In some aspects, the condition 410 may indicate multiple downlink control channel candidates or multiple sets of downlink control channel candidates, which may be linked for control channel repetition or unlinked for control channel repetition. The downlink control channel candidates may be used to schedule communications on the one or more component carriers.

For example, the UE 115-a may receive control signaling (e.g., the condition 410) indicating a first search space set and a second search space set and multiple sets of control channel candidates. A first set of control channel decoding candidates (e.g., PDCCH candidates) associated with scheduling a first component carrier, and the first set of control channel decoding candidates may be linked for control channel repetition (e.g., PDCCH repetition). A second set of control channel decoding candidates may be associated with scheduling a second component carrier, and the second set of control channel decoding candidates may be unlinked across the first search space set.

In some cases, the UE 115-a may receive, from the base station 105-a control signaling (e.g., RRC message, DCI message) indicating a search space set linking condition for a set of search space sets of the scheduled component carrier. In some cases, the UE 115-a may receive the control signaling indicating the search space set linking condition based on receiving the control signaling including the condition 410. Additionally, or alternatively, the condition 410 and the search space set linking condition may be communicated within the same control signaling (e.g., via the same RRC message). Moreover, in some cases, the UE 115-a may be configured (e.g., pre-configured) with the search space set linking condition.

In some aspects, the UE 115-a, the base station 105-a, or both, may identify the search space set linking condition. In some aspects, the UE 115-a and/or the base station 105-a may identify the search space set linking condition based on transmitting/receiving the control signaling indicating the search space set linking condition. Additionally, or alternatively, the UE 115-*a* may identify the search space set linking condition based on transmitting/receiving the control signaling including the condition 410. Moreover, in some cases, the UE 115-*a* may be configured (e.g., pre-configured) with the search space set linking condition, and may therefore be configured to identify the search space set linking condition without control signaling from the base station 105-*a*.

In some aspects, the search space set linking condition may indicate whether search space sets on a scheduled component carrier are linked or unlinked for control channel repetition. That is, the search space set linking condition may indicate whether control channel repetition over the search space sets of the scheduling component carrier may be used to schedule communications within the search space sets of the scheduled component carrier. If two or more search space sets on the scheduling component carrier are linked for control channel repetition, then control channel repetition on a scheduling component carrier may be used to schedule communications on a scheduled component carrier with a number of PDCCH candidates that are determined from the two or more search space sets of the scheduled component carrier. Conversely, if two or more search space sets on the scheduling component carrier are not linked (e.g., unlinked) for control channel repetition, then control channel repetition on the scheduling component carrier may not be used to schedule communications on the two or more search space sets of the scheduled component carrier. In some aspects, due to the fact that the scheduled component carrier is scheduled via control signaling on the scheduling component carrier, search space sets of the scheduled component carrier may not actually be monitored by the UE 115-*a*, and may therefore be referred to as "dummy" search space sets.

Accordingly, by identifying the search space set linking condition, the UE 115-*a* and the base station 105-*a* may be configured to identify whether search space sets of the scheduled component carrier are linked or unlinked for control channel repetition. In some aspects, the UE 115-*a* and/or the base station 105-*a* may identify whether search space sets of the scheduled component carrier are linked or unlinked for control channel repetition based on explicit signaling, the scheduling configuration, based on search space set indexes associated with search space sets of the scheduling component carrier and/or scheduled component carrier, quantities of decoding candidates per aggregation level, pre-defined rules, or any combination thereof.

The UE 115-*a* or the base station 105-*a*, or both, may identify a condition for search space sharing. Based on the condition for search space sharing, the UE 115-*a* or the base station 105-*a*, or both, may determine whether search space sharing is supported between two sets of control channel decoding candidates in the first search space set or the second search space set, or both. For example, the condition for search space sharing may include a set of rules which correspond to whether search space sharing is supported between any two sets of control channel candidates associated with different scheduled component carriers. For example, the condition may indicate whether search space sharing is supported for two sets of 5 candidates which are both linked for PDCCH repetition, both unlinked for PDCCH repetition, linked and unlinked for PDCCH repetition, or based on other conditions for the sets of control channel candidates.

In some cases, the condition for search space sharing may be based on the condition 410 indicating conditions for the search space sets. Additionally, or alternatively, the condition for the search space sharing may be configured separately from the condition 410, such as through RRC signaling, system information, or downlink control information, or any combination thereof. For example, the condition may be preconfigured, and the UE 115-*a* may identify which sets of control channel candidates can be used for search space sharing based on whether the sets of control channel candidates are configured or not for PDCCH repetition and the search space sharing condition.

In an example, search space sharing may be supported between linked and unlinked sets of control channel candidates. For example, search space sharing may be applicable between the first set of PDCCH candidates and the second set of PDCCH candidates. Although the first set of PDCCH candidates is linked for PDCCH repetition and the second set of PDCCH candidates is not linked for PDCCH repetition, a candidate or a pair of linked candidates associated with the first scheduled cell may be used to receive PDCCH signaling for the second scheduled cell. For example, the UE 115-*a* may receive PDCCH signaling for the second scheduled component carrier using one or more linked PDCCH candidates associated with the first scheduled component carrier in the first search space set or using one or more linked PDCCH candidates in the second search space set. Similarly, a candidate associated with the second scheduled cell in either of the linked search space sets may be used to receive a PDCCH for the first scheduled cell.

In some other examples, search space sharing may be applicable between two sets of PDCCH candidates that are both linked for PDCCH repetition or between two sets of PDCCH candidates that are both unlinked for PDCCH repetition. For example, search space sharing may not be supported between the first set of PDCCH candidates and the second set of PDCCH candidates. However, search space sharing may be supported between the first set of PDCCH candidates and a third set of PDCCH candidates which are used to schedule a third cell or third component carrier, where the third set of PDCCH candidates are configured for PDCCH repetitions across the first and second search space sets. In this example, search space sharing may also be supported between the second set of PDCCH candidates and a fourth set of PDCCH candidates which are associated with a fourth scheduled cell, where the fourth set of PDCCH candidates are unlinked, or not configured, for PDCCH repetition. However, a candidate or pair of linked candidates associated with the first scheduled cell in one or two linked search space sets may not be used to receive PDCCH for the second scheduled cell. Similarly, a candidate associated with the second scheduled cell in either of the linked search space sets may not be used to receive PDCCH signaling for the first scheduled cell.

In some other examples, search space sharing may be applied between candidates in a given search space set but not applied to linked candidates. For example, a candidate in a given search space set associated with a first scheduled component carrier may be used to receive PDCCH signaling associated with a second scheduled component carrier. However, two linked candidates in the two search space sets associated with the first scheduled cell may not be used to receive PDCCH signaling associated with the second scheduled cell. For example, if control channel candidates are present in the first search space set, then a first set of control channel candidates associated with the first scheduling cell in the first search space set may be used to receive PDCCH signaling associated with the second scheduled component carrier. However, a third set of control channel candidates in the second search space set which are linked to the first set of control channel candidates may not be used to receive the PDCCH signaling associated with the second scheduled component carrier.

In some cases, search space sharing may not be applied to candidates in monitoring occasions of the first search space set or the second search space set. For example, control channel candidates associated with the first scheduled component carrier or the second scheduled component carrier, or any other scheduled component carrier that is present in a monitoring occasion with the first search space set or the second search space set, may not support search space sharing.

The UE 115-*a* may monitor control channel candidates for control signaling in the first search space set or second search space set, or both, based on the search space sharing condition. The UE 115-*a* may monitor the first set of control channel candidates or the second set of control channel candidates, or both, for a first control message 415-*a* or a second control message 415-*b*, or both, based on the search space sharing condition.

In a first example, the search space sharing condition may support search space sharing between linked and unlinked control channel candidates. For example, the UE 115-*a* may receive the first control message 415-*a* on a first decoding candidate in the first search space set of the first set of control channel decoding candidates associated with scheduling the first component carrier, where the first control message 415-*a* schedules the second component carrier. In some cases, the UE 115-*a* may receive the second control message 415-*b* on a second decoding candidate in the second search space set of the first set of control channel decoding candidates associated with scheduling the first component carrier. The second control message 415-*b* may be a repetition of the first control message 415-*a* based on the control channel repetition configured for the first set of control channel decoding candidates and used to schedule the second scheduled component carrier. Therefore, a PDCCH candidate associated with the first scheduled cell may be used to receive control signaling for the second scheduled cell. In some cases, the control signaling for the second scheduled cell may be sent on both PDCCH candidates of a linked pair of PDCCH candidates. In some other examples, search space sharing may be applicable between candidates in a given search space set and not applicable to linked candidates. For example, in some cases, the UE 115-*a* may just receive the first control message 415-*a* on the first decoding candidate in the first search space set, as search space sharing may not be supported for the linked, second decoding candidate in the second search space set.

In some examples, the search space sharing condition may support search space sharing between two sets of PDCCH candidates which are both linked or between two sets of PDCCH candidates which are both unlinked, but not between a linked set of PDCCH candidates and an unlinked set of PDCCH candidates. For example, the first set of control channel decoding candidates may not be used to receive control signaling for the second scheduled cell, as the first set of control channel decoding candidates are linked for PDCCH repetition, and the second set of control channel decoding candidates are not linked for PDCCH repetition. However, a first decoding candidate of the first set of control channel decoding candidates may be used to receive the first control message 415-*a* scheduling a third component carrier if a third set of control channel decoding candidates associated with the third component carrier are linked for control channel repetition (e.g., across the first search space set and the second search space set).

In some cases, the search space sharing may not be supported for any candidate in the monitoring occasion of either of the two search space sets. For example, search space sharing may not be supported for the first set of control channel decoding candidates or the second set of control channel decoding candidates, or control channel decoding candidates associated with any other cells in the first search space set or the second search space set.

In some cases, the UE 115-*a* may send signaling indicating a UE capability to support search space sharing. In some cases, UE 115-*a* may indicate support for uplink search space sharing or downlink search space sharing, or both. In some cases, the UE capability may indicate that the UE 115-*a* supports search space sharing applicable to unlinked search space sets (e.g., not configured for PDCCH repetition). In this example, the UE 115-*a* may send an additional UE capability, which may indicate whether the UE 115-*a* supports search space sharing in the presence of PDCCH repetition (e.g., linked candidates). For example, the UE 115-*a* may indicate whether the UE 115-*a* can support search space sharing when control channel repetition is not configured. Additionally, the UE 115-*a* may indicate whether the UE 115-*a* can support search space sharing when control channel repetition is configured. This may provide some granularity for supporting search space sharing at different levels of complexity. Therefore, some lower capability UEs 115 may support search space sharing in some situations (e.g., lower complexity situations). In some cases, the UE 115-*a* may indicate a UE 115-*a* capability corresponding to whether the UE 115-*a* is capable of supporting search space sharing for any search space set, regardless of a control channel repetition condition. For example, instead of higher level granularity for search space sharing capability, the UE 115-*a* may indicate a single UE capability corresponding to whether the UE 115-*a* supports search space sharing or not.

In some cases, the network may configure to enable or disable search space sharing. For example, the base station 105-*a* may send RRC signaling to enable or disable (e.g., toggle) a search space sharing condition. The search space sharing condition may be enabled or disabled per cell group, per scheduling cell, per pair of scheduled cells, per search space set, or any combination thereof. To enable or disable search space sharing per cell group, the base station 105-*a* may enable or disable search space sharing for each master cell group or secondary cell group in dual connectivity schemes or for one or more component carriers in a carrier aggregation scheme. Toggling per cell group may apply to all component carriers. For example, when configured for cross-carrier scheduling, the component carriers may be scheduled form the same scheduling cell, and DCI size may be the same.

For enabling or disabling search space sharing per scheduling cell, the toggling may apply to all cells that are configured to be scheduled from the scheduling cell. For example, the DCI size for the scheduled cells may be the same. For enabling or disabling search space sharing per pair of scheduled cells, the toggling may apply to the pair of scheduled cells (e.g., when both cells are scheduled from the same scheduling cell and the DCI sizes are the same). For enabling or disabling search space sharing for a search space set (e.g., for individual or unlinked candidates) or a pair of linked search space sets (e.g., for linked candidates), the toggling may apply to the candidates in the search space set or linked candidates in the linked search space sets for scheduled cells in the monitoring occasion of the search space set or the monitoring occasion of the linked search space set.

Figure 5:
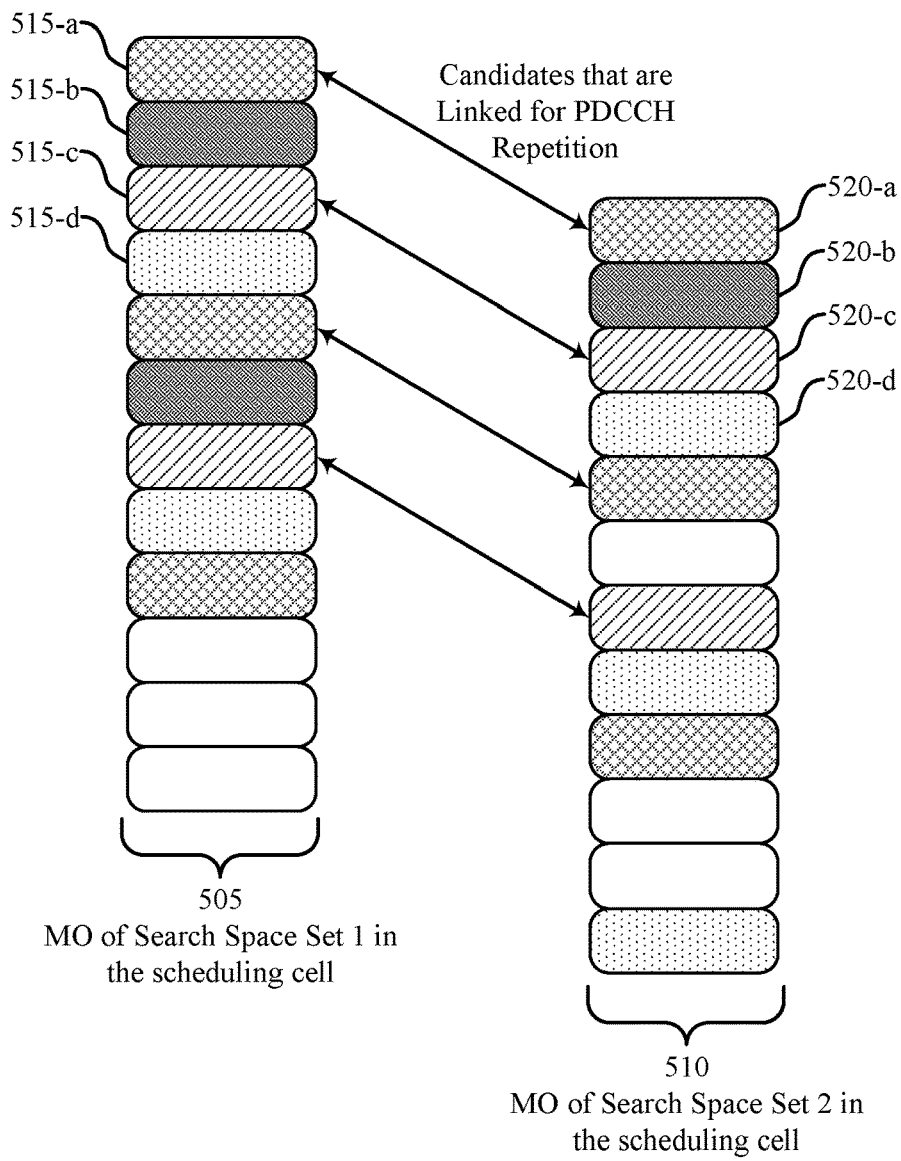
FIG. 5 illustrates an example of a resource condition that supports techniques for search space sharing for control channel repetition in accordance with aspects of the present disclosure.

FIG. 5 illustrates an example of a resource condition 500 that supports techniques for search space sharing for control channel repetition in accordance with aspects of the present disclosure. In some examples, resource condition 500 may implement, or be implemented by, aspects of wireless communications system 100, resource condition 200, resource condition 300, wireless communications system 400, or any combination thereof. For example, the resource condition 500 be an example of a condition of resources between a UE 115 and a base station 105 which supports search space sharing and control channel repetition techniques, as described with reference to FIGS. 1-4.

A UE 115 and a base station 105 may support techniques for search space sharing and control channel repetition. In particular, the UE 115 and the base station 105 of the wireless communications system 400 may support techniques and configurations which enable multiple search space sets for a scheduled component carrier to be linked for control channel repetition while also supporting search space sharing between control channel decoding candidates in one or more of the search space sets.

In the example of the resource condition 500, a first search space set 505 in a first monitoring occasion and second search space set 510 in a second monitoring occasion may include sets of control channel decoding candidates corresponding to four different scheduled cells. For example, each search space set may include one or more control channel decoding candidates corresponding to a first scheduled component carrier (e.g., CC0 with CIF value of 0), a second scheduled component carrier (e.g., CC1 with a CIF value of 1), a third scheduled component carrier (e.g., CC2 with a CIF value of 2), and a fourth scheduled component carrier (e.g., CC3 with a CIF value for 3).

A first set of control channel candidates associated with CC0 may be configured for control channel repetition across the first search space set 505 and the second search space set 510. For example, a control channel candidate 515-*a* may be linked to a control channel candidate 520-*a*, where a control message received on the control channel candidate 515-*a* may be duplicated, such that a repetition of the control message is received on the control channel candidate 520-*a*. In some cases, a third set of control channel candidates associated with CC2 may also be configured for control channel repetition, where control channel candidate 515-*c* may be linked with control channel candidate 520-*c*.

A second set of control channel candidates associated with CC1 may be unlinked or not configured for control channel repetition. For example, control channel candidate 515-*b* and control channel candidate 520-*b* may be unlinked or individual control channel candidates. In some cases, a fourth set of control channel candidates associated with CC3 may also be unlinked, where control channel candidate 515-*d* and control channel candidate 520-*d* may each be used for control signaling for CC3, but the control channel candidates 515-*d* and 520-*d* may be individual or unlinked.

The UE 115 may identify a search space sharing condition, which may indicate how search space sharing may or may not be implemented for the different control channel candidates 515 and 520.

In a first example, search space sharing may be supported between linked and unlinked sets of control channel candidates. For example, search space sharing may be applicable between the first set of control channel candidates associated with CC0 and the second set of control channel candidates associated with CC1. For example, control channel candidate 515-*a* may be used to receive control signaling for CC1. In some cases, a repetition of the control signaling for CC1 may be received on control channel candidate 520-*a*. In some cases, control channel candidate 515-*b* or control channel candidate 520-*b* may be used to receive control signaling for CC0.

In some cases, regardless of which scheduled cell, search space sharing may be applied between candidates in a given search space set and not applied to linked candidates. For example, if control channel candidate 515-*a* is used to receive control signaling for CC1, the linked candidate (e.g., control channel candidate 520-*a*) may not be used for a repetition of the control signaling. This technique may reduce a number of blind decoding performed by the UE 115, as the UE 115 may not perform additional blind decoding on linked candidates for each possible component carrier individually as well as additional blind decoding for soft combining the linked control channel candidates.

In a second example, search space sharing may be applied for two sets of control channel candidates which are either both linked for control channel repetition or both unlinked for control channel repetition. For example, search space sharing is applicable between scheduled cells CC0 and CC2 (e.g., for each pair of linked candidates in two linked search space sets) as well as between scheduled cells CC1 and CC3 (e.g., for each individual candidate in either of the SS sets). Search space sharing may not be applicable between CC0 and CC1, CC0 and CC3, CC2 and CC1, or CC2 and CC3 in this example.

In the second example, search space sharing may be used between the first set of control channel candidates associated with CC0 and the third set of control channel candidates associated with CC2. In this example, control signaling for CC0 may be received on control channel candidate 515-*c* or control channel candidate 520-*c*, or both. Similarly, control signaling for CC2 may be received on control channel candidate 515-*a* or control channel candidate 520-*a*, or both. For example, a repetition of the control signaling may be received on both linked control channel candidates. In some other examples, the control signaling may be received on just one of the linked control channel candidates. A candidate or a pair of linked candidates associated with the first scheduled cell (e.g., CC0) in one or two linked search space sets (e.g., first search space set 505 and second search space set 510) may not be used to receive a PDCCH for the second scheduled cell (e.g., CC1), but the candidate or pair of linked candidates may be used to receive PDCCH for the third scheduled cell (e.g., CC2).

In the second example, search space sharing may also be used for the second set of control channel candidates associated with CC1 and the third set of control channel candidates associated with CC3. For example, control signaling for CC3 may be received on control channel candidate 515-*b* or control channel candidate 520-*b*, and control signaling for CC1 may be received on control channel candidate 515-*d* or control channel candidate 520-*d*. A control channel candidate associated with the second scheduled cell (e.g., CC1) in either of the first search space set 505 or the second search space set 510 may not be used to receive a PDCCH for the first scheduled cell (e.g., CC0) but may be used to receive PDCCH for the fourth scheduled cell (e.g., CC3).

In some cases, search space sharing may not be applied to candidates in monitoring occasions of the first search space set 505 or the second search space set 510. For example, none of the control channel candidates 515 or the control channel candidates 520 may support search space sharing.

The UE 115 may monitor control channel candidates for control signaling in the first search space set or second search space set, or both, based on the search space sharing condition. The UE 115 may monitor the first set of control channel candidates (e.g., corresponding to CC0) or the second set of control channel candidates (e.g., corresponding to CC1), or both, for a first control message or a second control message, or both, based on the search space sharing condition.

Figure 6:
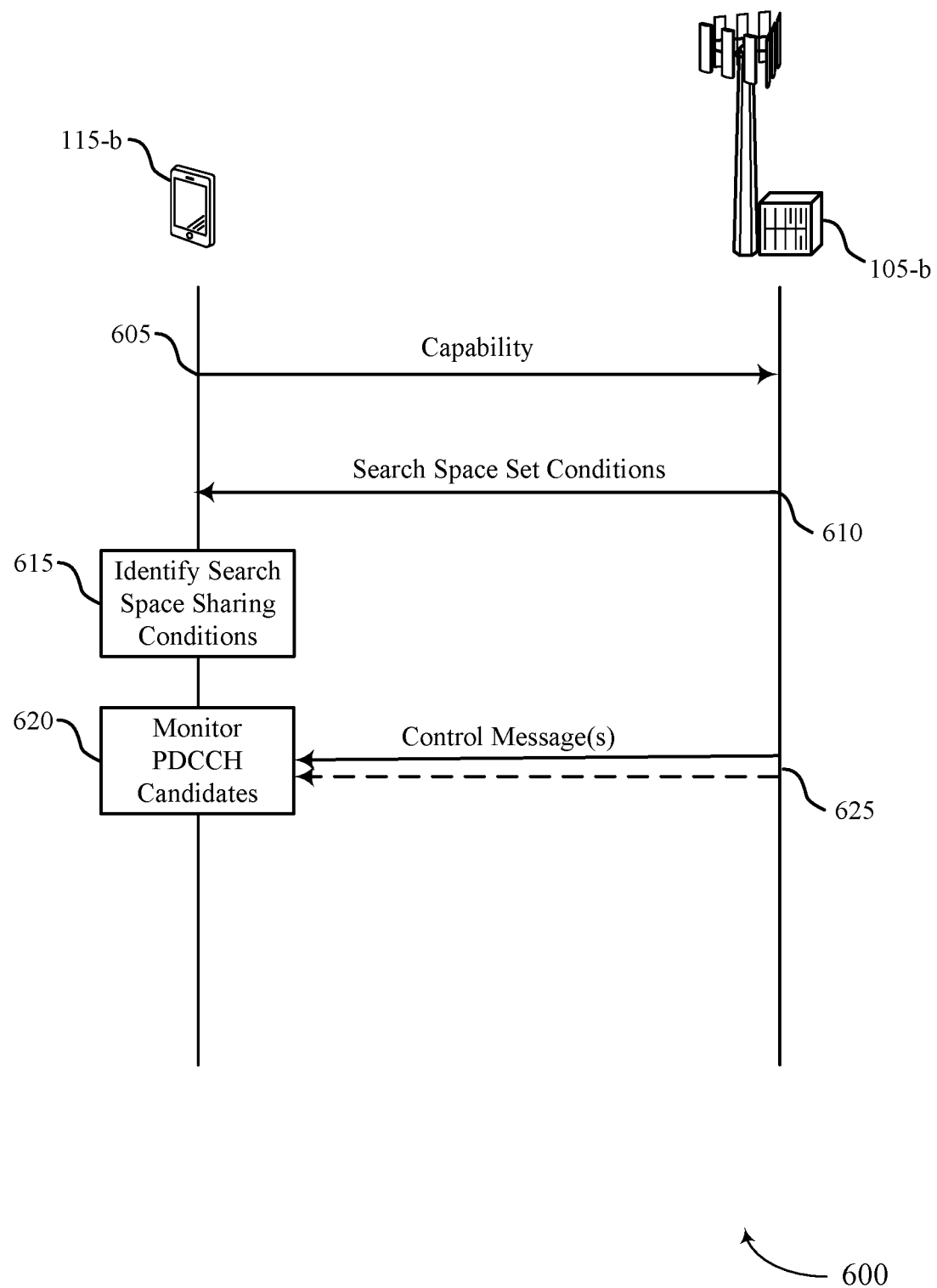
FIG. 6 illustrates an example of a process flow that supports techniques for search space sharing for control channel repetition in accordance with aspects of the present disclosure.

FIG. 6 illustrates an example of a process flow 600 that supports techniques for search space sharing for control channel repetition in accordance with aspects of the present disclosure. In some examples, process flow 600 may implement, or be implemented by, aspects of wireless communications systems 100, resource condition 200, resource condition 300, wireless communications system 400, resource condition 500, or any combination thereof. For example, the process flow 600 may illustrate a UE 115-*b* receiving a scheduling condition for cross-carrier scheduling of a first component carrier, receiving at least one repetition of a control message in accordance with the scheduling condition, and performing a communication scheduled by the at least one repetition of the control message over the first component carrier, as described with reference to FIGS. 1-5.

In some cases, process flow 600 may include a UE 115-*b* and a base station 105-*b*, which may be examples of corresponding devices as described herein. In particular, the UE 115-*b* and the base station 105-*b* illustrated in FIG. 6 may include examples of the UE 115-*a* and the base station 105-*a* illustrated in FIG. 4. In some cases, the base stations 105-*b* may be an example of an access network entity 140 as described herein.

In some examples, the operations illustrated in process flow 600 may be performed by hardware (e.g., including circuitry, processing blocks, logic components, and other components), code (e.g., software) executed by a processor, or any combination thereof. Alternative examples of the following may be implemented, where some steps are performed in a different order than described or are not performed at all. In some cases, steps may include additional features not mentioned below, or further steps may be added.

In some cases, at 605, the UE 115-*b* may transmit, to the base station 105-*b*, an indication of a UE capability for search space sharing. In some cases, the indication of the UE capability may indicate that the UE is capable of search space sharing between sets of control channel decoding candidates which are unlinked for control channel repetition. In some cases, the indication of the UE capability may further indicate that the UE is capable of search space sharing between sets of control channel decoding candidates which are linked for control channel repetition. In some cases, the indication may indicate that the UE is capable of search space sharing associated with control channel repetition (e.g., regardless of whether control channel decoding candidates are configured for control channel repetition or not).

At 610, the UE 115-*b* may receive, from the base station 105-*b*, control signaling indicating a first search space set and a second search space set, where a first set of control channel decoding candidates associated with scheduling a first component carrier (e.g., CC0) are linked for control channel repetition across the first search space set and the second search space set, and a second set of control channel decoding candidates associated with scheduling a second component carrier (e.g., CC1) are unlinked across the first search space set and the second search space set. In some cases, the UE 115-*b* may receive signaling configuring the control channel repetition in the same control signaling or in separate control signaling.

At 615, the UE 115-*b* may identify a search space sharing condition. For example, the UE 115-*b* may identify a search space sharing condition, which may indicate how search space sharing may or may not be implemented for the different control channel candidates corresponding to the first and second scheduled cells. The UE 115-*b* may identify the search space sharing condition based on whether the first set of control channel decoding candidates associated with scheduling a first component carrier are linked for control channel repetition across the first search space set and the second search space set, and the second set of control channel decoding candidates associated with scheduling a second component carrier are unlinked across the first search space set and the second search space set. The UE 115-*b* may monitor the first set of control channel decoding candidates, the second set of control channel decoding candidates, or both, in accordance with the search space sharing condition.

For a first condition, search space sharing may be supported between linked and unlinked sets of control channel candidates. For example, search space sharing may be applicable between the first set of control channel candidates associated with CC0 and the second set of control channel candidates associated with CC1. In a first example of the first condition, the UE 115-*b* may receive, on a first decoding candidate of the first search space set of the first set of control channel decoding candidates associated with scheduling the first component carrier, a first control message scheduling the second component carrier based on the search space sharing condition indicating that search space sharing is configured for the first set of control channel decoding candidates and the second set of control channel decoding candidates. In a second example of the first condition, the UE 115-*b* may receive on a first decoding candidate of the second set of control channel decoding candidates associated with scheduling the second component carrier in the first search space set, a first control message scheduling the first component carrier based on the search space sharing condition indicating that search space sharing is configured for the first set of control channel decoding candidates and the second set of control channel decoding candidates.

In some cases of the first condition, search space sharing may be applied to linked candidates. In this example, the UE 115-*b* may receive, on a second decoding candidate in the second search space set of the first set of control channel decoding candidates associated with scheduling the first component carrier, a repetition of the first control message scheduling the second component carrier based on the search space sharing condition and the first set of control channel decoding candidates being linked for control channel repetition across the first search space set and the second search space set.

In some cases of the first condition, search space sharing may be applied between candidates in a single search space search space set but not applied to linked candidates in other search spaces. For example, if the first decoding candidate is used to receive control signaling for CC1, the second (e.g., linked) candidate may not be used to receive a repetition of the control signaling.

For a second condition, search space sharing may be applied for two sets of control channel candidates which are either both linked for control channel repetition or both unlinked for control channel repetition. For example, search space sharing is applicable between two scheduled cells with sets of control channel decoding candidates that are both configured for PDCCH repetition. Or, search space sharing may be applicable between two scheduled cells with sets of control channel decoding candidates that are both unlinked for PDCCH repetition.

For a first example of the second condition, UE 115-*b* may receive, on a first decoding candidate in the first search space set of the first set of control channel decoding candidates associated with scheduling the first component carrier, a first control message scheduling a third component carrier based at least in part on the search space sharing condition, the search space sharing condition indicating that the first set of control channel decoding candidates associated with scheduling the first component carrier is configured for search space sharing based on the first set of control channel decoding candidates being linked for control channel repetition across the first search space set and the second search space set and a third set of control channel decoding candidates associated with scheduling the third component carrier being linked for control channel repetition across the first search space set and the second search space set. In this example, both the first set of decoding candidates and the third set of decoding candidates may be configured for control channel repetition and therefore may support search space sharing between the first set of control channel decoding candidates and the second set of control channel decoding candidates. In some cases, the search space sharing may also be applied for repetitions, or linked candidates. For example, UE 115-*b* may receive, on a second decoding candidate in the second search space set of the first set of control channel decoding candidates associated with scheduling the first component carrier, a repetition of the first control message scheduling the third component carrier.

In a second example of the second condition, UE 115-*b* may receive, on a first decoding candidate in the first search space set of the second set of control channel decoding candidates associated with scheduling the second component carrier, a first control message scheduling a third component carrier based on the search space sharing condition, the search space sharing condition indicating that the second set of control channel decoding candidates associated with scheduling the second component carrier is configured for search space sharing based on the second set of control channel decoding candidates being unlinked across the first search space set and the second search space set and a third set of control channel decoding candidates associated with scheduling the third component carrier being unlinked across the first search space set and the second search space set. The second example of the second condition may be an example of search space sharing between unlinked sets of control channel candidates.

In some cases, search space sharing may not be applied to candidates in monitoring occasions of the first search space set or the second search space set. For example, the UE 115-*b* may identify that the search space sharing condition indicates that search space sharing is unconfigured between the first set of control channel decoding candidates and the second set of control channel candidates based at on the first set of candidates being linked for control channel repetition across the first search space set and the second search space set, and the second set of candidates being unlinked for control channel repetition across the first search space set and the second search space set. In some cases, the UE 115-*b* may identify that the search space sharing condition indicates that search space sharing is unconfigured for any decoding candidate of the first search space set and the second search space set.

In some cases, the base station 105-*b* may transmit signaling to enable or disable search space sharing. For example, the UE 115-*b* may receive, from the base station 105-*b*, a second control signaling to enable or disable the search space sharing condition. In some cases, the UE 115-*b* may receive the second control signaling to enable or disable the search space sharing condition for one or more cell groups, one or more component carriers including a set of control channel decoding candidates configured for the UE, one or more pairs of scheduled component carriers, one or more search space sets, or any combination thereof. In some cases, the second control signaling may be transmitted via RRC signaling.

Figure 7:
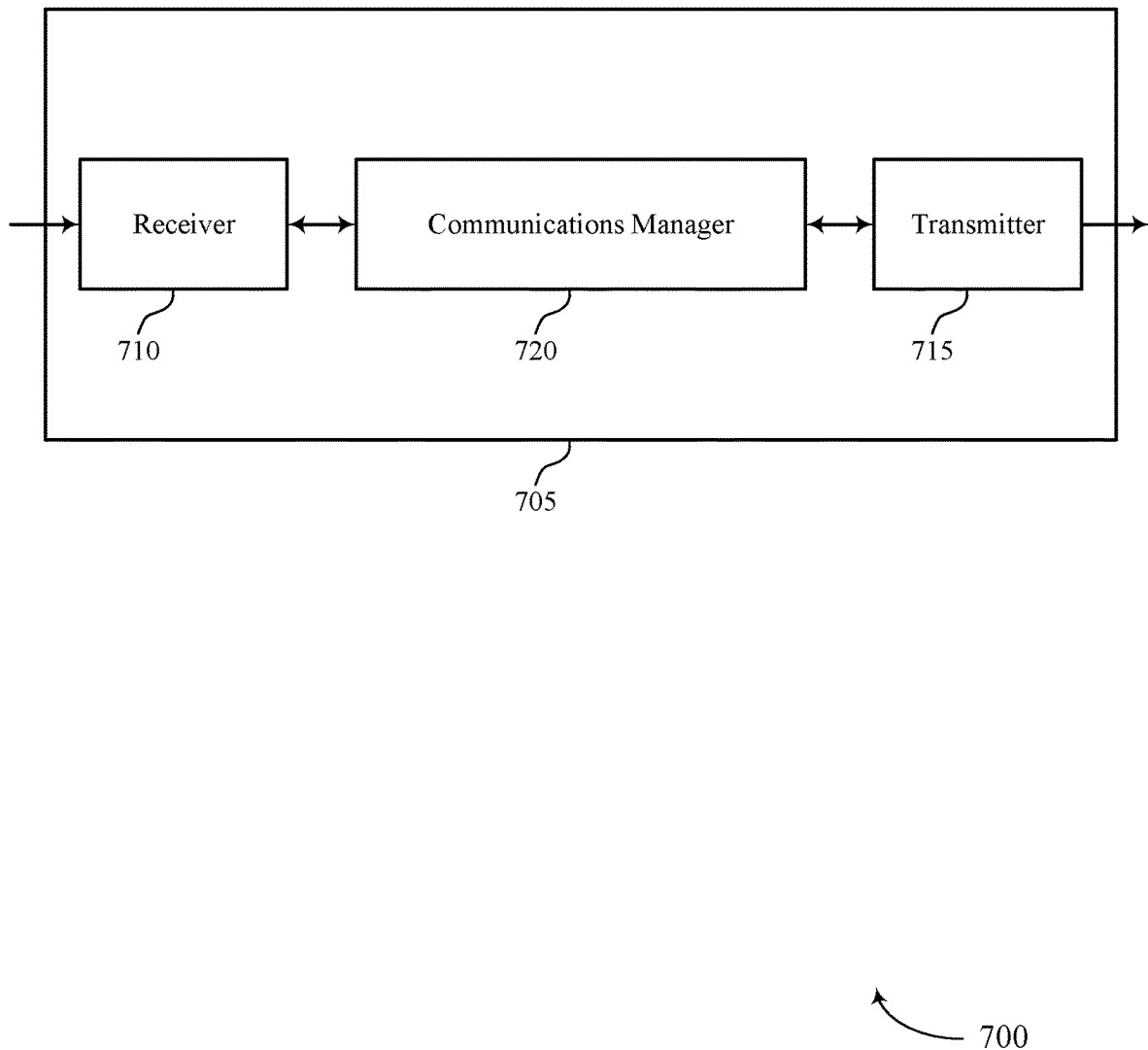
FIGS. 7 and 8 show block diagrams of devices that support techniques for search space sharing for control channel repetition in accordance with aspects of the present disclosure.

FIG. 7 shows a block diagram 700 of a device 705 that supports techniques for search space sharing for control channel repetition in accordance with aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for search space sharing for control channel repetition). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for search space sharing for control channel repetition). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of techniques for search space sharing for control channel repetition as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a UE in accordance with examples as disclosed herein. For example, the communications manager 720 may be configured as or otherwise support a means for receiving, from a base station or an access network entity, control signaling indicating a first search space set and a second search space set, where a first set of control channel decoding candidates associated with scheduling a first component carrier are linked for control channel repetition across the first search space set and the second search space set, and a second set of control channel decoding candidates associated with scheduling a second component carrier are unlinked across the first search space set and the second search space set. The communications manager 720 may be configured as or otherwise support a means for identifying a search space sharing condition for the first set of control channel decoding candidates, the second set of control channel decoding candidates, or both, based on the control signaling, or whether the first set of control channel decoding candidates associated with scheduling a first component carrier are linked for control channel repetition across the first search space set and the second search space set, and the second set of control channel decoding candidates associated with scheduling a second component carrier are unlinked across the first search space set and the second search space set. The communications manager 720 may be configured as or otherwise support a means for monitoring the first set of control channel decoding candidates, the second set of control channel decoding candidates, or both, in accordance with the search space sharing condition.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for may support techniques for improved cross-carrier scheduling. In particular, techniques described herein may enable the use of PDCCH repetition in the context of search space sharing for cross-carrier scheduling. By enabling both search space sharing and PDCCH repetition, techniques described herein may improve transmission diversity of control messages used for cross-carrier scheduling. As such, techniques described herein may improve reliability of control signaling used for cross-carrier scheduling, which may enable more efficient and widespread use of cross-carrier scheduling.

Figure 8:
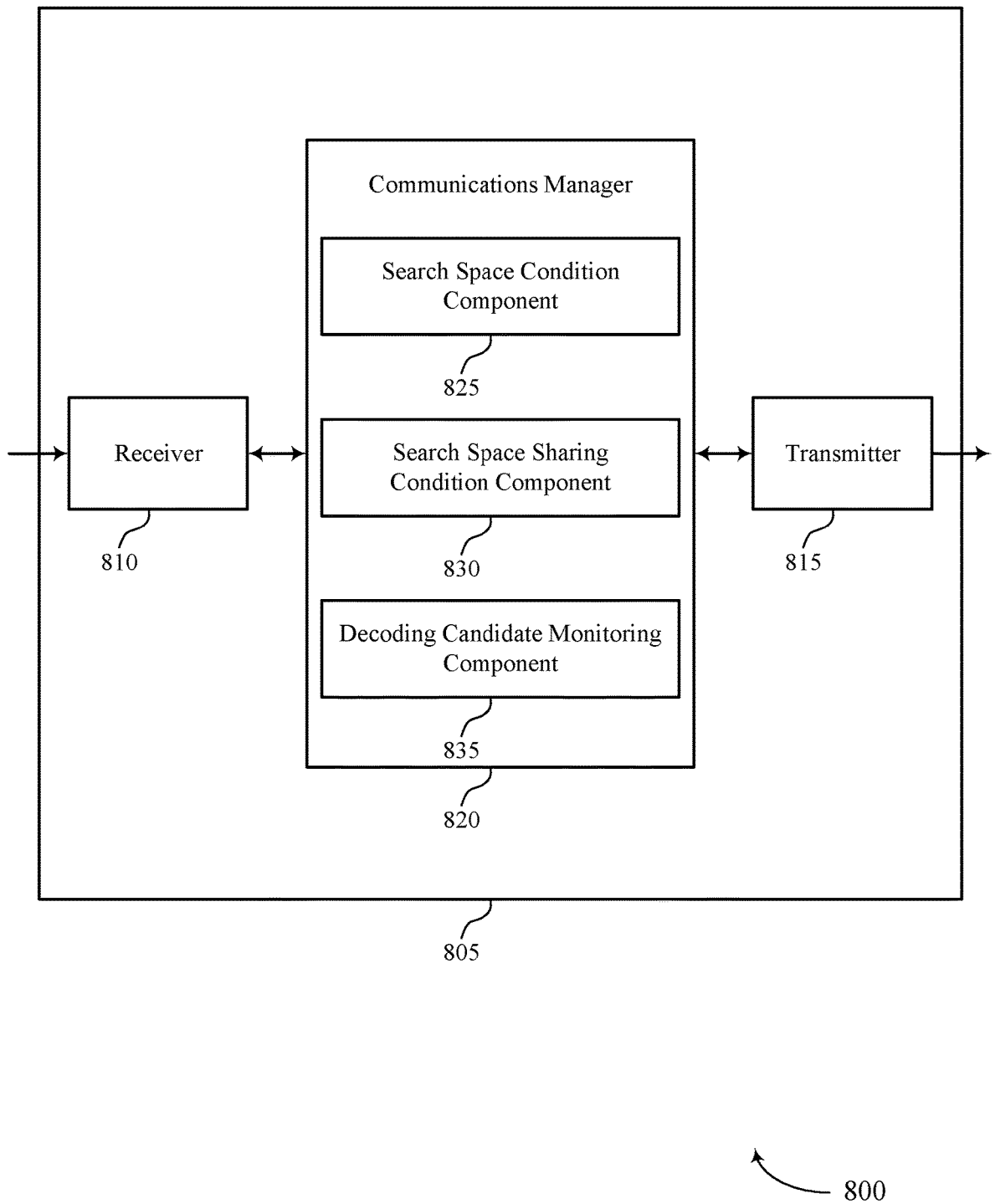

FIG. 8 shows a block diagram 800 of a device 805 that supports techniques for search space sharing for control channel repetition in accordance with aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for search space sharing for control channel repetition). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for search space sharing for control channel repetition). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of techniques for search space sharing for control channel repetition as described herein. For example, the communications manager 820 may include a search space condition component 825, a search space sharing condition component 830, a decoding candidate monitoring component 835, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a UE in accordance with examples as disclosed herein. The search space condition component 825 may be configured as or otherwise support a means for receiving, from a base station or an access network entity, control signaling indicating a first search space set and a second search space set, where a first set of control channel decoding candidates associated with scheduling a first component carrier are linked for control channel repetition across the first search space set and the second search space set, and a second set of control channel decoding candidates associated with scheduling a second component carrier are unlinked across the first search space set and the second search space set. The search space sharing condition component 830 may be configured as or otherwise support a means for identifying a search space sharing condition for the first set of control channel decoding candidates, the second set of control channel decoding candidates, or both, based on the control signaling. The decoding candidate monitoring component 835 may be configured as or otherwise support a means for monitoring the first set of control channel decoding candidates, the second set of control channel decoding candidates, or both, in accordance with the search space sharing condition.

Figure 9:
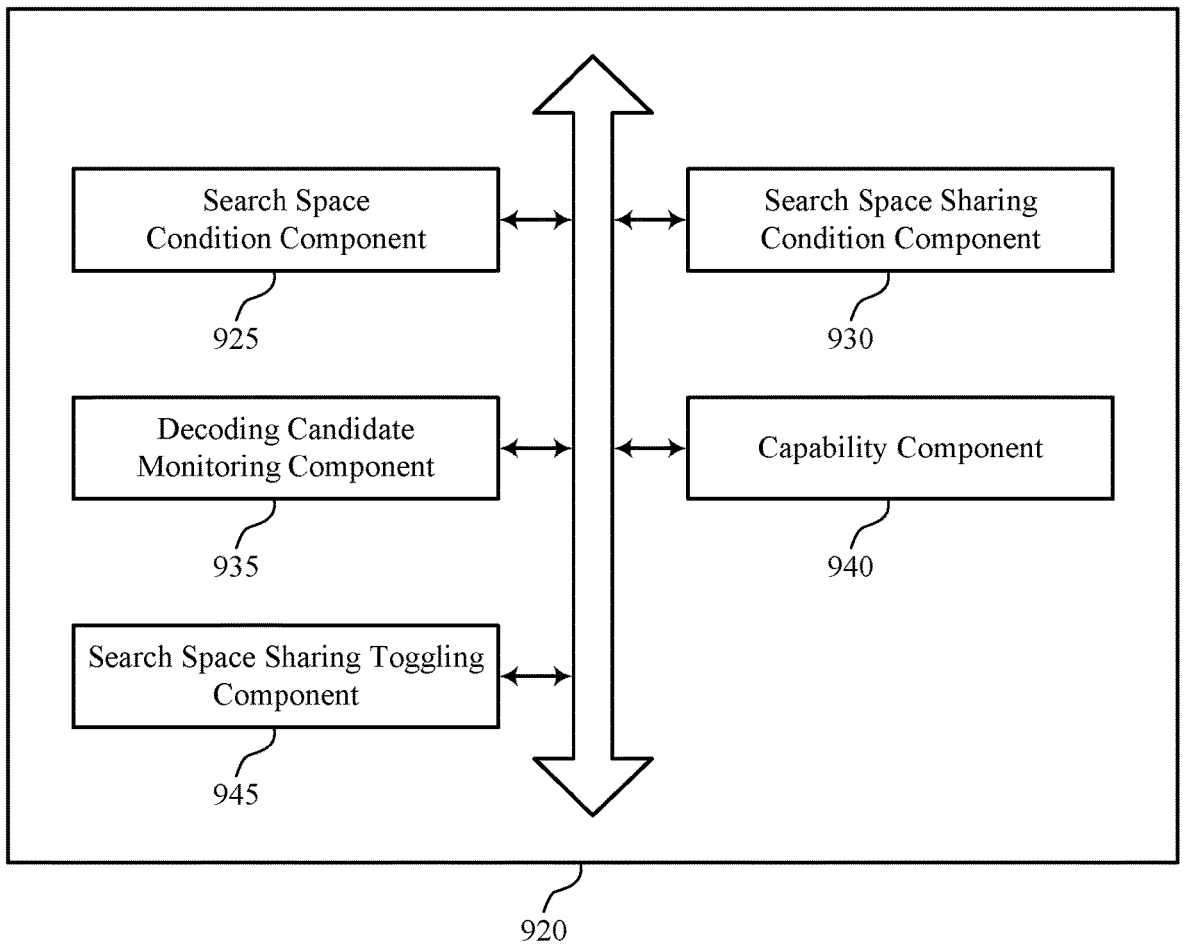
FIG. 9 shows a block diagram of a communications manager that supports techniques for search space sharing for control channel repetition in accordance with aspects of the present disclosure.

FIG. 9 shows a block diagram 900 of a communications manager 920 that supports techniques for search space sharing for control channel repetition in accordance with aspects of the present disclosure. The communications manager 920 may be an example of aspects of a communications manager 720, a communications manager 820, or both, as described herein. The communications manager 920, or various components thereof, may be an example of means for performing various aspects of techniques for search space sharing for control channel repetition as described herein. For example, the communications manager 920 may include a search space condition component 925, a search space sharing condition component 930, a decoding candidate monitoring component 935, a capability component 940, a search space sharing toggling component 945, or any combination thereof. Each of these components may communicate, directly or indirectly, with one another (e.g., via one or more buses).

The communications manager 920 may support wireless communications at a UE in accordance with examples as disclosed herein. The search space condition component 925 may be configured as or otherwise support a means for receiving, from a base station or an access network entity, control signaling indicating a first search space set and a second search space set, where a first set of control channel decoding candidates associated with scheduling a first component carrier are linked for control channel repetition across the first search space set and the second search space set, and a second set of control channel decoding candidates associated with scheduling a second component carrier are unlinked across the first search space set and the second search space set. The search space sharing condition component 930 may be configured as or otherwise support a means for identifying a search space sharing condition for the first set of control channel decoding candidates, the second set of control channel decoding candidates, or both, based on the control signaling. The decoding candidate monitoring component 935 may be configured as or otherwise support a means for monitoring the first set of control channel decoding candidates, the second set of control channel decoding candidates, or both, in accordance with the search space sharing condition.

In some examples, to support identifying the search space sharing condition, the search space condition component 925 may be configured as or otherwise support a means for receiving the control signaling or second control signaling indicating the search space sharing condition.

In some examples, to support monitoring, the decoding candidate monitoring component 935 may be configured as or otherwise support a means for receiving, on a first decoding candidate in the first search space set of the first set of control channel decoding candidates associated with scheduling the first component carrier, a first control message scheduling the second component carrier based on the search space sharing condition indicating that search space sharing is configured for the first set of control channel decoding candidates and the second set of control channel decoding candidates.

In some examples, the decoding candidate monitoring component 935 may be configured as or otherwise support a means for receiving, on a second decoding candidate in the second search space set of the first set of control channel decoding candidates associated with scheduling the first component carrier, a repetition of the first control message scheduling the second component carrier based on the search space sharing condition and the first set of control channel decoding candidates being linked for control channel repetition across the first search space set and the second search space set.

In some examples, the decoding candidate monitoring component 935 may be configured as or otherwise support a means for receiving, on a first decoding candidate of the second set of control channel decoding candidates associated with scheduling the second component carrier in the first search space set, a first control message scheduling the first component carrier based on the search space sharing condition indicating that search space sharing is configured for the first set of control channel decoding candidates and the second set of control channel decoding candidates.

In some examples, to support monitoring, the decoding candidate monitoring component 935 may be configured as or otherwise support a means for receiving, on a first decoding candidate in the first search space set of the first set of control channel decoding candidates associated with scheduling the first component carrier, a first control message scheduling a third component carrier based on the search space sharing condition, the search space sharing condition indicating that the first set of control channel decoding candidates associated with scheduling the first component carrier is configured for search space sharing based on the first set of control channel decoding candidates being linked for control channel repetition across the first search space set and the second search space set and a third set of control channel decoding candidates associated with scheduling the third component carrier being linked for control channel repetition across the first search space set and the second search space set.

In some examples, the decoding candidate monitoring component 935 may be configured as or otherwise support a means for receiving, on a second decoding candidate in the second search space set of the first set of control channel decoding candidates associated with scheduling the first component carrier, a repetition of the first control message scheduling the third component carrier.

In some examples, to support monitoring, the decoding candidate monitoring component 935 may be configured as or otherwise support a means for receiving, on a first decoding candidate in the first search space set of the second set of control channel decoding candidates associated with scheduling the second component carrier, a first control message scheduling a third component carrier based on the search space sharing condition, the search space sharing condition indicating that the second set of control channel decoding candidates associated with scheduling the second component carrier is configured for search space sharing based on the second set of control channel decoding candidates being unlinked across the first search space set and the second search space set and a third set of control channel decoding candidates associated with scheduling the third component carrier being unlinked across the first search space set and the second search space set.

In some examples, to support identifying the search space condition, the search space sharing condition component 930 may be configured as or otherwise support a means for identifying that the search space sharing condition indicates that search space sharing is unconfigured between the first set of control channel decoding candidates and the second set of control channel candidates based on the first set of candidates being linked for control channel repetition across the first search space set and the second search space set, and the second set of candidates being unlinked for control channel repetition across the first search space set and the second search space set.

In some examples, to support identifying the search space sharing condition, the search space sharing condition component 930 may be configured as or otherwise support a means for identifying that the search space sharing condition indicates that search space sharing is unconfigured for any decoding candidate of the first search space set and the second search space set.

In some examples, to support identifying the search space sharing condition, the capability component 940 may be configured as or otherwise support a means for transmitting, to the base station or access network entity, an indication of a UE capability for search space sharing. In some examples, to support identifying the search space sharing condition, the capability component 940 may be configured as or otherwise support a means for receiving the control signaling or second control signaling indicating the search space sharing condition based on the UE capability for search space sharing.

In some examples, the indication of the UE capability indicates that the UE is capable of search space sharing between sets of control channel decoding candidates which are unlinked for control channel repetition.

In some examples, the indication of the UE capability further indicates that the UE is capable of search space sharing between sets of control channel decoding candidates which are linked for control channel repetition.

In some examples, the indication of the UE capability indicates that the UE is capable of search space sharing associated with control channel repetition.

In some examples, the search space sharing toggling component 945 may be configured as or otherwise support a means for receiving, from the base station or access network entity, a second control signaling to enable or disable the search space sharing condition.

In some examples, to support receiving the second control signaling, the search space sharing toggling component 945 may be configured as or otherwise support a means for receiving the second control signaling to enable or disable the search space sharing condition for one or more cell groups, one or more component carriers including a set of control channel decoding candidates configured for the UE, one or more pairs of scheduled component carriers, one or more search space sets, or any combination thereof.

In some examples, to support receiving the second control signaling, the search space sharing toggling component 945 may be configured as or otherwise support a means for receiving the second control signaling via radio resource control signaling.

Figure 10:
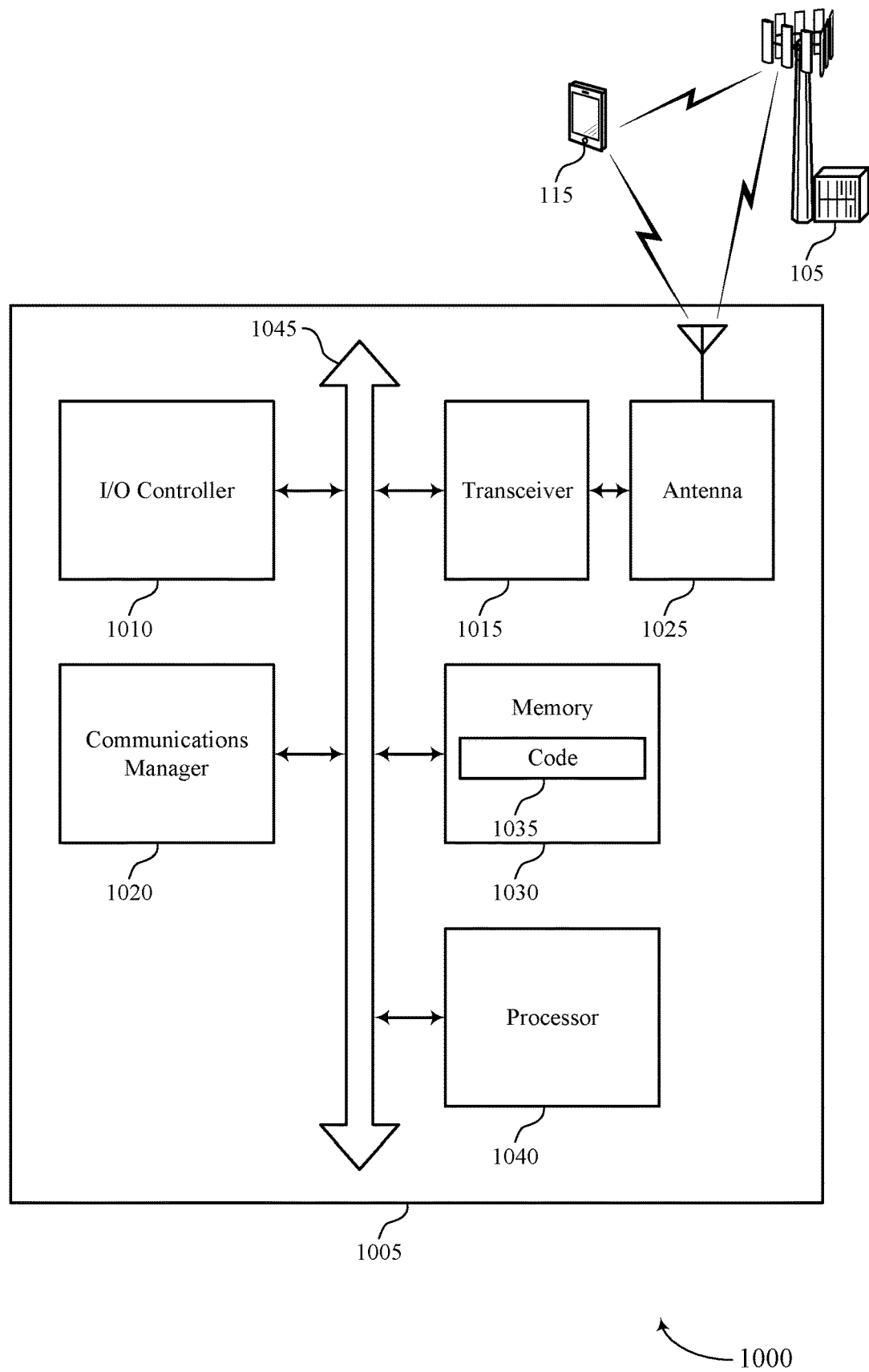
FIG. 10 shows a diagram of a system including a device that supports techniques for search space sharing for control channel repetition in accordance with aspects of the present disclosure.

FIG. 10 shows a diagram of a system 1000 including a device 1005 that supports techniques for search space sharing for control channel repetition in accordance with aspects of the present disclosure. The device 1005 may be an example of or include the components of a device 705, a device 805, or a UE 115 as described herein. The device 1005 may communicate wirelessly with one or more base stations 105, UEs 115, access network entities 140, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for search space sharing for control channel repetition). For example, the device 1005 or a component of the device 1005 may include a processor 1040 and memory 1030 coupled to the processor 1040, the processor 1040 and memory 1030 configured to perform various functions described herein.

The communications manager 1020 may support wireless communications at a UE in accordance with examples as disclosed herein. For example, the communications manager 1020 may be configured as or otherwise support a means for receiving, from a base station or access network entity, control signaling indicating a first search space set and a second search space set, where a first set of control channel decoding candidates associated with scheduling a first component carrier are linked for control channel repetition across the first search space set and the second search space set, and a second set of control channel decoding candidates associated with scheduling a second component carrier are unlinked across the first search space set and the second search space set. The communications manager 1020 may be configured as or otherwise support a means for identifying a search space sharing condition for the first set of control channel decoding candidates, the second set of control channel decoding candidates, or both, based on the control signaling. The communications manager 1020 may be configured as or otherwise support a means for monitoring the first set of control channel decoding candidates, the second set of control channel decoding candidates, or both, in accordance with the search space sharing condition.

By including or configuring the communications manager 1020 in accordance with examples as described herein, the device 1005 may support techniques for improved cross-carrier scheduling. In particular, techniques described herein may enable the use of PDCCH repetition in the context of search space sharing for cross-carrier scheduling. By enabling both search space sharing and PDCCH repetition, techniques described herein may improve transmission diversity of control messages used for cross-carrier scheduling. As such, techniques described herein may improve reliability of control signaling used for cross-carrier scheduling, which may enable more efficient and widespread use of cross-carrier scheduling.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of techniques for search space sharing for control channel repetition as described herein, or the processor 1040 and the memory 1030 may be otherwise configured to perform or support such operations.

Figure 11:
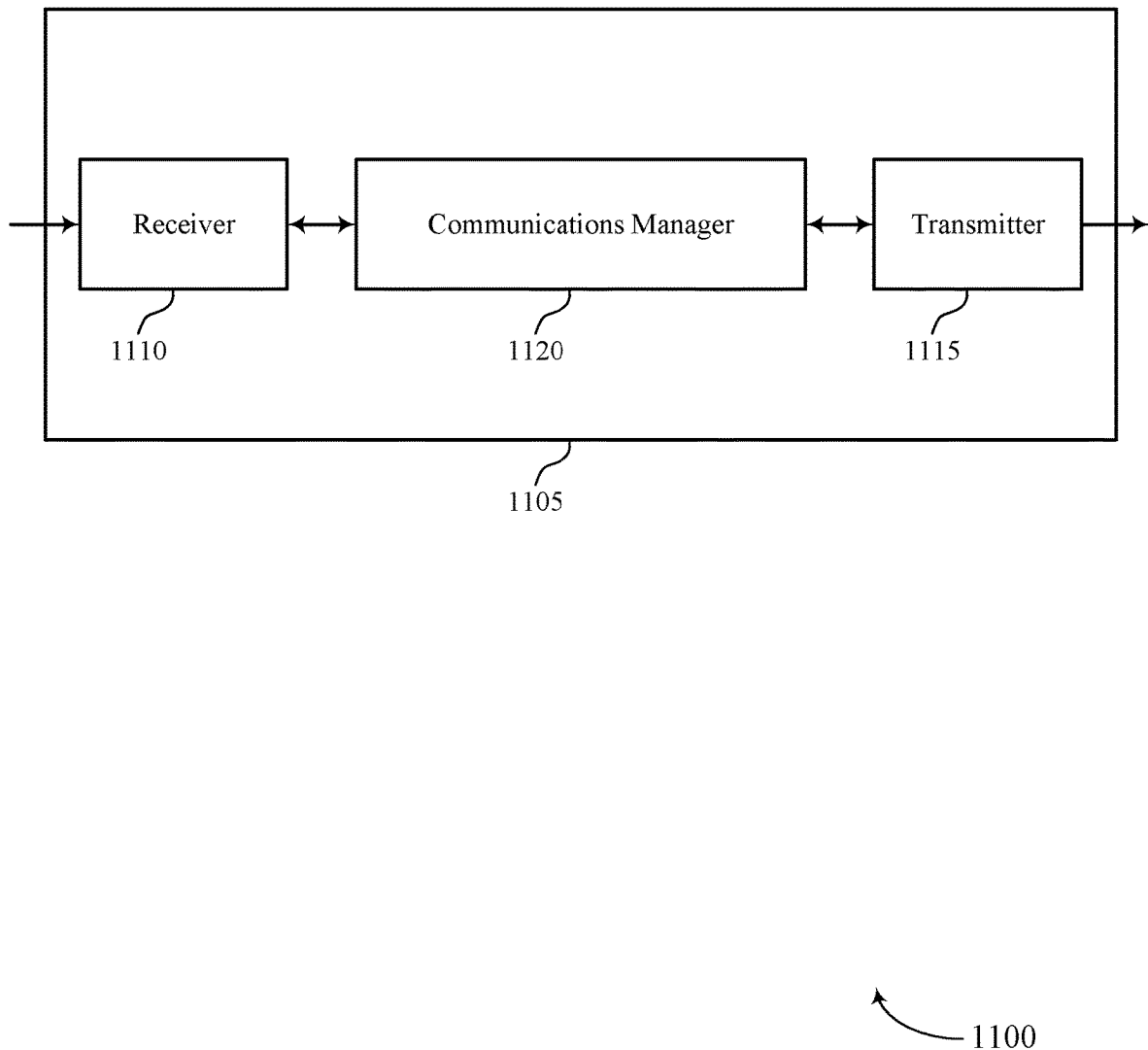
FIGS. 11 and 12 show block diagrams of devices that support techniques for search space sharing for control channel repetition in accordance with aspects of the present disclosure.

FIG. 11 shows a block diagram 1100 of a device 1105 that supports techniques for search space sharing for control channel repetition in accordance with aspects of the present disclosure. The device 1105 may be an example of aspects of a base station 105 or an access network entity 140 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for search space sharing for control channel repetition). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for search space sharing for control channel repetition). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of techniques for search space sharing for control channel repetition as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a base station in accordance with examples as disclosed herein. For example, the communications manager 1120 may be configured as or otherwise support a means for transmitting, to a UE, control signaling indicating a first search space set and a second search space set, where a first set of control channel decoding candidates associated with scheduling a first component carrier are linked for control channel repetition across the first search space set and the second search space set, and a second set of control channel decoding candidates associated with scheduling a second component carrier are unlinked across the first search space set and the second search space set. The communications manager 1120 may be configured as or otherwise support a means for identifying a search space sharing condition for the first set of control channel decoding candidates, the second set of control channel decoding candidates, or both, based on the control signaling, or whether the first set of control channel decoding candidates associated with scheduling a first component carrier are linked for control channel repetition across the first search space set and the second search space set, and the second set of control channel decoding candidates associated with scheduling a second component carrier are unlinked across the first search space set and the second search space set. The communications manager 1120 may be configured as or otherwise support a means for transmitting a first control message on corresponding to at least one control channel decoding candidate of the first set of control channel decoding candidates, the second set of control channel decoding candidates, or both, in accordance with the search space sharing condition.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for improved cross-carrier scheduling. In particular, techniques described herein may enable the use of PDCCH repetition in the context of search space sharing for cross-carrier scheduling. By enabling both search space sharing and PDCCH repetition, techniques described herein may improve transmission diversity of control messages used for cross-carrier scheduling. As such, techniques described herein may improve reliability of control signaling used for cross-carrier scheduling, which may enable more efficient and widespread use of cross-carrier scheduling.

Figure 12:
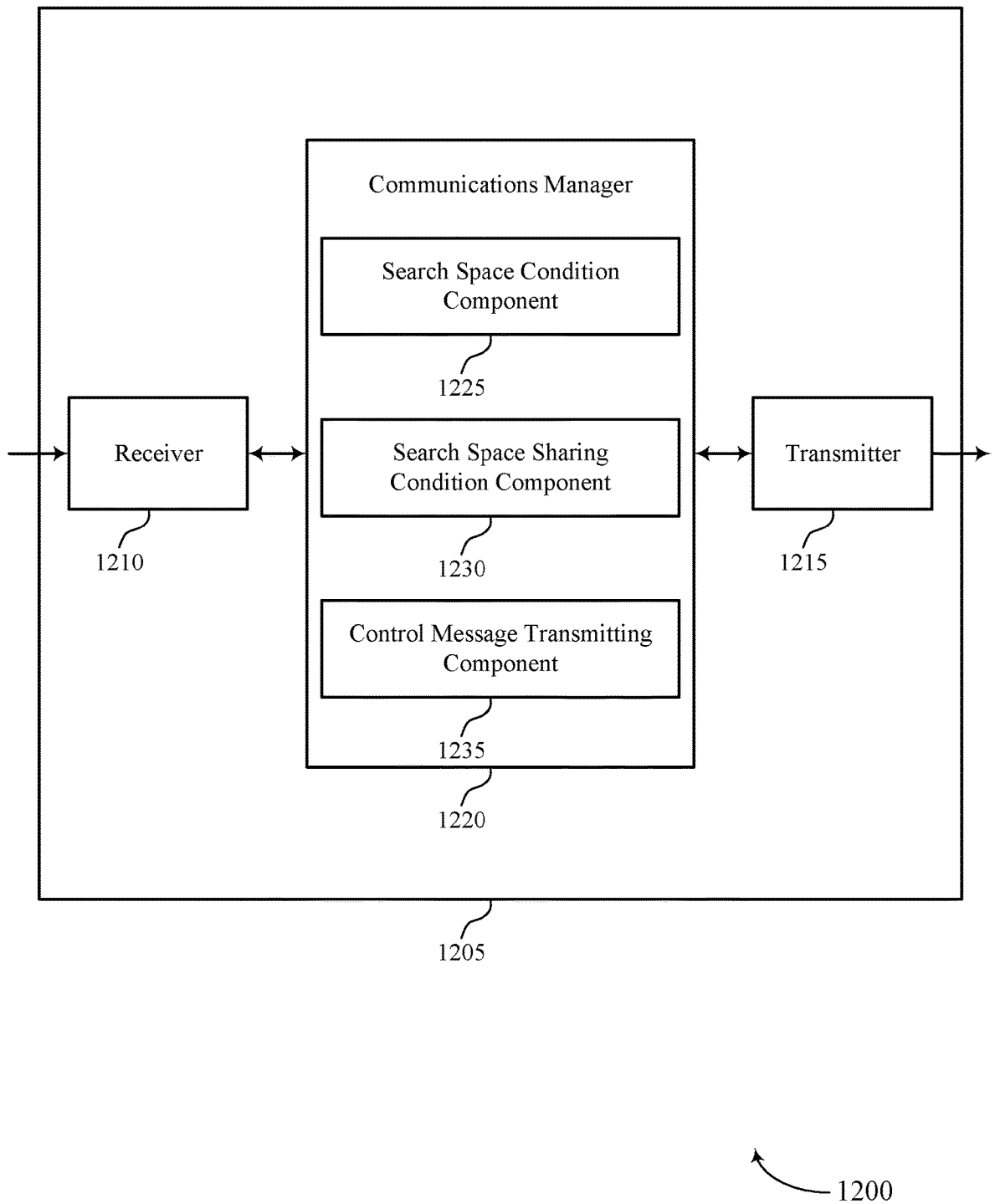

FIG. 12 shows a block diagram 1200 of a device 1205 that supports techniques for search space sharing for control channel repetition in accordance with aspects of the present disclosure. The device 1205 may be an example of aspects of a device 1105, a base station 105, or an access network entity 140 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to techniques for search space sharing for control channel repetition). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to techniques for search space sharing for control channel repetition). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of techniques for search space sharing for control channel repetition as described herein. For example, the communications manager 1220 may include a search space configuring component 1225, a search space sharing condition component 1230, a control message transmitting component 1235, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at a base station in accordance with examples as disclosed herein. The search space configuring component 1225 may be configured as or otherwise support a means for transmitting, to a UE, control signaling indicating a first search space set and a second search space set, where a first set of control channel decoding candidates associated with scheduling a first component carrier are linked for control channel repetition across the first search space set and the second search space set, and a second set of control channel decoding candidates associated with scheduling a second component carrier are unlinked across the first search space set and the second search space set. The search space sharing condition component 1230 may be configured as or otherwise support a means for identifying a search space sharing condition for the first set of control channel decoding candidates, the second set of control channel decoding candidates, or both, based on the control signaling. The control message transmitting component 1235 may be configured as or otherwise support a means for transmitting a first control message on corresponding to at least one control channel decoding candidate of the first set of control channel decoding candidates, the second set of control channel decoding candidates, or both, in accordance with the search space sharing condition.

Figure 13:
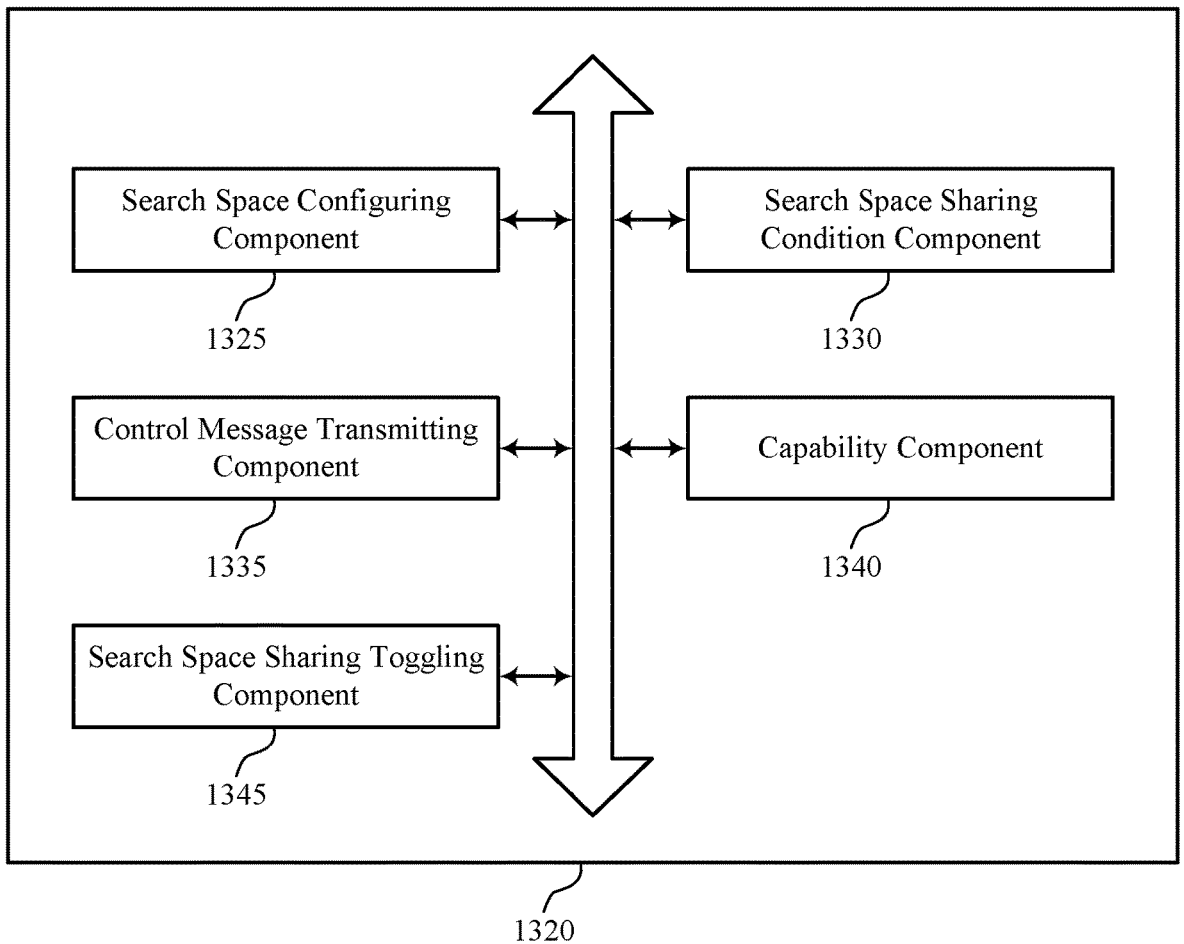
FIG. 13 shows a block diagram of a communications manager that supports techniques for search space sharing for control channel repetition in accordance with aspects of the present disclosure.

FIG. 13 shows a block diagram 1300 of a communications manager 1320 that supports techniques for search space sharing for control channel repetition in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of techniques for search space sharing for control channel repetition as described herein. For example, the communications manager 1320 may include a search space configuring component 1325, a search space sharing condition component 1330, a control message transmitting component 1335, a capability component 1340, a search space sharing toggling component 1345, or any combination thereof. Each of these components may communicate, directly or indirectly, with one another (e.g., via one or more buses).

The communications manager 1320 may support wireless communications at a base station in accordance with examples as disclosed herein. The search space configuring component 1325 may be configured as or otherwise support a means for transmitting, to a UE, control signaling indicating a first search space set and a second search space set, where a first set of control channel decoding candidates associated with scheduling a first component carrier are linked for control channel repetition across the first search space set and the second search space set, and a second set of control channel decoding candidates associated with scheduling a second component carrier are unlinked across the first search space set and the second search space set. The search space sharing condition component 1330 may be configured as or otherwise support a means for identifying a search space sharing condition for the first set of control channel decoding candidates, the second set of control channel decoding candidates, or both, based on the control signaling. The control message transmitting component 1335 may be configured as or otherwise support a means for transmitting a first control message on corresponding to at least one control channel decoding candidate of the first set of control channel decoding candidates, the second set of control channel decoding candidates, or both, in accordance with the search space sharing condition.

In some examples, the search space configuring component 1325 may be configured as or otherwise support a means for transmitting the control signaling or second control signaling indicating the search space sharing condition.

In some examples, to support transmitting, the control message transmitting component 1335 may be configured as or otherwise support a means for transmitting, on a first decoding candidate in the first search space set of the first set of control channel decoding candidates associated with scheduling the first component carrier, the first control message scheduling the second component carrier based on the search space sharing condition indicating that search space sharing is configured for the first set of control channel decoding candidates and the second set of control channel decoding candidates.

In some examples, the control message transmitting component 1335 may be configured as or otherwise support a means for transmitting, on a second decoding candidate in the second search space set of the first set of control channel decoding candidates associated with scheduling the first component carrier, a repetition of the first control message scheduling the second component carrier based on the search space sharing condition and the first set of control channel decoding candidates being linked for control channel repetition across the first search space set and the second search space set.

In some examples, the control message transmitting component 1335 may be configured as or otherwise support a means for transmitting, on a first decoding candidate of the second set of control channel decoding candidates associated with scheduling the second component carrier in the first search space set, the first control message scheduling the first component carrier based on the search space sharing condition indicating that search space sharing is configured for the first set of control channel decoding candidates and the second set of control channel decoding candidates.

In some examples, to support transmitting, the control message transmitting component 1335 may be configured as or otherwise support a means for transmitting, on a first decoding candidate in the first search space set of the first set of control channel decoding candidates associated with scheduling the first component carrier, the first control message scheduling a third component carrier based on the search space sharing condition, the search space sharing condition indicating that the first set of control channel decoding candidates associated with scheduling the first component carrier is configured for search space sharing based on the first set of control channel decoding candidates being linked for control channel repetition across the first search space set and the second search space set and a third set of control channel decoding candidates associated with scheduling the third component carrier being linked for control channel repetition across the first search space set and the second search space set.

In some examples, the control message transmitting component 1335 may be configured as or otherwise support a means for transmitting, on a second decoding candidate in the second search space set of the first set of control channel decoding candidates associated with scheduling the first component carrier, a repetition of the first control message scheduling the third component carrier.

In some examples, to support transmitting, the control message transmitting component 1335 may be configured as or otherwise support a means for transmitting, on a first decoding candidate in the first search space set of the second set of control channel decoding candidates associated with scheduling the second component carrier, the first control message scheduling a third component carrier based on the search space sharing condition, the search space sharing condition indicating that the second set of control channel decoding candidates associated with scheduling the second component carrier is configured for search space sharing based on the second set of control channel decoding candidates being unlinked across the first search space set and the second search space set and a third set of control channel decoding candidates associated with scheduling the third component carrier being unlinked across the first search space set and the second search space set.

In some examples, to support identifying the search space sharing condition, the search space sharing condition component 1330 may be configured as or otherwise support a means for identifying that the search space sharing condition indicates that search space sharing is unconfigured between the first set of control channel decoding candidates and the second set of control channel candidates based on the first set of candidates being linked for control channel repetition across the first search space set and the second search space set, and the second set of candidates being unlinked for control channel repetition across the first search space set and the second search space set.

In some examples, to support identifying the search space sharing condition, the search space sharing condition component 1330 may be configured as or otherwise support a means for identifying that the search space sharing condition indicates that search space sharing is unconfigured for any decoding candidate of the first search space set and the second search space set.

In some examples, to support identifying the search space sharing condition, the capability component 1340 may be configured as or otherwise support a means for receiving, from the UE, an indication of a UE capability for search space sharing. In some examples, to support identifying the search space sharing condition, the capability component 1340 may be configured as or otherwise support a means for transmitting the control signaling or second control signaling indicating the search space sharing condition based on the UE capability for search space sharing.

In some examples, the indication of the UE capability indicates that the UE is capable of search space sharing between sets of control channel decoding candidates which are unlinked for control channel repetition.

In some examples, the indication of the UE capability further indicates that the UE is capable of search space sharing between sets of control channel decoding candidates which are linked for control channel repetition.

In some examples, the indication of the UE capability indicates that the UE is capable of search space sharing associated with control channel repetition.

In some examples, the search space sharing toggling component 1345 may be configured as or otherwise support a means for transmitting, to the UE, a second control signaling to enable or disable the search space sharing condition.

In some examples, to support transmitting the second control signaling, the search space sharing toggling component 1345 may be configured as or otherwise support a means for transmitting the second control signaling to enable or disable the search space sharing condition for one or more cell groups, one or more component carriers including a set of control channel decoding candidates configured for the UE, one or more pairs of scheduled component carriers, one or more search space sets, or any combination thereof.

In some examples, to support transmitting the second control signaling, the search space sharing toggling component 1345 may be configured as or otherwise support a means for transmitting the second control signaling via radio resource control signaling.

Figure 14:
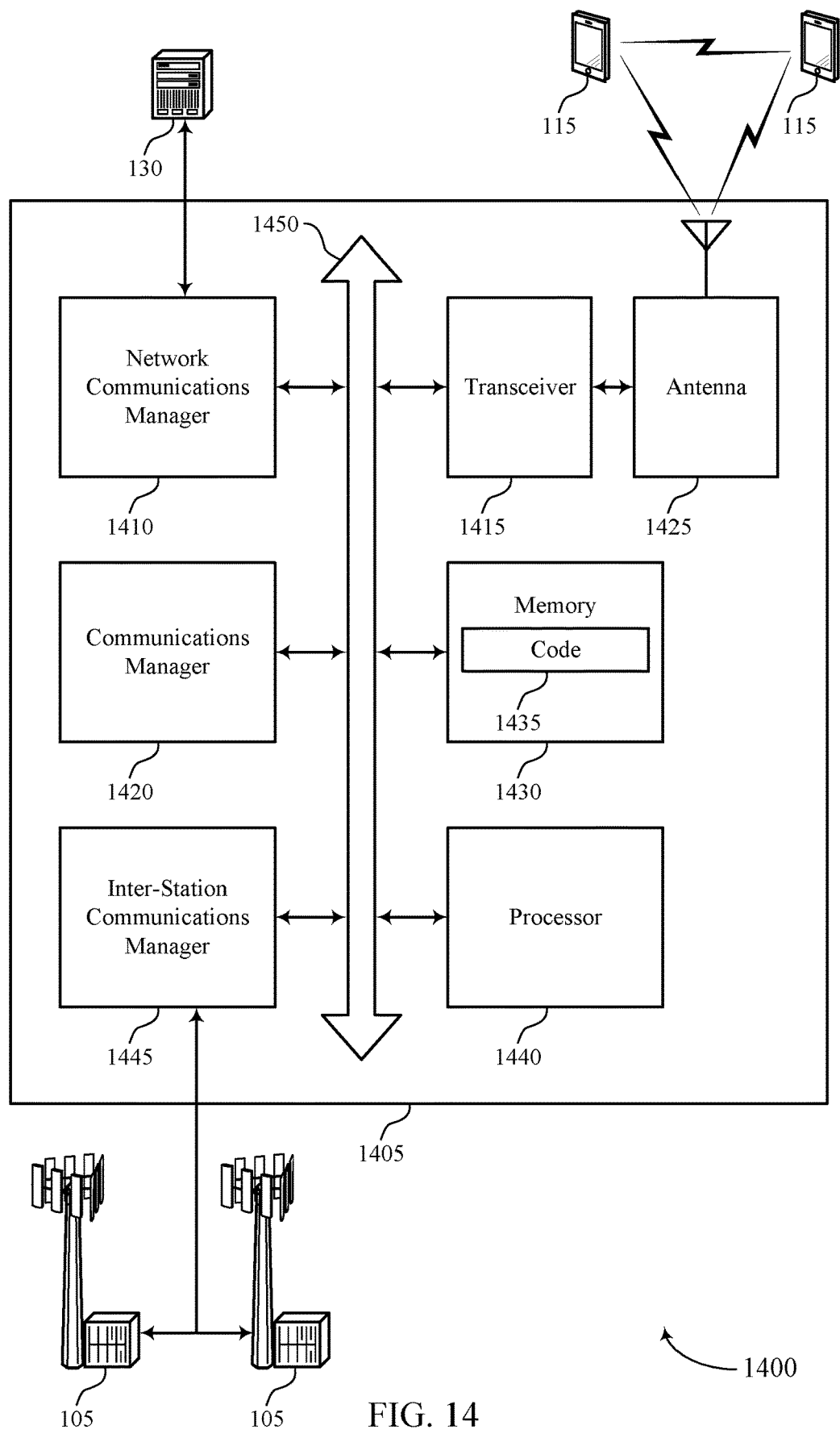
FIG. 14 shows a diagram of a system including a device that supports techniques for search space sharing for control channel repetition in accordance with aspects of the present disclosure.

FIG. 14 shows a diagram of a system 1400 including a device 1405 that supports techniques for search space sharing for control channel repetition in accordance with aspects of the present disclosure. The device 1405 may be an example of or include the components of a device 1105, a device 1205, an access network entity 140, or a base station 105 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting techniques for search space sharing for control channel repetition). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communications at a base station in accordance with examples as disclosed herein. For example, the communications manager 1420 may be configured as or otherwise support a means for transmitting, to a UE, control signaling indicating a first search space set and a second search space set, where a first set of control channel decoding candidates associated with scheduling a first component carrier are linked for control channel repetition across the first search space set and the second search space set, and a second set of control channel decoding candidates associated with scheduling a second component carrier are unlinked across the first search space set and the second search space set. The communications manager 1420 may be configured as or otherwise support a means for identifying a search space sharing condition for the first set of control channel decoding candidates, the second set of control channel decoding candidates, or both, based on the control signaling. The communications manager 1420 may be configured as or otherwise support a means for transmitting a first control message on corresponding to at least one control channel decoding candidate of the first set of control channel decoding candidates, the second set of control channel decoding candidates, or both, in accordance with the search space sharing condition.

By including or configuring the communications manager 1420 in accordance with examples as described herein, the device 1405 may support techniques for support techniques for improved cross-carrier scheduling. In particular, techniques described herein may enable the use of PDCCH repetition in the context of search space sharing for cross-carrier scheduling. By enabling both search space sharing and PDCCH repetition, techniques described herein may improve transmission diversity of control messages used for cross-carrier scheduling. The improved transmission diversity may lead to increased resource utilization for the devices.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of techniques for search space sharing for control channel repetition as described herein, or the processor 1440 and the memory 1430 may be otherwise configured to perform or support such operations.

Figure 15:
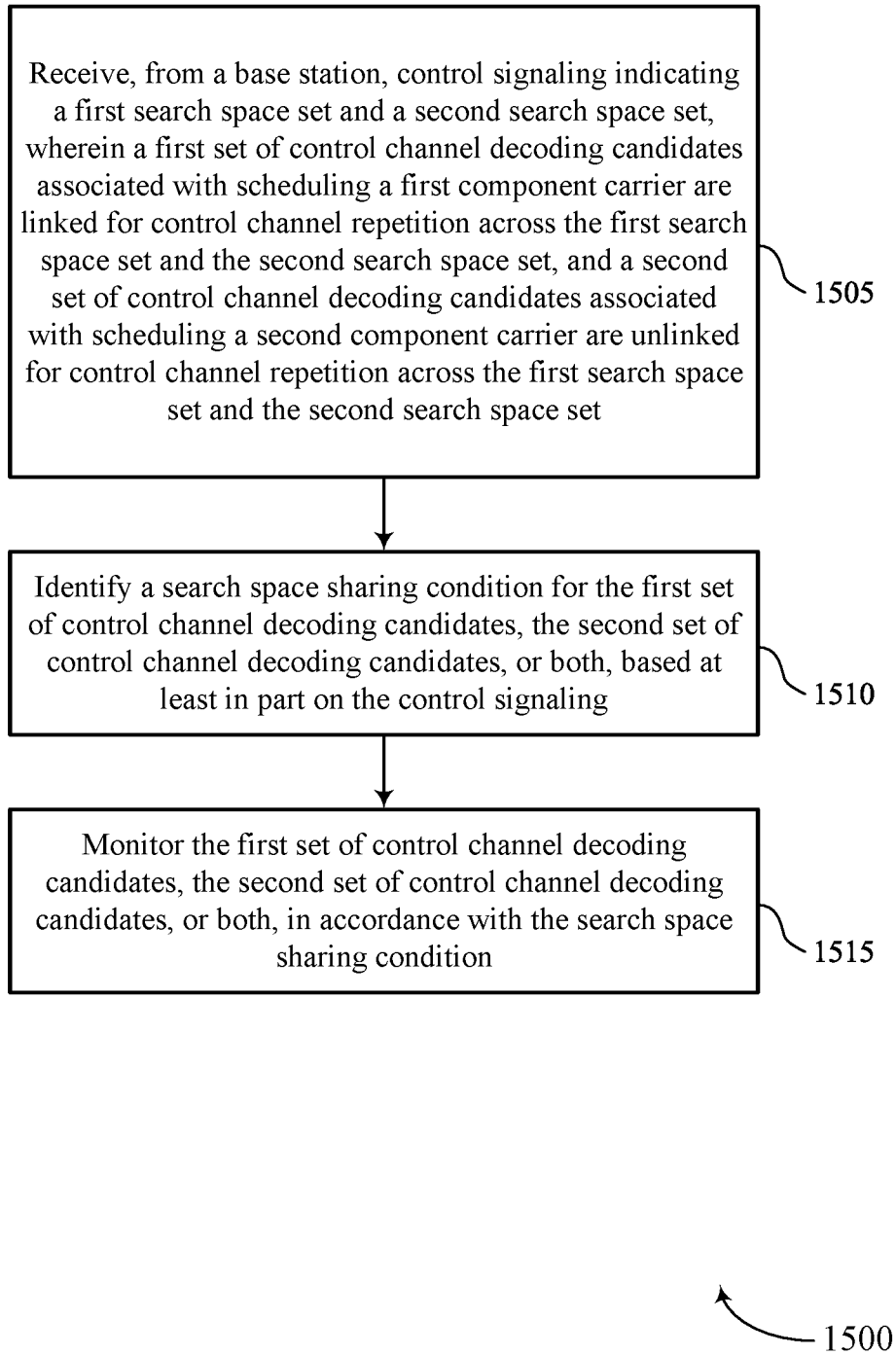
FIGS. 15 through 22 show flowcharts illustrating methods that support techniques for search space sharing for control channel repetition in accordance with aspects of the present disclosure.

FIG. 15 shows a flowchart illustrating a method 1500 that supports techniques for search space sharing for control channel repetition in accordance with aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include receiving, from a base station, control signaling indicating a first search space set and a second search space set, where a first set of control channel decoding candidates associated with scheduling a first component carrier are linked for control channel repetition across the first search space set and the second search space set, and a second set of control channel decoding candidates associated with scheduling a second component carrier are unlinked across the first search space set and the second search space set. The operations of 1505 may be performed in accordance with examples as disclosed herein. In some examples, aspects of the operations of 1505 may be performed by a search space condition component 925 as described with reference to FIG. 9.

At 1510, the method may include identifying a search space sharing condition for the first set of control channel decoding candidates, the second set of control channel decoding candidates, or both, based on the control signaling. The operations of 1510 may be performed in accordance with examples as disclosed herein. In some examples, aspects of the operations of 1510 may be performed by a search space sharing condition component 930 as described with reference to FIG. 9.

At 1515, the method may include monitoring the first set of control channel decoding candidates, the second set of control channel decoding candidates, or both, in accordance with the search space sharing condition. The operations of 1515 may be performed in accordance with examples as disclosed herein. In some examples, aspects of the operations of 1515 may be performed by a decoding candidate monitoring component 935 as described with reference to FIG. 9.

Figure 16:
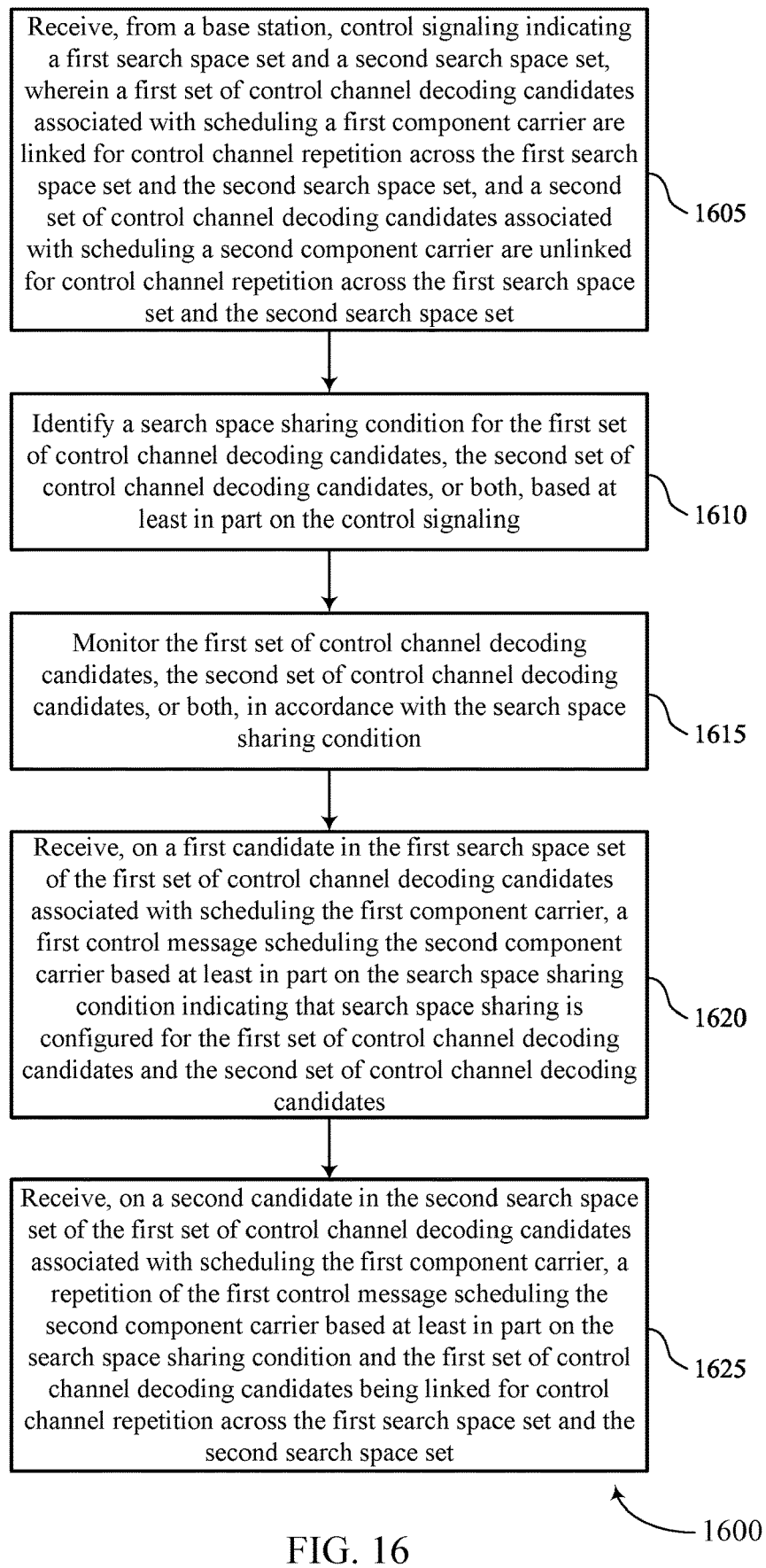

FIG. 16 shows a flowchart illustrating a method 1600 that supports techniques for search space sharing for control channel repetition in accordance with aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include receiving, from a base station, control signaling indicating a first search space set and a second search space set, where a first set of control channel decoding candidates associated with scheduling a first component carrier are linked for control channel repetition across the first search space set and the second search space set, and a second set of control channel decoding candidates associated with scheduling a second component carrier are unlinked across the first search space set and the second search space set. The operations of 1605 may be performed in accordance with examples as disclosed herein. In some examples, aspects of the operations of 1605 may be performed by a search space condition component 925 as described with reference to FIG. 9.

At 1610, the method may include identifying a search space sharing condition for the first set of control channel decoding candidates, the second set of control channel decoding candidates, or both, based on the control signaling. The operations of 1610 may be performed in accordance with examples as disclosed herein. In some examples, aspects of the operations of 1610 may be performed by a search space sharing condition component 930 as described with reference to FIG. 9.

At 1615, the method may include monitoring the first set of control channel decoding candidates, the second set of control channel decoding candidates, or both, in accordance with the search space sharing condition. The operations of 1615 may be performed in accordance with examples as disclosed herein. In some examples, aspects of the operations of 1615 may be performed by a decoding candidate monitoring component 935 as described with reference to FIG. 9.

At 1620, the method may include receiving, on a first decoding candidate in the first search space set of the first set of control channel decoding candidates associated with scheduling the first component carrier, a first control message scheduling the second component carrier based on the search space sharing condition indicating that search space sharing is configured for the first set of control channel decoding candidates and the second set of control channel decoding candidates. The operations of 1620 may be performed in accordance with examples as disclosed herein. In some examples, aspects of the operations of 1620 may be performed by a decoding candidate monitoring component 935 as described with reference to FIG. 9.

At 1625, the method may include receiving, on a second decoding candidate in the second search space set of the first set of control channel decoding candidates associated with scheduling the first component carrier, a repetition of the first control message scheduling the second component carrier based on the search space sharing condition and the first set of control channel decoding candidates being linked for control channel repetition across the first search space set and the second search space set. The operations of 1625 may be performed in accordance with examples as disclosed herein. In some examples, aspects of the operations of 1625 may be performed by a decoding candidate monitoring component 935 as described with reference to FIG. 9.

Figure 17:
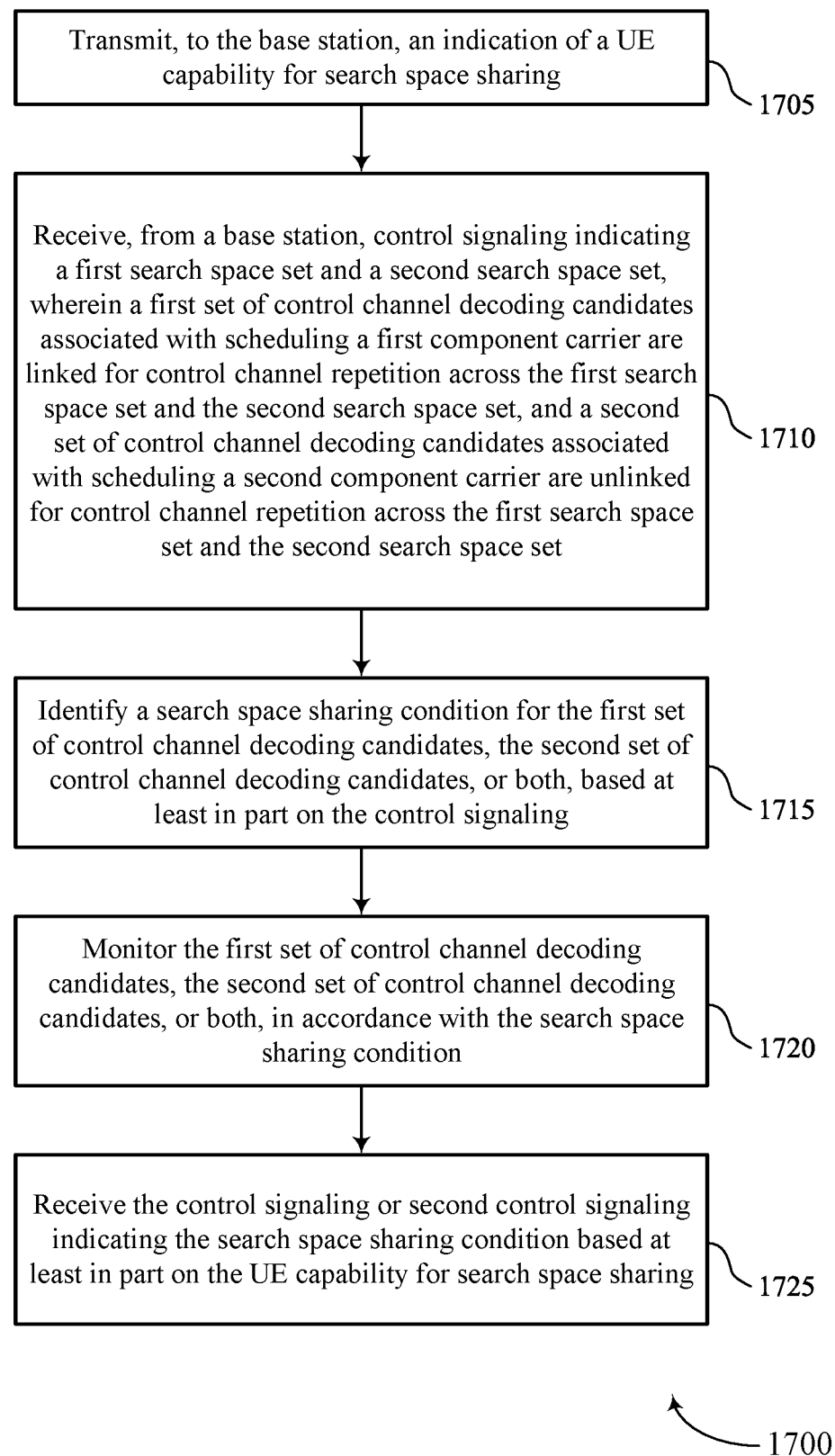

FIG. 17 shows a flowchart illustrating a method 1700 that supports techniques for search space sharing for control channel repetition in accordance with aspects of the present disclosure. The operations of the method 1700 may be implemented by a UE or its components as described herein. For example, the operations of the method 1700 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1705, the method may include transmitting, to the base station, an indication of a UE capability for search space sharing. The operations of 1705 may be performed in accordance with examples as disclosed herein. In some examples, aspects of the operations of 1705 may be performed by a capability component 940 as described with reference to FIG. 9.

At 1710, the method may include receiving, from a base station, control signaling indicating a first search space set and a second search space set, where a first set of control channel decoding candidates associated with scheduling a first component carrier are linked for control channel repetition across the first search space set and the second search space set, and a second set of control channel decoding candidates associated with scheduling a second component carrier are unlinked across the first search space set and the second search space set. The operations of 1710 may be performed in accordance with examples as disclosed herein. In some examples, aspects of the operations of 1710 may be performed by a search space condition component 925 as described with reference to FIG. 9.

At 1715, the method may include identifying a search space sharing condition for the first set of control channel decoding candidates, the second set of control channel decoding candidates, or both, based on the control signaling. The operations of 1715 may be performed in accordance with examples as disclosed herein. In some examples, aspects of the operations of 1715 may be performed by a search space sharing condition component 930 as described with reference to FIG. 9.

At 1720, the method may include monitoring the first set of control channel decoding candidates, the second set of control channel decoding candidates, or both, in accordance with the search space sharing condition. The operations of 1720 may be performed in accordance with examples as disclosed herein. In some examples, aspects of the operations of 1720 may be performed by a decoding candidate monitoring component 935 as described with reference to FIG. 9.

At 1725, the method may include receiving the control signaling or second control signaling indicating the search space sharing condition based on the UE capability for search space sharing. The operations of 1725 may be performed in accordance with examples as disclosed herein. In some examples, aspects of the operations of 1725 may be performed by a capability component 940 as described with reference to FIG. 9.

Figure 18:
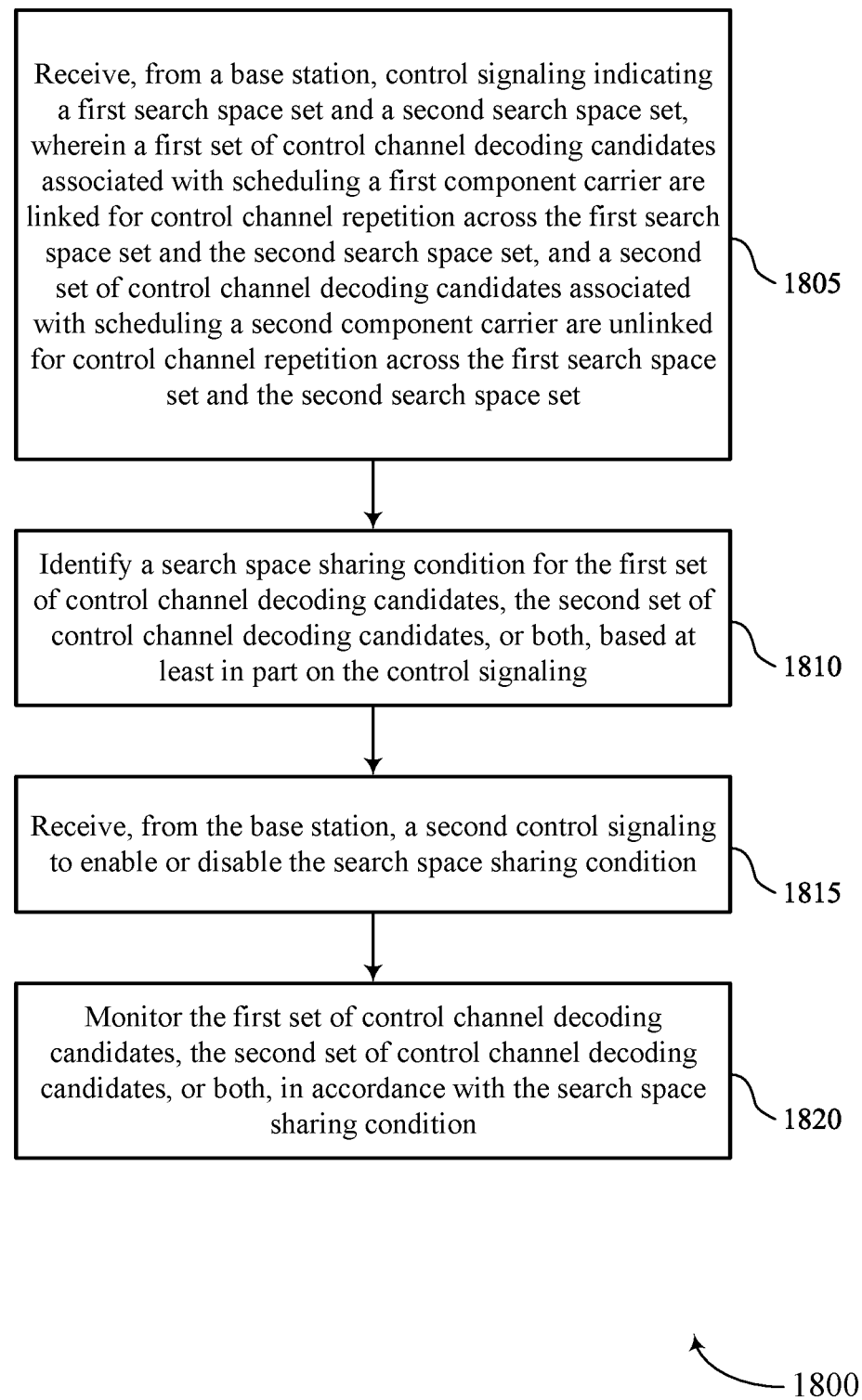

FIG. 18 shows a flowchart illustrating a method 1800 that supports techniques for search space sharing for control channel repetition in accordance with aspects of the present disclosure. The operations of the method 1800 may be implemented by a UE or its components as described herein. For example, the operations of the method 1800 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1805, the method may include receiving, from a base station, control signaling indicating a first search space set and a second search space set, where a first set of control channel decoding candidates associated with scheduling a first component carrier are linked for control channel repetition across the first search space set and the second search space set, and a second set of control channel decoding candidates associated with scheduling a second component carrier are unlinked across the first search space set and the second search space set. The operations of 1805 may be performed in accordance with examples as disclosed herein. In some examples, aspects of the operations of 1805 may be performed by a search space condition component 925 as described with reference to FIG. 9.

At 1810, the method may include identifying a search space sharing condition for the first set of control channel decoding candidates, the second set of control channel decoding candidates, or both, based on the control signaling. The operations of 1810 may be performed in accordance with examples as disclosed herein. In some examples, aspects of the operations of 1810 may be performed by a search space sharing condition component 930 as described with reference to FIG. 9.

At 1815, the method may include receiving, from the base station, a second control signaling to enable or disable the search space sharing condition. The operations of 1815 may be performed in accordance with examples as disclosed herein. In some examples, aspects of the operations of 1815 may be performed by a search space sharing toggling component 945 as described with reference to FIG. 9.

At 1820, the method may include monitoring the first set of control channel decoding candidates, the second set of control channel decoding candidates, or both, in accordance with the search space sharing condition. The operations of 1820 may be performed in accordance with examples as disclosed herein. In some examples, aspects of the operations of 1820 may be performed by a decoding candidate monitoring component 935 as described with reference to FIG. 9.

Figure 19:
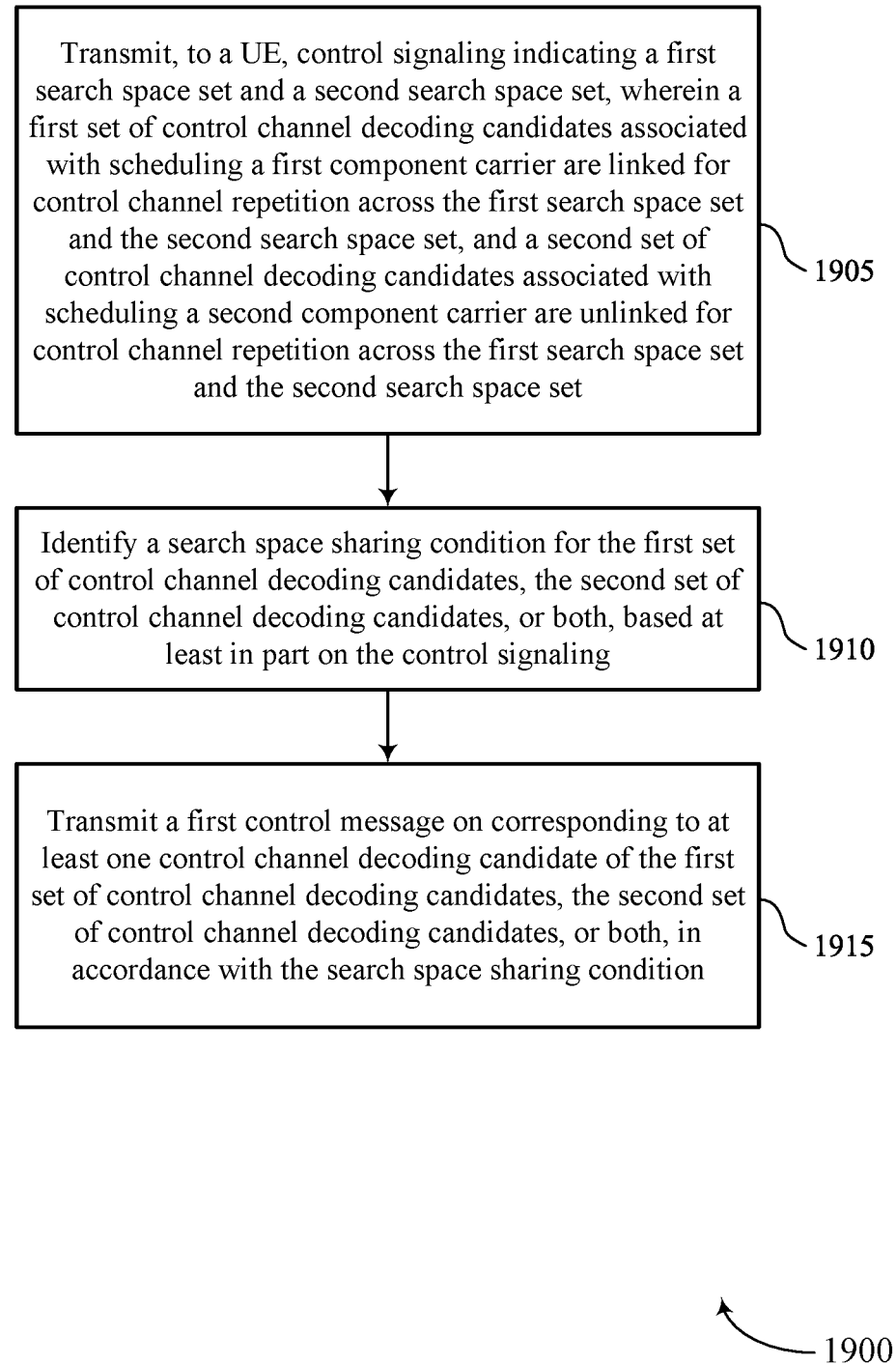

FIG. 19 shows a flowchart illustrating a method 1900 that supports techniques for search space sharing for control channel repetition in accordance with aspects of the present disclosure. The operations of the method 1900 may be implemented by a base station or its components, such as an access network entity 140, as described herein. For example, the operations of the method 1900 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 1905, the method may include transmitting, to a UE, control signaling indicating a first search space set and a second search space set, where a first set of control channel decoding candidates associated with scheduling a first component carrier are linked for control channel repetition across the first search space set and the second search space set, and a second set of control channel decoding candidates associated with scheduling a second component carrier are unlinked across the first search space set and the second search space set. The operations of 1905 may be performed in accordance with examples as disclosed herein. In some examples, aspects of the operations of 1905 may be performed by a search space configuring component 1325 as described with reference to FIG. 13.

At 1910, the method may include identifying a search space sharing condition for the first set of control channel decoding candidates, the second set of control channel decoding candidates, or both, based on the control signaling. The operations of 1910 may be performed in accordance with examples as disclosed herein. In some examples, aspects of the operations of 1910 may be performed by a search space sharing condition component 1330 as described with reference to FIG. 13.

At 1915, the method may include transmitting a first control message on corresponding to at least one control channel decoding candidate of the first set of control channel decoding candidates, the second set of control channel decoding candidates, or both, in accordance with the search space sharing condition. The operations of 1915 may be performed in accordance with examples as disclosed herein. In some examples, aspects of the operations of 1915 may be performed by a control message transmitting component 1335 as described with reference to FIG. 13.

Figure 20:
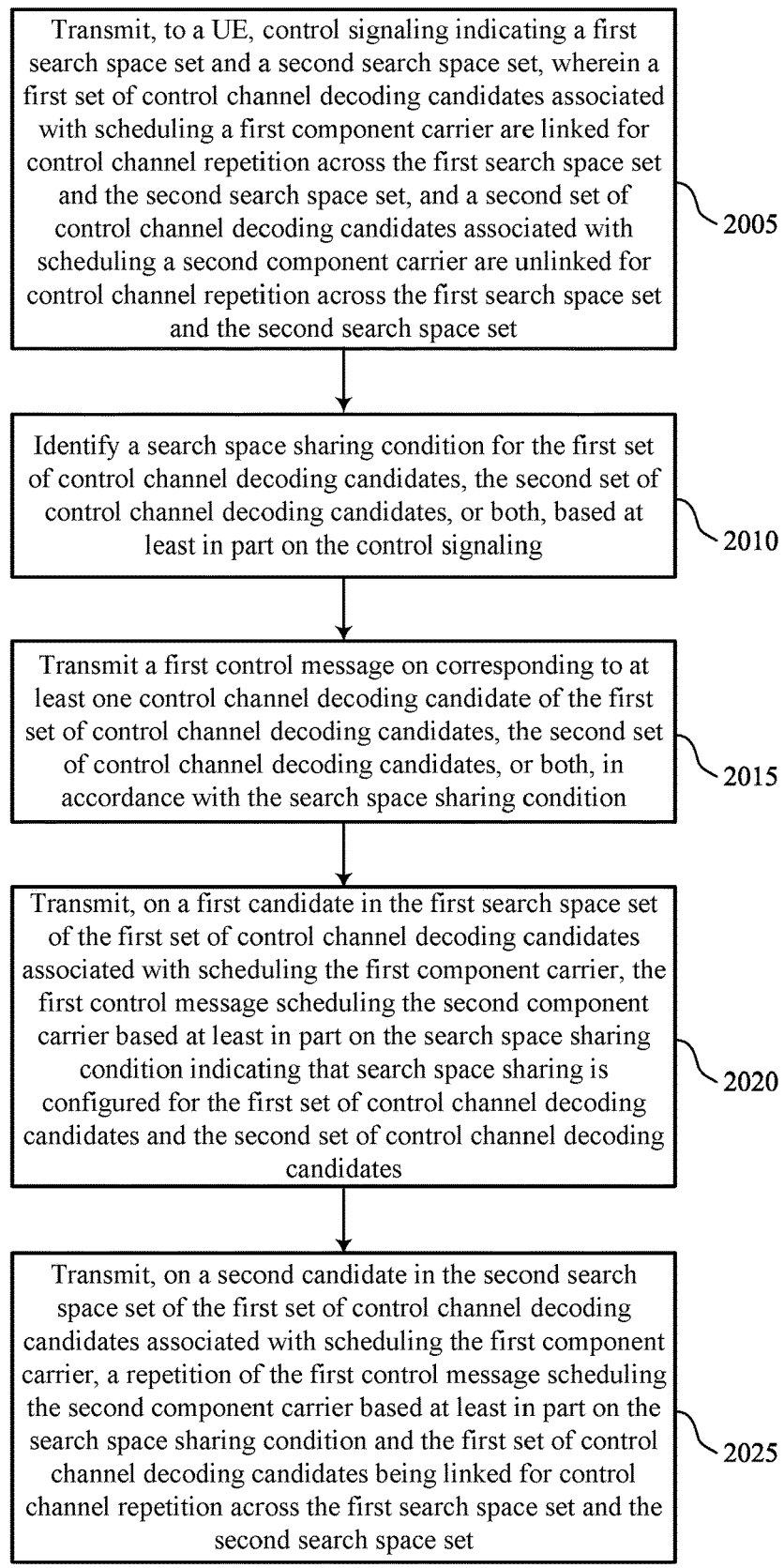

FIG. 20 shows a flowchart illustrating a method 2000 that supports techniques for search space sharing for control channel repetition in accordance with aspects of the present disclosure. The operations of the method 2000 may be implemented by a base station or its components as described herein. For example, the operations of the method 2000 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 2005, the method may include transmitting, to a UE, control signaling indicating a first search space set and a second search space set, where a first set of control channel decoding candidates associated with scheduling a first component carrier are linked for control channel repetition across the first search space set and the second search space set, and a second set of control channel decoding candidates associated with scheduling a second component carrier are unlinked across the first search space set and the second search space set. The operations of 2005 may be performed in accordance with examples as disclosed herein. In some examples, aspects of the operations of 2005 may be performed by a search space configuring component 1325 as described with reference to FIG. 13.

At 2010, the method may include identifying a search space sharing condition for the first set of control channel decoding candidates, the second set of control channel decoding candidates, or both, based on the control signaling. The operations of 2010 may be performed in accordance with examples as disclosed herein. In some examples, aspects of the operations of 2010 may be performed by a search space sharing condition component 1330 as described with reference to FIG. 13.

At 2015, the method may include transmitting a first control message on corresponding to at least one control channel decoding candidate of the first set of control channel decoding candidates, the second set of control channel decoding candidates, or both, in accordance with the search space sharing condition. The operations of 2015 may be performed in accordance with examples as disclosed herein. In some examples, aspects of the operations of 2015 may be performed by a control message transmitting component 1335 as described with reference to FIG. 13.

At 2020, the method may include transmitting, on a first decoding candidate in the first search space set of the first set of control channel decoding candidates associated with scheduling the first component carrier, the first control message scheduling the second component carrier based on the search space sharing condition indicating that search space sharing is configured for the first set of control channel decoding candidates and the second set of control channel decoding candidates. The operations of 2020 may be performed in accordance with examples as disclosed herein. In some examples, aspects of the operations of 2020 may be performed by a control message transmitting component 1335 as described with reference to FIG. 13.

At 2025, the method may include transmitting, on a second decoding candidate in the second search space set of the first set of control channel decoding candidates associated with scheduling the first component carrier, a repetition of the first control message scheduling the second component carrier based on the search space sharing condition and the first set of control channel decoding candidates being linked for control channel repetition across the first search space set and the second search space set. The operations of 2025 may be performed in accordance with examples as disclosed herein. In some examples, aspects of the operations of 2025 may be performed by a control message transmitting component 1335 as described with reference to FIG. 13.

Figure 21:
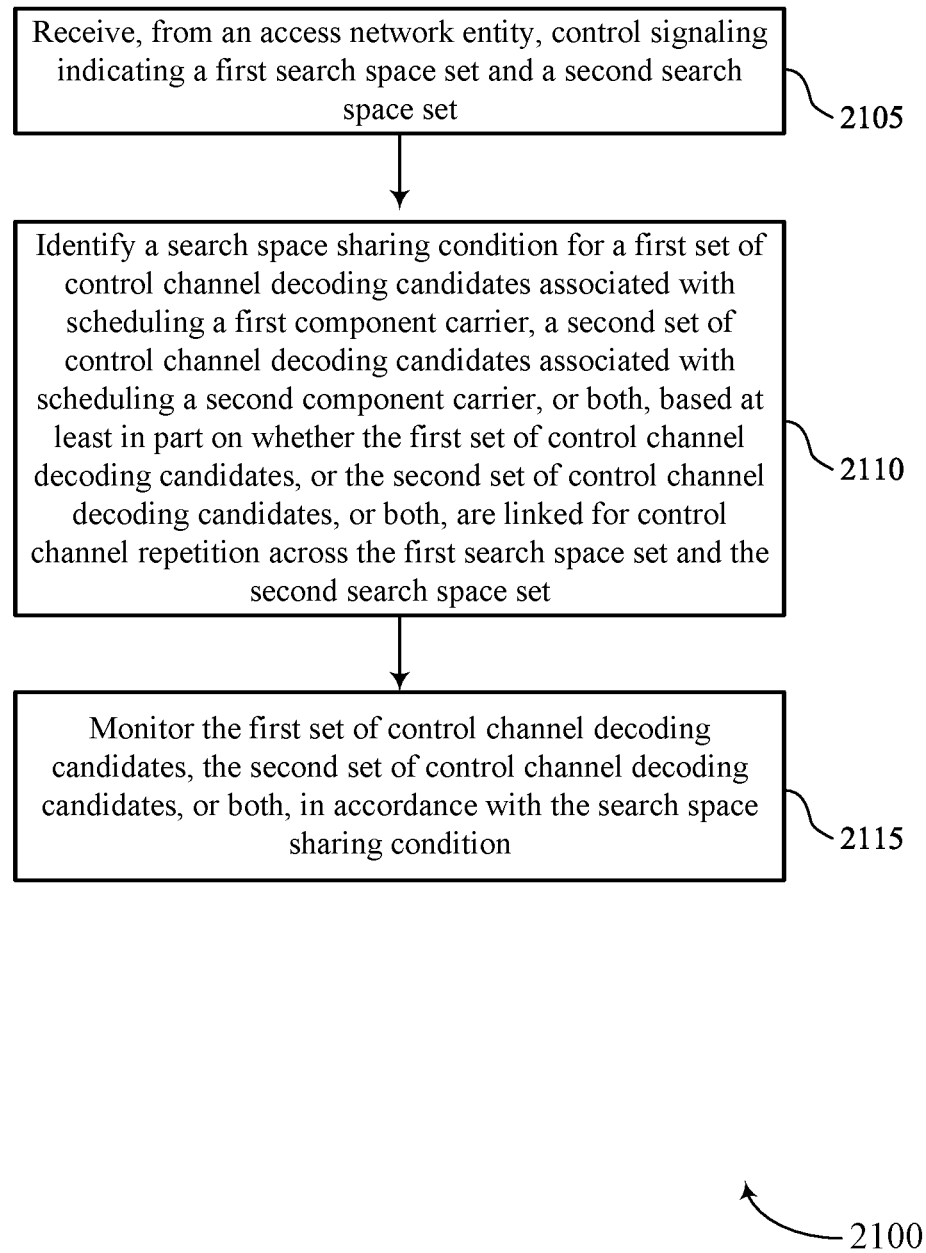

FIG. 21 shows a flowchart illustrating a method 2100 that supports techniques for search space sharing for control channel repetition in accordance with aspects of the present disclosure. The operations of the method 2100 may be implemented by a UE or its components as described herein. For example, the operations of the method 2100 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 2105, the method may include receiving, from an access network entity, control signaling indicating a first search space set and a second search space set. The operations of 2105 may be performed in accordance with examples as disclosed herein. In some examples, aspects of the operations of 2105 may be performed by a search space condition component 925 as described with reference to FIG. 9.

At 2110, the method may include identifying a search space sharing condition for a first set of control channel decoding candidates associated with scheduling a first component carrier, a second set of control channel decoding candidates associated with scheduling a second component carrier, or both, based on whether the first set of control channel decoding candidates, or the second set of control channel decoding candidates, or both, are linked for control channel repetition across the first search space set and the second search space set. The operations of 2110 may be performed in accordance with examples as disclosed herein. In some examples, aspects of the operations of 2110 may be performed by a search space sharing condition component 930 as described with reference to FIG. 9.

At 2115, the method may include monitoring the first set of control channel decoding candidates, the second set of control channel decoding candidates, or both, in accordance with the search space sharing condition. The operations of 2115 may be performed in accordance with examples as disclosed herein. In some examples, aspects of the operations of 2115 may be performed by a decoding candidate monitoring component 935 as described with reference to FIG. 9.

Figure 22:
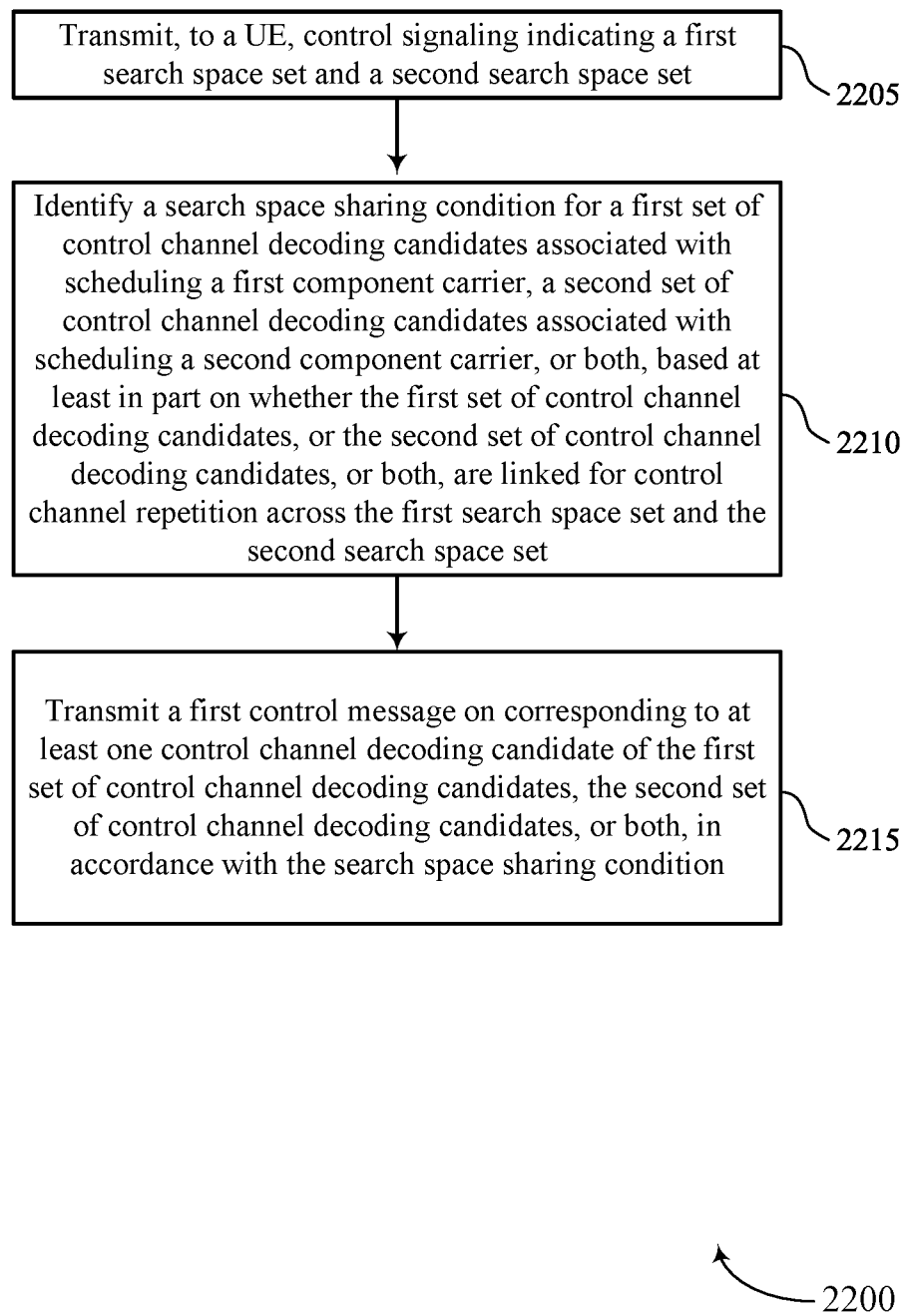

FIG. 22 shows a flowchart illustrating a method 2200 that supports techniques for search space sharing for control channel repetition in accordance with aspects of the present disclosure. The operations of the method 2200 may be implemented by a base station or its components, such as an access network entity 140, as described herein. For example, the operations of the method 2200 may be performed by a base station 105 as described with reference to FIGS. 1 through 6 and 11 through 14. In some examples, a base station may execute a set of instructions to control the functional elements of the base station to perform the described functions. Additionally or alternatively, the base station may perform aspects of the described functions using special-purpose hardware.

At 2205, the method may include transmitting, to a UE, control signaling indicating a first search space set and a second search space set. The operations of 2205 may be performed in accordance with examples as disclosed herein. In some examples, aspects of the operations of 2205 may be performed by a search space configuring component 1325 as described with reference to FIG. 13.

At 2210, the method may include identifying a search space sharing condition for a first set of control channel decoding candidates associated with scheduling a first component carrier, a second set of control channel decoding candidates associated with scheduling a second component carrier, or both, based on whether the first set of control channel decoding candidates, or the second set of control channel decoding candidates, or both, are linked for control channel repetition across the first search space set and the second search space set. The operations of 2210 may be performed in accordance with examples as disclosed herein. In some examples, aspects of the operations of 2210 may be performed by a search space sharing condition component 1330 as described with reference to FIG. 13.

At 2215, the method may include transmitting a first control message on corresponding to at least one control channel decoding candidate of the first set of control channel decoding candidates, the second set of control channel decoding candidates, or both, in accordance with the search space sharing condition. The operations of 2215 may be performed in accordance with examples as disclosed herein. In some examples, aspects of the operations of 2215 may be performed by a control message transmitting component 1335 as described with reference to FIG. 13.

The following provides an overview of aspects of the present disclosure:

Aspect 1: A method for wireless communications at a UE, comprising: receiving, from a base station, control signaling indicating a first search space set and a second search space set; identifying a search space sharing condition for a first set of control channel decoding candidates associated with scheduling a first component carrier, a second set of control channel decoding candidates associated with scheduling a second component carrier, or both, based at least in part on whether the first set of control channel decoding candidates, or the second set of control channel decoding candidates, or both, are linked for control channel repetition across the first search space set and the second search space set; and monitoring the first set of control channel decoding candidates, the second set of control channel decoding candidates, or both, in accordance with the search space sharing condition.

Aspect 2: The method of aspect 1, wherein identifying the search space sharing condition comprises: receiving the control signaling or second control signaling indicating the search space sharing condition.

Aspect 3: The method of any of aspects 1 through 2, wherein the monitoring comprises: receiving, on a first decoding candidate in the first search space set of the first set of control channel decoding candidates associated with scheduling the first component carrier, a first control message scheduling the second component carrier based at least in part on the search space sharing condition indicating that search space sharing is configured for the first set of control channel decoding candidates and the second set of control channel decoding candidates.

Aspect 4: The method of aspect 3, further comprising: receiving, on a second decoding candidate in the second search space set of the first set of control channel decoding candidates associated with scheduling the first component carrier, a repetition of the first control message scheduling the second component carrier based at least in part on the search space sharing condition and the first set of control channel decoding candidates being linked for control channel repetition across the first search space set and the second search space set.

Aspect 5: The method of any of aspects 1 through 4, further comprising: receiving, on a first decoding candidate of the second set of control channel decoding candidates associated with scheduling the second component carrier in the first search space set, a first control message scheduling the first component carrier based at least in part on the search space sharing condition indicating that search space sharing is configured for the first set of control channel decoding candidates and the second set of control channel decoding candidates.

Aspect 6: The method of any of aspects 1 through 5, wherein the monitoring comprises: receiving, on a first decoding candidate in the first search space set of the first set of control channel decoding candidates associated with scheduling the first component carrier, a first control message scheduling a third component carrier based at least in part on the search space sharing condition, the search space sharing condition indicating that the first set of control channel decoding candidates associated with scheduling the first component carrier is configured for search space sharing based at least in part on the first set of control channel decoding candidates being linked for control channel repetition across the first search space set and the second search space set and a third set of control channel decoding candidates associated with scheduling the third component carrier being linked for control channel repetition across the first search space set and the second search space set.

Aspect 7: The method of aspect 6, further comprising: receiving, on a second decoding candidate in the second search space set of the first set of control channel decoding candidates associated with scheduling the first component carrier, a repetition of the first control message scheduling the third component carrier.

Aspect 8: The method of any of aspects 1 through 7, wherein the monitoring comprises: receiving, on a first decoding candidate in the first search space set of the second set of control channel decoding candidates associated with scheduling the second component carrier, a first control message scheduling a third component carrier based at least in part on the search space sharing condition, the search space sharing condition indicating that the second set of control channel decoding candidates associated with scheduling the second component carrier is configured for search space sharing based at least in part on the second set of control channel decoding candidates being unlinked across the first search space set and the second search space set and a third set of control channel decoding candidates associated with scheduling the third component carrier being unlinked across the first search space set and the second search space set.

Aspect 9: The method of any of aspects 1 through 8, wherein identifying the search space sharing condition comprises: identifying that the search space sharing condition indicates that search space sharing is unconfigured between the first set of control channel decoding candidates and the second set of control channel decoding candidates based at least in part on the first set of control channel decoding candidates being linked for control channel repetition across the first search space set and the second search space set, and the second set of control channel decoding candidates being unlinked for control channel repetition across the first search space set and the second search space set.

Aspect 10: The method of any of aspects 1 through 9, wherein identifying the search space sharing condition comprises: identifying that the search space sharing condition indicates that search space sharing is unconfigured for any decoding candidate of the first search space set and the second search space set.

Aspect 11: The method of any of aspects 1 through 10, wherein identifying the search space sharing condition comprises: transmitting, to the base station, an indication of a UE capability for search space sharing; and receiving the control signaling or second control signaling indicating the search space sharing condition based at least in part on the UE capability for search space sharing.

Aspect 12: The method of aspect 11, wherein the indication of the UE capability indicates that the UE is capable of search space sharing between sets of control channel decoding candidates which are unlinked for control channel repetition.

Aspect 13: The method of aspect 12, wherein the indication of the UE capability further indicates that the UE is capable of search space sharing between sets of control channel decoding candidates which are linked for control channel repetition.

Aspect 14: The method of any of aspects 11 through 13, wherein the indication of the UE capability indicates that the UE is capable of search space sharing associated with control channel repetition.

Aspect 15: The method of any of aspects 1 through 14, further comprising: receiving, from the base station, a second control signaling to enable or disable the search space sharing condition.

Aspect 16: The method of aspect 15, wherein receiving the second control signaling comprises: receiving the second control signaling to enable or disable the search space sharing condition for one or more cell groups, one or more component carriers including a set of control channel decoding candidates configured for the UE, one or more pairs of scheduled component carriers, one or more search space sets, or any combination thereof.

Aspect 17: The method of any of aspects 15 through 16, wherein receiving the second control signaling comprises: receiving the second control signaling via radio resource control signaling.

Aspect 18: A method for wireless communications at a base station, comprising: transmitting, to a UE, control signaling indicating a first search space set and a second search space set; identifying a search space sharing condition for a first set of control channel decoding candidates associated with scheduling a first component carrier, a second set of control channel decoding candidates associated with scheduling a second component carrier, or both, based at least in part on whether the first set of control channel decoding candidates, or the second set of control channel decoding candidates, or both, are linked for control channel repetition across the first search space set and the second search space set; and transmitting a first control message on corresponding to at least one control channel decoding candidate of the first set of control channel decoding candidates, the second set of control channel decoding candidates, or both, in accordance with the search space sharing condition.

Aspect 19: The method of aspect 18, further comprising: transmitting the control signaling or second control signaling indicating the search space sharing condition.

Aspect 20: The method of any of aspects 18 through 19, wherein the transmitting comprises: transmitting, on a first decoding candidate in the first search space set of the first set of control channel decoding candidates associated with scheduling the first component carrier, the first control message scheduling the second component carrier based at least in part on the search space sharing condition indicating that search space sharing is configured for the first set of control channel decoding candidates and the second set of control channel decoding candidates.

Aspect 21: The method of aspect 20, further comprising: transmitting, on a second decoding candidate in the second search space set of the first set of control channel decoding candidates associated with scheduling the first component carrier, a repetition of the first control message scheduling the second component carrier based at least in part on the search space sharing condition and the first set of control channel decoding candidates being linked for control channel repetition across the first search space set and the second search space set.

Aspect 22: The method of any of aspects 18 through 21, further comprising: transmitting, on a first decoding candidate of the second set of control channel decoding candidates associated with scheduling the second component carrier in the first search space set, the first control message scheduling the first component carrier based at least in part on the search space sharing condition indicating that search space sharing is configured for the first set of control channel decoding candidates and the second set of control channel decoding candidates.

Aspect 23: The method of any of aspects 18 through 22, wherein the transmitting comprises: transmitting, on a first decoding candidate in the first search space set of the first set of control channel decoding candidates associated with scheduling the first component carrier, the first control message scheduling a third component carrier based at least in part on the search space sharing condition, the search space sharing condition indicating that the first set of control channel decoding candidates associated with scheduling the first component carrier is configured for search space sharing based at least in part on the first set of control channel decoding candidates being linked for control channel repetition across the first search space set and the second search space set and a third set of control channel decoding candidates associated with scheduling the third component carrier being linked for control channel repetition across the first search space set and the second search space set.

Aspect 24: The method of aspect 23, further comprising: transmitting, on a second decoding candidate in the second search space set of the first set of control channel decoding candidates associated with scheduling the first component carrier, a repetition of the first control message scheduling the third component carrier.

Aspect 25: The method of any of aspects 18 through 24, wherein the transmitting comprises: transmitting, on a first decoding candidate in the first search space set of the second set of control channel decoding candidates associated with scheduling the second component carrier, the first control message scheduling a third component carrier based at least in part on the search space sharing condition, the search space sharing condition indicating that the second set of control channel decoding candidates associated with scheduling the second component carrier is configured for search space sharing based at least in part on the second set of control channel decoding candidates being unlinked across the first search space set and the second search space set and a third set of control channel decoding candidates associated with scheduling the third component carrier being unlinked across the first search space set and the second search space set.

Aspect 26: The method of any of aspects 18 through 25, wherein identifying the search space sharing condition comprises: identifying that the search space sharing condition indicates that search space sharing is unconfigured between the first set of control channel decoding candidates and the second set of control channel decoding candidates based at least in part on the first set of control channel decoding candidates being linked for control channel repetition across the first search space set and the second search space set, and the second set of control channel decoding candidates being unlinked for control channel repetition across the first search space set and the second search space set.

Aspect 27: The method of any of aspects 18 through 26, wherein identifying the search space sharing condition comprises: identifying that the search space sharing condition indicates that search space sharing is unconfigured for any decoding candidate of the first search space set and the second search space set.

Aspect 28: The method of any of aspects 18 through 27, wherein identifying the search space sharing condition comprises: receiving, from the UE, an indication of a UE capability for search space sharing; and transmitting the control signaling or second control signaling indicating the search space sharing condition based at least in part on the UE capability for search space sharing.

Aspect 29: The method of aspect 28, wherein the indication of the UE capability indicates that the UE is capable of search space sharing between sets of control channel decoding candidates which are unlinked for control channel repetition.

Aspect 30: The method of aspect 29, wherein the indication of the UE capability further indicates that the UE is capable of search space sharing between sets of control channel decoding candidates which are linked for control channel repetition.

Aspect 31: The method of any of aspects 28 through 30, wherein the indication of the UE capability indicates that the UE is capable of search space sharing associated with control channel repetition.

Aspect 32: The method of any of aspects 18 through 31, further comprising: transmitting, to the UE, a second control signaling to enable or disable the search space sharing condition.

Aspect 33: The method of aspect 32, wherein transmitting the second control signaling comprises: transmitting the second control signaling to enable or disable the search space sharing condition for one or more cell groups, one or more component carriers including a set of control channel decoding candidates configured for the UE, one or more pairs of scheduled component carriers, one or more search space sets, or any combination thereof.

Aspect 34: The method of any of aspects 32 through 33, wherein transmitting the second control signaling comprises: transmitting the second control signaling via radio resource control signaling.

Aspect 35: An apparatus for wireless communications at a UE, comprising a processor; memory coupled with the processor; and instructions stored in the memory and executable by the processor to cause the apparatus to perform a method of any of aspects 1 through 17.

Aspect 36: An apparatus for wireless communications at a UE, comprising at least one means for performing a method of any of aspects 1 through 17.

Aspect 37: A non-transitory computer-readable medium storing code for wireless communications at a UE, the code comprising instructions executable by a processor to perform a method of any of aspects 1 through 17.

Aspect 38: An apparatus for wireless communications at a base station, comprising a processor; memory coupled with the processor; and instructions stored in the memory and executable by the processor to cause the apparatus to perform a method of any of aspects 18 through 34.

Aspect 39: An apparatus for wireless communications at a base station, comprising at least one means for performing a method of any of aspects 18 through 34.

Aspect 40: A non-transitory computer-readable medium storing code for wireless communications at a base station, the code comprising instructions executable by a processor to perform a method of any of aspects 18 through 34.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such condition).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a user equipment (UE), comprising:
   one or more processors;
   one or more memories coupled with the one or more processors; and
   instructions stored in the one or more memories and executable by the one or more processors to cause the apparatus to:
      receive, from an access network entity, control signaling indicating a first search space set and a second search space set;
      identify a search space sharing condition for a first set of control channel decoding candidates associated with scheduling a first component carrier, a second set of control channel decoding candidates associated with scheduling a second component carrier, or both, the search space sharing condition indicating that search space sharing is unconfigured between the first set of control channel decoding candidates and the second set of control channel decoding candidates based at least in part on the first set of control channel decoding candidates being linked for control channel repetition across the first search space set and the second search space set; and
      monitor the first set of control channel decoding candidates, the second set of control channel decoding candidates, or both, in accordance with the search space sharing condition.

2. The apparatus of claim 1, wherein the instructions to monitor are executable by the one or more processors to cause the apparatus to:
   receive, on a first decoding candidate of the second set of control channel decoding candidates associated with scheduling the second component carrier, a first control message scheduling a third component carrier based at least in part on the search space sharing condition, the search space sharing condition indicating that the second set of control channel decoding candidates associated with scheduling the second component carrier is configured for search space sharing based at least in part on the second set of control channel decoding candidates being unlinked and a third set of control channel decoding candidates associated with scheduling the third component carrier being unlinked.

3. The apparatus of claim 1, wherein the instructions to identify the search space sharing condition are executable by the one or more processors to cause the apparatus to:
   receive the control signaling or second control signaling indicating the search space sharing condition.

4. The apparatus of claim 1, wherein the search space sharing condition indicates that search space sharing is unconfigured between the first set of control channel decoding candidates and the second set of control channel decoding candidates based at least in part on the second set of control channel decoding candidates being unlinked for control channel repetition across the first search space set and the second search space set.

5. The apparatus of claim 1, wherein the instructions to identify the search space sharing condition are executable by the one or more processors to cause the apparatus to:
   identify that the search space sharing condition indicates that search space sharing is unconfigured for any decoding candidate of the first search space set and the second search space set.

6. The apparatus of claim 1, wherein the instructions to identify the search space sharing condition are executable by the one or more processors to cause the apparatus to:
   transmit, to the access network entity, an indication of a UE capability for search space sharing.

7. The apparatus of claim 6, wherein receiving the control signaling or second control signaling indicating the search space sharing condition is based at least in part on the UE capability for search space sharing.

8. The apparatus of claim 7, wherein the indication of the UE capability further indicates that the UE is capable of search space sharing between sets of control channel decoding candidates which are linked for control channel repetition.

9. The apparatus of claim 1, wherein the instructions are further executable by the one or more processors to cause the apparatus to:
   receive, from the access network entity, a second control signaling to enable or disable the search space sharing condition for one or more cell groups, one or more component carriers including a set of control channel decoding candidates configured for the UE, one or more pairs of scheduled component carriers, one or more search space sets, or any combination thereof.

10. An apparatus for wireless communications at an access network entity, comprising:
    one or more processors;
    one or more memories coupled with the one or more processors; and
    instructions stored in the one or more memories and executable by the one or more processors to cause the apparatus to:
       transmit, to a user equipment (UE), control signaling indicating a first search space set and a second search space set;
       identify a search space sharing condition for a first set of control channel decoding candidates associated with scheduling a first component carrier, a second set of control channel decoding candidates associated with scheduling a second component carrier, or both, the search space sharing condition indicating that search space sharing is unconfigured between the first set of control channel decoding candidates and the second set of control channel decoding candidates based at least in part on the first set of control channel decoding candidates being linked for control channel repetition across the first search space set and the second search space set; and
       transmit a first control message on corresponding to at least one control channel decoding candidate of the first set of control channel decoding candidates, the second set of control channel decoding candidates, or both, in accordance with the search space sharing condition.

11. The apparatus of claim 10, wherein the instructions to transmit are executable by the one or more processors to cause the apparatus to:
  transmit, on a first decoding candidate of the second set of control channel decoding candidates associated with scheduling the second component carrier, the first control message scheduling a third component carrier based at least in part on the search space sharing condition, the search space sharing condition indicating that the second set of control channel decoding candidates associated with scheduling the second component carrier is configured for search space sharing based at least in part on the second set of control channel decoding candidates being unlinked and a third set of control channel decoding candidates associated with scheduling the third component carrier being unlinked.

12. The apparatus of claim 10, wherein the instructions are further executable by the one or more processors to cause the apparatus to:
  transmit the control signaling or second control signaling indicating the search space sharing condition.

13. The apparatus of claim 10, wherein the search space sharing condition indicates that search space sharing is unconfigured between the first set of control channel decoding candidates and the second set of control channel decoding candidates based at least in part on the second set of control channel decoding candidates being unlinked for control channel repetition across the first search space set and the second search space set.

14. The apparatus of claim 10, wherein the instructions to identify the search space sharing condition are executable by the one or more processors to cause the apparatus to:
  identify that the search space sharing condition indicates that search space sharing is unconfigured for any decoding candidate of the first search space set and the second search space set.

15. The apparatus of claim 10, wherein the instructions to identify the search space sharing condition are executable by the one or more processors to cause the apparatus to:
  receive, from the UE, an indication of a UE capability for search space sharing.

16. The apparatus of claim 15, wherein the instructions are further executable by the one or more processors to cause the apparatus to:
  transmit the control signaling or second control signaling indicating the search space sharing condition based at least in part on the UE capability for search space sharing, wherein the indication of the UE capability indicates that the UE is capable of search space sharing between sets of control channel decoding candidates which are unlinked for control channel repetition.

17. The apparatus of claim 15, wherein the indication of the UE capability further indicates that the UE is capable of search space sharing between sets of control channel decoding candidates which are linked for control channel repetition.

18. The apparatus of claim 10, wherein the instructions are further executable by the one or more processors to cause the apparatus to:
  transmit, to the UE, a second control signaling to enable or disable the search space sharing condition for one or more cell groups, one or more component carriers including a set of control channel decoding candidates configured for the UE, one or more pairs of scheduled component carriers, one or more search space sets, or any combination thereof.

19. A method for wireless communications at a user equipment (UE), comprising:
  receiving, from an access network entity, control signaling indicating a first search space set and a second search space set;
  identifying a search space sharing condition for a first set of control channel decoding candidates associated with scheduling a first component carrier, a second set of control channel decoding candidates associated with scheduling a second component carrier, or both, the search space sharing condition indicating that search space sharing is unconfigured between the first set of control channel decoding candidates and the second set of control channel decoding candidates based at least in part on the first set of control channel decoding candidates being linked for control channel repetition across the first search space set and the second search space set; and
  monitoring the first set of control channel decoding candidates, the second set of control channel decoding candidates, or both, in accordance with the search space sharing condition.

20. A method for wireless communications at an access network entity, comprising:
  transmitting, to a user equipment (UE), control signaling indicating a first search space set and a second search space set;
  identifying a search space sharing condition for a first set of control channel decoding candidates associated with scheduling a first component carrier, a second set of control channel decoding candidates associated with scheduling a second component carrier, or both, the search space sharing condition indicating that search space sharing is unconfigured between the first set of control channel decoding candidates and the second set of control channel decoding candidates based at least in part on the first set of control channel decoding candidates being linked for control channel repetition across the first search space set and the second search space set; and
  transmitting a first control message on corresponding to at least one control channel decoding candidate of the first set of control channel decoding candidates, the second set of control channel decoding candidates, or both, in accordance with the search space sharing condition.

21. The apparatus of claim 1, wherein the instructions to receive the control signaling are executable by the one or more processors to cause the apparatus to:
  receive radio resource control signaling that indicates a configuration for the first search space set and the second search space set and that indicates one or more parameters associated with the first search space set and the second search space set.

* * * * *